US011707766B2

(12) United States Patent
Colgrove et al.

(10) Patent No.: US 11,707,766 B2
(45) Date of Patent: Jul. 25, 2023

(54) METHOD AND APPARATUSES FOR SCREENING

(71) Applicant: Derrick Corporation, Buffalo, NY (US)

(72) Inventors: James R. Colgrove, East Aurora, NY (US); Clifford C. Smith, North Collins, NY (US)

(73) Assignee: DERRICK CORPORATION, Buffalo, NY (US)

( * ) Notice: Subject to any disclaimer, the term of this patent is extended or adjusted under 35 U.S.C. 154(b) by 0 days.

(21) Appl. No.: 17/542,927

(22) Filed: Dec. 6, 2021

(65) Prior Publication Data

US 2022/0088638 A1   Mar. 24, 2022

Related U.S. Application Data

(63) Continuation of application No. 17/319,639, filed on May 13, 2021, which is a continuation-in-part of
(Continued)

(51) Int. Cl.
*B07B 1/18* (2006.01)
*B01D 29/05* (2006.01)
(Continued)

(52) U.S. Cl.
CPC ............. *B07B 1/185* (2013.01); *B01D 29/05* (2013.01); *B01D 29/19* (2013.01); *B01D 29/21* (2013.01);
(Continued)

(58) Field of Classification Search
CPC .. B07B 1/18; B07B 1/185; B07B 1/46; B07B 1/4645; B01D 29/05; B01D 29/19;
(Continued)

(56) References Cited

U.S. PATENT DOCUMENTS 2,136,853 A   11/1938 Knecht
3,178,023 A   4/1965 Wheeler, Jr.
(Continued)

FOREIGN PATENT DOCUMENTS

AU        2896400      9/2000
AU   2018281297 B2    10/2021
(Continued)

*Primary Examiner* — Joseph C Rodriguez
(74) *Attorney, Agent, or Firm* — FisherBroyles, LLP; Jason P. Mueller

(57) ABSTRACT

Embodiments of the present disclosure include a screen basket apparatus includes a substantially vertical cylindrical frame and a synthetic screening surface secured to the frame. The synthetic screening surface may be configured to separate carbon or resin from a slurry of a carbon-in-leach, carbon-in-pulp, resin-in-leach, or resin-in-pulp material as fluid flows from outside to inside the screen basket apparatus such that carbon or resin is retained on an external surface of the synthetic screening surface. The cylindrical frame may be a grid frame and the synthetic screening surface may include a plurality of replaceable screen assemblies attached to the grid frame. The grid frame may include a plurality of openings and each of the plurality of openings is configured to receive a respective one of the plurality of replaceable screen assemblies. The synthetic screening surface may include injected molded thermoplastics, thermoset polyurethanes, and/or other polymeric materials.

21 Claims, 52 Drawing Sheets

Related U.S. Application Data application No. 16/151,909, filed on Oct. 4, 2018, now Pat. No. 11,213,857, which is a continuation-in-part of application No. 16/001,755, filed on Jun. 6, 2018, now Pat. No. 11,213,856.

(60) Provisional application No. 62/615,302, filed on Jan. 9, 2018, provisional application No. 62/515,964, filed on Jun. 6, 2017.

(51) Int. Cl.

| | | |
|---|---|---|
| *B01D 29/19* | (2006.01) | |
| *B01D 29/21* | (2006.01) | |
| *B01D 29/90* | (2006.01) | |
| *B01D 29/92* | (2006.01) | |
| *B01D 33/03* | (2006.01) | |
| *B01D 33/74* | (2006.01) | |
| *B01D 39/16* | (2006.01) | |
| *B07B 1/46* | (2006.01) | |
| *B29C 45/00* | (2006.01) | |
| *B29D 28/00* | (2006.01) | |
| *B01D 33/067* | (2006.01) | |
| *B29K 75/00* | (2006.01) | |

(52) U.S. Cl.
CPC ......... *B01D 29/902* (2013.01); *B01D 29/925* (2013.01); *B01D 33/0315* (2013.01); *B01D 33/742* (2013.01); *B01D 39/1692* (2013.01); *B07B 1/46* (2013.01); *B07B 1/469* (2013.01); *B07B 1/4618* (2013.01); *B07B 1/4645* (2013.01); *B29C 45/0001* (2013.01); *B29D 28/00* (2013.01); *B01D 33/067* (2013.01); *B01D 2201/0415* (2013.01); *B01D 2201/184* (2013.01); *B01D 2201/4092* (2013.01); *B01D 2239/1216* (2013.01); *B29K 2075/00* (2013.01)

(58) Field of Classification Search
CPC .... B01D 29/21; B01D 29/902; B01D 29/925; B01D 1/185; B01D 33/0315; B01D 33/0369; B01D 33/067; B01D 33/742; B01D 39/1692

See application file for complete search history.

(56) References Cited

U.S. PATENT DOCUMENTS

| | | | |
|---|---|---|---|
| 4,038,187 A * | 7/1977 | Saffran | B01D 33/067 |
| | | | 210/411 |
| 4,416,774 A | 11/1983 | Taylor | |
| 5,049,262 A | 9/1991 | Galton | |
| 5,238,117 A * | 8/1993 | Hunter | F04D 1/14 |
| | | | 209/267 |
| 6,443,310 B1 | 9/2002 | Lee, Jr. | |
| 7,296,685 B2 | 11/2007 | Malmberg | |
| 8,469,199 B2 | 6/2013 | Groenvall | |
| 9,694,390 B1 | 7/2017 | Tsutsumi | |
| 11,198,155 B2 * | 12/2021 | Wojciechowski | B07B 1/4618 |
| 11,213,856 B2 * | 1/2022 | Colgrove | B01D 29/05 |
| 11,213,857 B2 * | 1/2022 | Colgrove | B01D 29/925 |
| 2002/0079251 A1 | 6/2002 | Schulte | |
| 2007/0068853 A1 | 3/2007 | Johnson | |
| 2009/0301945 A1 * | 12/2009 | Trench | B07B 1/4645 |
| | | | 209/405 |
| 2013/0313168 A1 * | 11/2013 | Wojciechowski | B07B 1/00 |
| | | | 209/412 |
| 2016/0310994 A1 | 10/2016 | Wojciechowski | |
| 2021/0260503 A1 | 8/2021 | Colgrove | |
| 2022/0088638 A1 * | 3/2022 | Colgrove | B07B 1/469 |

FOREIGN PATENT DOCUMENTS

| | | |
|---|---|---|
| CL | 2019003574 | 6/2020 |
| CN | 1343145 A | 4/2002 |
| CN | 1917967 | 2/2007 |
| CN | 101018618 A | 8/2007 |
| CN | 102665941 A | 9/2012 |
| CN | 203304173 U | 11/2013 |
| CN | 103501923 A | 1/2014 |
| CN | 103521430 | 1/2014 |
| CN | 104520201 A | 4/2015 |
| CN | 105779782 | 7/2016 |
| CN | 106216239 A | 12/2016 |
| CN | 106255556 A | 12/2016 |
| CN | 205816182 | 12/2016 |
| CN | 206604246 | 11/2017 |
| CO | 11012187 | 2/2011 |
| DE | 2914602 | 10/1980 |
| DE | 102009010684 | 9/2010 |
| EP | 3634652 A1 | 4/2020 |
| EP | 4163020 A1 | 4/2023 |
| JP | 2005288261 A | 10/2005 |
| WO | 2000053343 A1 | 9/2000 |
| WO | 0197947 A1 | 12/2001 |
| WO | 03061854 | 7/2003 |
| WO | 2014149516 A1 | 9/2014 |
| WO | 2015089223 A1 | 6/2015 |
| WO | 2016148993 A1 | 9/2016 |
| WO | 17085641 | 5/2017 |
| WO | 2018226878 A1 | 12/2018 |
| WO | 2020245795 | 12/2020 |

* cited by examiner

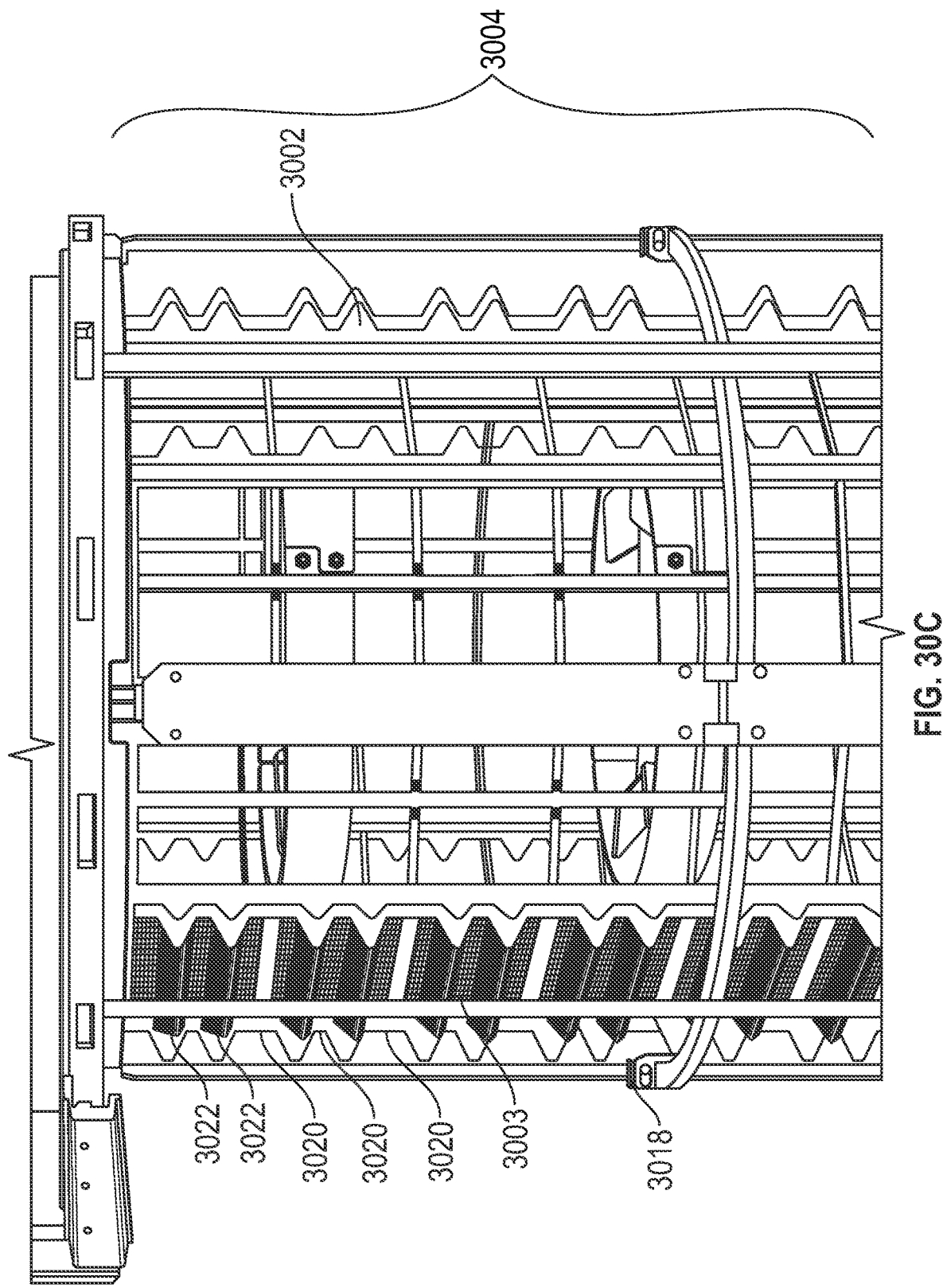

METHOD AND APPARATUSES FOR SCREENING

CROSS-REFERENCE TO RELATED APPLICATIONS

This application is a continuation of currently pending U.S. patent application Ser. No. 17/319,639, filed on May 13, 2021, which is a continuation-in-part of currently pending U.S. patent application Ser. No. 16/151,909, filed on Oct. 4, 2018, which is a continuation-in-part of currently pending U.S. patent application Ser. No. 16/001,755, filed Jun. 6, 2018, which claims the benefit of U.S. Provisional Patent Application No. 62/515,964, filed Jun. 6, 2017, and U.S. Provisional Patent Application No. 62/615,302, filed Jan. 9, 2018, the contents of each of which are incorporated by reference herein and the priority of each of which are hereby claimed.

BRIEF DESCRIPTION OF DRAWINGS

Various aspects and features of the present disclosure are described herein with reference to the drawings. Like numbers refer to like, but not necessarily the same or identical, elements throughout.

FIG. 30C is a second enlarged view of the screening apparatus of FIG. 30A, according to an embodiment.

DESCRIPTION OF EMBODIMENTS

Figure 1:
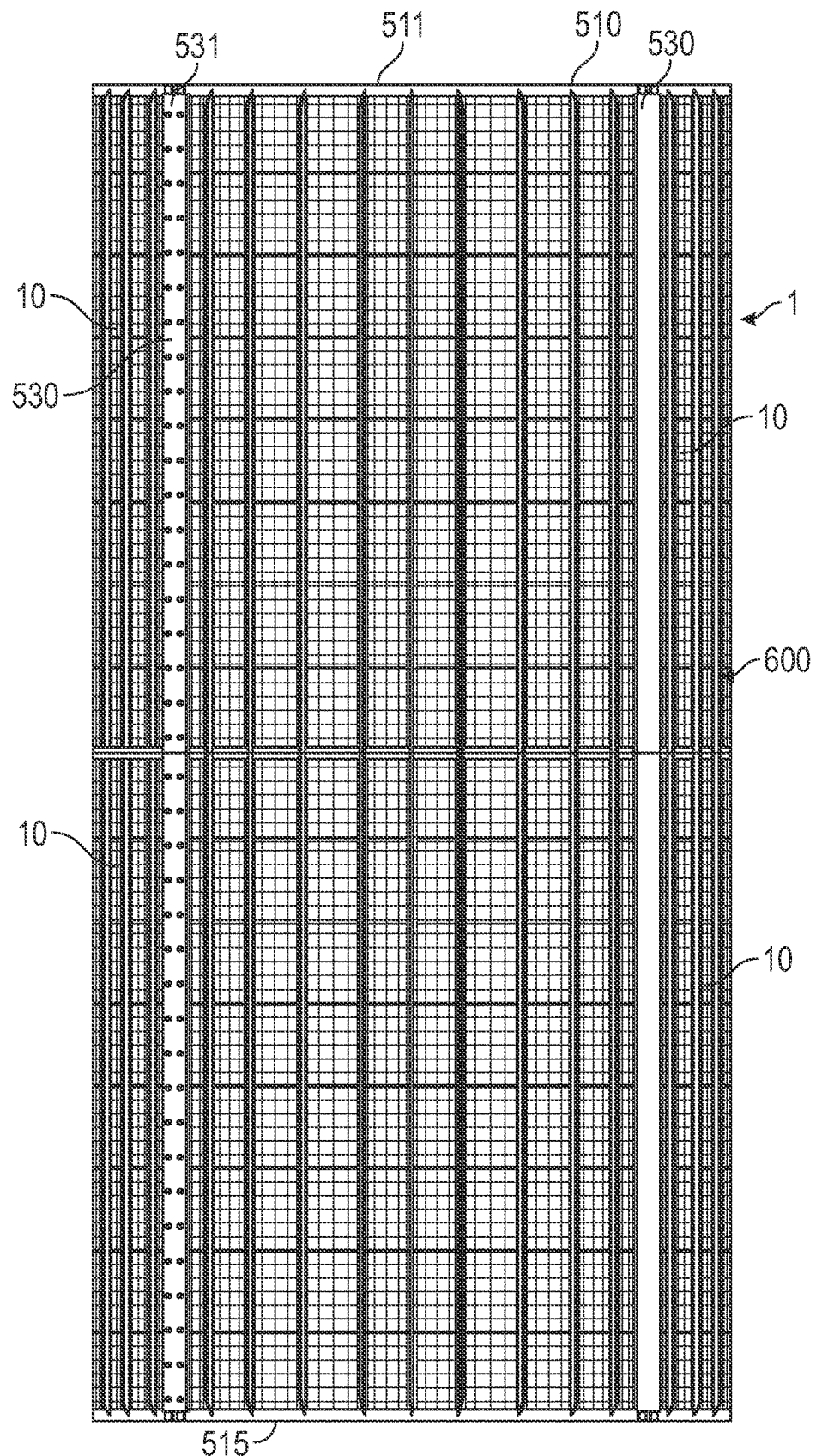
FIG. 1 shows a side view of a screen basket, according to an example embodiment of the present disclosure.

The present disclosure relates to apparatuses and methods for filtering, and particularly to the use of improved screen baskets to be used in methods and systems for sorption of metals from metal-containing ore. In one particular embodiment, the improved screen basket can include three-dimensional corrugations and can be affixed to a vertically disposed, substantially cylindrical screen basket frame. The inclusion of three-dimensional corrugations in the screen basket can substantially increase the available surface area for screening, as opposed to a similarly configured screen assembly that employs only non-corrugated (e.g., flat) screen members. The corrugations in the screen basket can be disposed substantially perpendicular to a longitudinal axis of the screen basket and/or the screen basket frame such that they are oriented horizontally when the screen basket is upright. In this embodiment, the corrugations can be circular or semi-circular and can extend partially or totally around a perimeter of the screen basket and/or the screen basket frame. The corrugations can also be disposed substantially parallel to a longitudinal axis of the screen basket and/or the screen basket frame, in which case they may appear substantially straight and vertical when the screen basket is upright. In another embodiment, the corrugations can have an angular orientation that is neither parallel nor perpendicular to a longitudinal axis of the screen basket and/or the screen basket frame. In another embodiment, the screen basket can include any combination of horizontal and vertical corrugations, and combination of horizontal and angular corrugations, any combination of vertical and angular corrugations, and/or any combination of horizontal, vertical and angular corrugations. Embodiments of the present disclosure may be utilized with carbon-in-pulp (CIP), carbon-in-leach (CIL), and resin-in-leach (ML) systems, among others. CIL and CIP systems are, for example, two countercurrent methods for adsorbing leached gold from a pulp stream onto activated carbon. In such CIL and CIP processes, a plurality of adsorption tanks are placed in a series. Pulp flows continuously from the first tank of this series to the last tank. Simultaneously, carbon is pumped countercurrent from the last tank of the series to the first tank. CIP and CIP processes differ in the extent to which gold is leached prior to carbon adsorption. For example, in CIL operation, carbon is added to the leaching tanks, and the leaching reaction and adsorption occur simultaneously. In contrast, in the CIP process, the majority of the leachable gold is leached out before the first adsorption stage.

A description of a general process of recovering gold from a gold-bearing ore, employing a combined cyanidation and adsorption treatment, may be found in U.S. Pat. No. 4,188, 208. Although embodiments of the present disclosure are generally discussed with reference to gold or carbon, embodiments of the present disclosure may be equally applied to processes for recovering silver, iron, nickel, and other metals from the appropriate ore. The recovery of any metal from a mined ore is within the scope of the present disclosure.

A description of existing metal screen baskets and methods of use thereof in the above-described CIP processes may be found in U.S. Pat. No. 5,238,117. The process described in U.S. Pat. No. 5,238,117 have generally become known in the art as "NKM" vertically swept interstage screening processes, and the screen baskets used therein have generally become known in the art as NKM screen baskets. Generally, such NKM screen baskets include a metal support frame provided with a wedge wide screen wrapped around a peripheral sidewall thereof. The wedge wire screen is used to filter materials from a metal-rich pulp. The screen basket is attached to an NKM screening device, and a lower portion of this NKM screening device, including the attached NKM screen basket, is immersed in a tank containing carbon-in-pulp material. Impellers on the NKM screening device cause the pulp in the tank to follow through the wedge wire screen and into the interior of the NKM screen. However, the wedge wire screen has a very low open screening area, which leads to inefficient screening. The low open screening area also leads to clogging. Clogging, in turn, forces increased volumes of pulp to flow through the unclogged areas of the wedge wire screen, which increases the wear rate of the screen. Additionally, the individual wires that form the wedge wire screens tend to deteriorate or break over time due to forces encountered during screening processes, such as sweeping of internal and external propulsion blades.

In exemplary embodiments of the present disclosure, an improved screen basket device for screening material is provided. The device comprises a support frame having a substantially closed bottom and an open top, and a substantially cylindrical sidewall support portion extending between the bottom and top of the support frame. The support frame may be metal, such as stainless steel. The screen can be formed using a thermoplastic or thermoset polymer material that can be flexible. The thermoplastic or thermoset polymer material can be inelastic or substantially inelastic and can, in one embodiment, be a thermoplastic polyurethane. A polymer (e.g., polyurethane) screen sidewall extends around and is supported by the sidewall support portion. The polyurethane screen sidewall comprises a high open-area polyurethane screen. In certain embodiments, the polyurethane screen sidewall substantially encloses the sidewall support portion between the closed bottom and open top to thereby provide a maximized screening area. The polyurethane screen sidewall may be affixed to an outer periphery of the sidewall support portion.

The polymer (e.g., polyurethane) screen sidewall may be formed from a plurality of individual polyurethane screen members. These individual polyurethane screen members may be aligned adjacent to one another to provide a generally continuous screening area across the screen sidewall. In one example, the plurality of individual polyurethane screen members may include eight individual polyurethane screen members. In such embodiments, these eight individual polyurethane screen members may be arranged such that four of the screen members are on a lower half of the support frame and four of the screen members are on an upper half of the support frame.

In certain embodiments, the substantially closed bottom may be provided with a centralized aperture that allows receipt of the drive shaft of an NKM apparatus.

The high open-area polymer (e.g., polyurethane) screen member, in certain embodiments, comprises a flexible molded polyurethane body; screen openings in the body; a set of first, substantially parallel flexible members defining opposite first sides of the screen openings; a set of second, substantially parallel flexible members defining second opposite sides of the screen openings, whereby the second members are substantially perpendicular to the second members; a set of third, substantially parallel members having multiple first members therebetween; a set of fourth, substantially parallel members having multiple second members therebetween; side edge portions substantially parallel at opposite sides of the body, between which the third members therein extend; and a first end portion and a second end portion substantially parallel at opposite ends of the body, between which the fourth members therein extend, whereby the end portions are substantially perpendicular to the edge portions. Screen openings in the flexible molded polyurethane body of the polyurethane screen member may be about 0.044 mm to about 4.000 mm between inner surfaces of the first members, and about 0.044 mm to about 60.000 mm between inner surfaces of the second members and additional or different manufacturing steps may be needed.

The polymer (e.g., polyurethane) screen member can also include reinforcement members molded integrally within at least one of the first and third members and at least one of the second and fourth members. In some embodiments, the reinforcement members integrally formed within the first members may have a substantially uniform thickness having a magnitude in the range of about 0.006 inches to about 0.015 inches. The reinforcement members molded integrally with the second members may have a substantially uniform thickness having a magnitude in a range of about 0.015 inches to about 0.040 inches. The reinforcement members may be embodied in, for example, rods that can be molded integrally with the members. The reinforcement members may also be embodied in, for example, aramid fibers that are at least one of a twisted and a woven multistrand, with the fibers having a linear density of about 55 denier to about 2840 denier.

The side edge portions of the polyurethane screen member may be configured for use in attaching the screen member to the support frame. A plurality of enlarged polyurethane ribs can be integrally formed on an exterior surface of the polyurethane screen body, with the ribs arranged substantially vertical relative to the sidewall support portion. Each of the plurality of ribs may extend substantially from a top to a bottom of the polyurethane screen member.

In further embodiments of the present disclosure, a basket cage may be provided that includes a tubular, or substantially cylindrical grid frame with multiple openings. The multiple openings in the grid frame can be arranged in a square lattice, and each one (or, in some embodiments, at least some) of the multiple openings can have a square shape. In an example embodiment, the multiple openings can include 264 square openings. A subset of the multiple openings can be defined by longitudinal members and transversal members. A second subset of the multiple openings can be defined by longitudinal members and transversal segments of a first annular section of the grid frame, and, similarly, a third subset of the multiple openings can be defined by longitudinal members and transversal segments of a second annular section of the grid frame.

The basket cage may feature flanges at the top and bottom of the cage. The top flange and openings can permit or otherwise facilitate mounting a plate or another type of cover on the flange. In addition or in other embodiments, the flange and openings can permit or otherwise facilitate mounting the basket cage into a screen separator machine (e.g., an NKM vertically swept interstage apparatus).

The basket cage can be utilized in a separation process to separate specific particulate matter from slurry or another type of fluid source. To that end, in one embodiment, screening cartridge assemblies can be mounted to the basket cage, where the screening cartridge assemblies can permit or otherwise facilitate the separation of specific particulate matter from the slurry. Each one of the screening cartridge assemblies can be mounted or otherwise affixed to a respective group of grid members that define, at least in part, a respective opening of the grid frame. For openings in a row about the longitudinal axis of the grid frame, a group of grid members that support a first one of the screening cartridge assembles can have a common grid member with another group of grid members that support a second one of the screening cartridge assemblies.

In some embodiments, each one of the multiple screening cartridge assemblies mounted or affixed to the grid frame includes a screening assembly and a case (or another type of container) configured to receive and hold the screen assembly. In some embodiments, the case can be embodied in a single injection molded piece integrally formed by means of injection molding a polyurethane, a thermoset polymer, or other types of polymer. Example embodiments of the injection molded piece and the process of forming the injection molded piece are discussed in more detail in the disclosures of U.S. Pat. Nos. 10,046,363, 9,409,209, 9,884,344, 10,259,013, 10,576,502, U.S. Patent Application Publication No. 2020/0246833, U.S. Patent Application Publication No. 2018/0345319, U.S. Patent Application Publication No. 2019/0076881, and the cross-references included therein, which are hereby incorporated by reference herein in their entireties.

The screen assembly has, in some embodiments, three individual screen units. The case includes a first opening configured to receive and/or fit the screen assembly within the case, and a second opening that permits exposing a screening surface of the screen assembly to an exterior of the grid frame. The case also includes ridges that extend from a first edge of the case, near the first opening, to an opposing second edge of the case. The ridges and respective portions of the case form respective recesses that permit or otherwise facilitate mounting (e.g., gripping or clipping) the case to the grid frame.

The entirety or substantially the entirety of the grid frame of the screen basket can be covered with screening cartridge assemblies in operation of a separation process. As such, in an example embodiment, 264 screening cartridge assemblies can be mounted to the respective 264 square openings in the grid frame.

Further, the case can include an attachment frame section and a holder frame section. The holder frame section can receive and/or hold the screen assembly formed by screen units. The attachment frame section can include a set of ridges that form respective recesses, which in turn permit or otherwise facilitate attachment (e.g., by clipping, clutching, or otherwise engaging) of the screening cartridge assembly to a grid frame.

Screen cartridges according to the present disclosure may be any suitable shape for attachment to a grid frame of a basket cage. For example and without limitation, the screen cartridges may be of a square shape, or rectangular, or ovular, or any other shape. Although example embodiments may provide for screen cartridges that are shaped to substantially match the grid openings of the grid frame (i.e., a square screen cartridge on a grid frame with square grid openings), screen cartridges of varying shapes may be affixed to grid openings a different shape. Similarly, the grid frame of the basket cage may be of any suitable shape for screening.

Screen elements and screen cartridges according to the embodiments discussed herein resist wear, abrasion, bending, and chemicals better than metal, and thus tend to last longer than wedge wire frames in CIL processes. Screen elements as discussed herein also allow for the formation of significantly smaller screen openings than those of conventional wedge wire frames, which in turn improves screening efficiency. Use of the screen members as described herein provides for significantly larger screening areas, and significantly reduces blinding as compared to conventional wedge wire screen baskets. In use, screen elements and screen cartridges as described herein also allow for a substantially consistent distance between the external propulsion blades of the screening apparatus and the screening cartridge assembly, thereby reducing clogging and elongating the life of the screen elements.

Referring now to the embodiment shown in FIGS. 1 to 5, the screen basket 1 of the present disclosure comprises a basket frame structure 510 that has a high open-area polyurethane screen 600 attached thereto.

Figure 2:
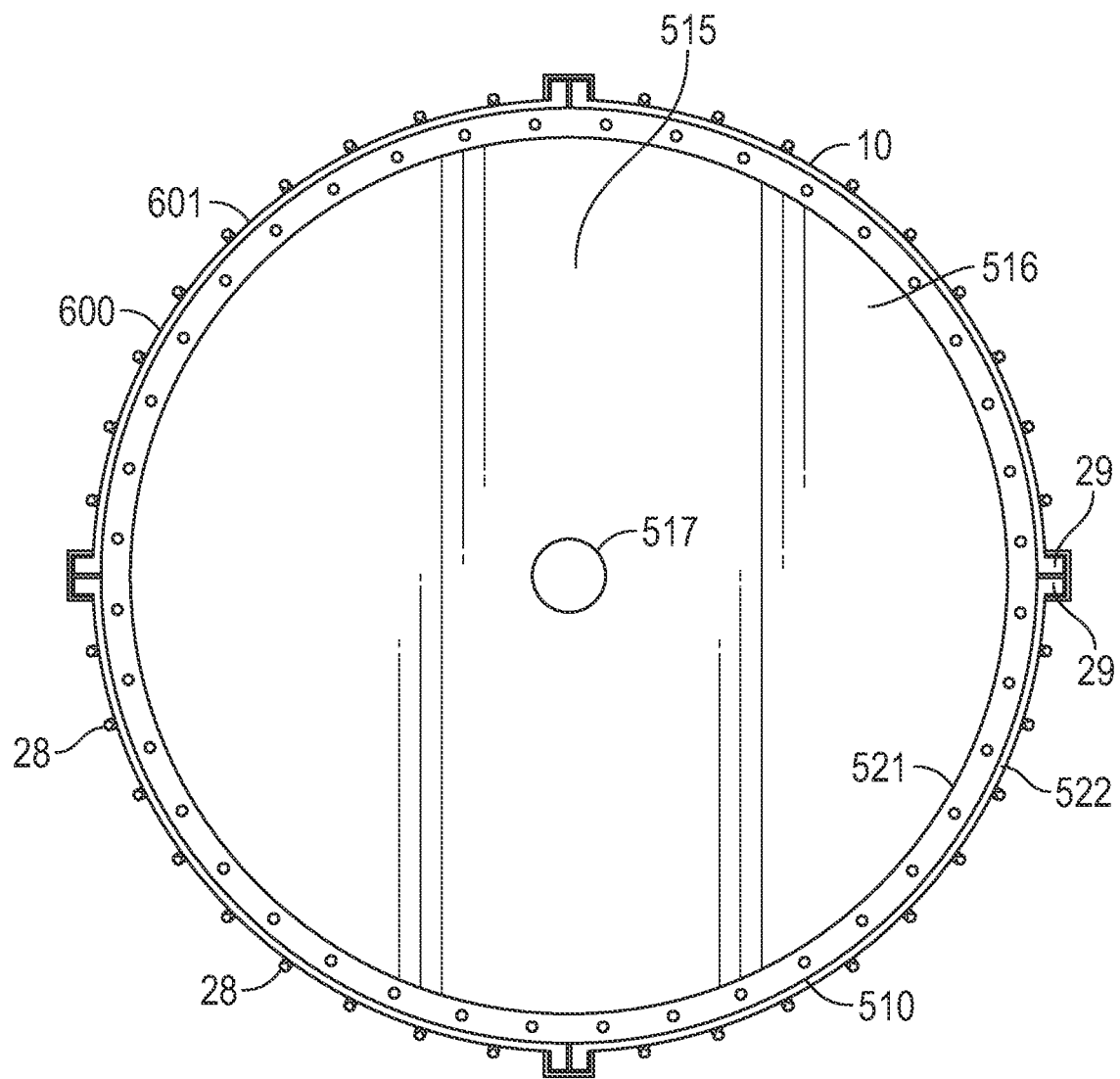
FIG. 2 shows a top view of a screen basket, according to an example embodiment of the present disclosure.

As indicated in FIG. 1, the basket frame 510 generally has a cylindrical configuration, although other shapes may be used. The basket frame 510 may preferably be formed of stainless steel, although other materials may be used. The frame has an upper end 511 and a lower end 515, and includes a plurality of vertical support members 530 forming a vertical support portion extending between the upper and lower ends 511, 515 of the frame 510. As shown in FIG. 2, the vertical support portion of the frame 510 has an interior side 521 and an exterior side 522.

Figure 3:
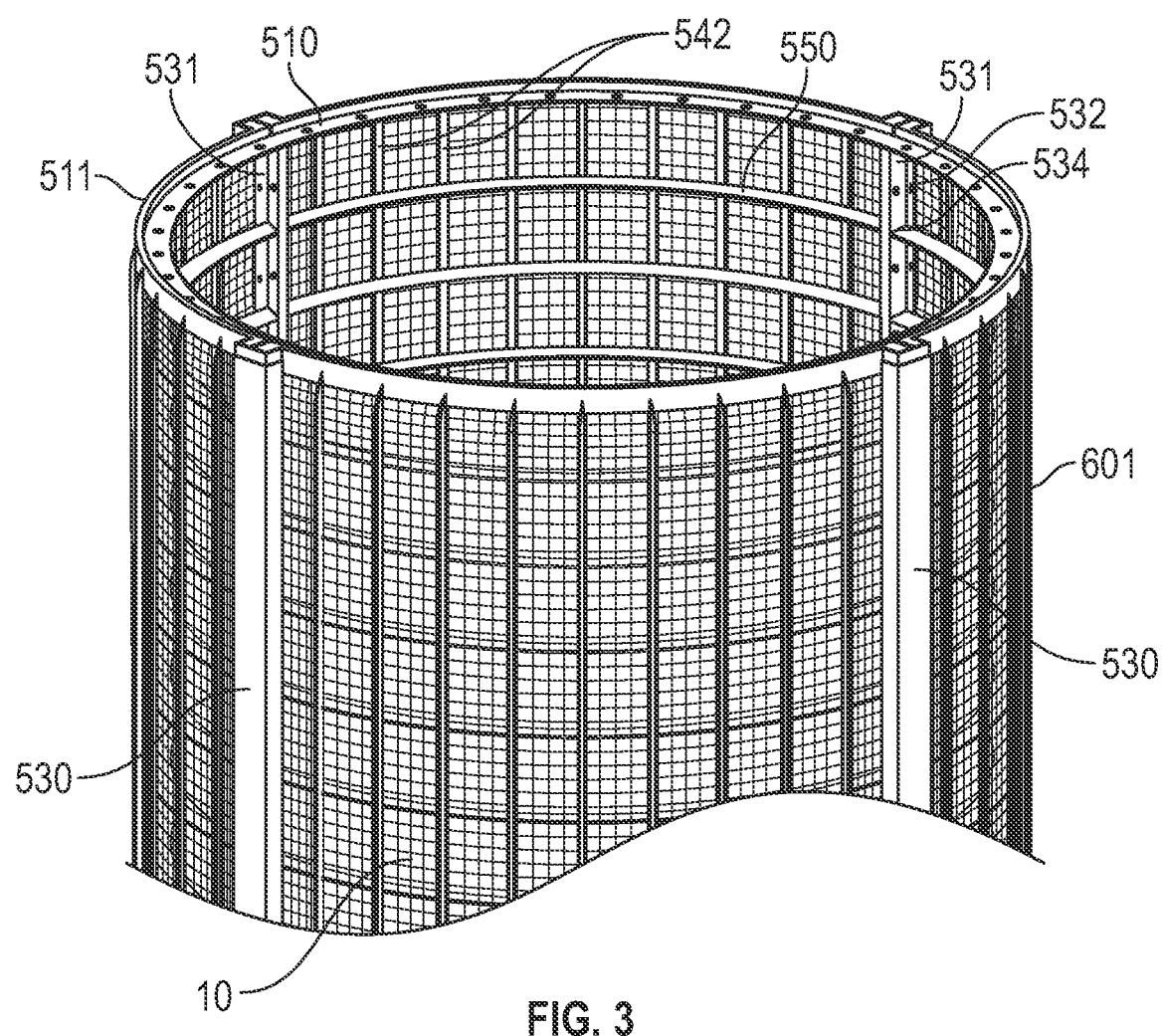
FIG. 3 shows a top-side perspective view of a screen basket, according to an example embodiment of the present disclosure.

As shown in FIG. 3, the support of the basket frame 510 may be formed from a plurality of the vertical support members 530 and a plurality of horizontal support members 550. The embodiment shown in FIG. 3 includes four primary support members 531 spaced along a periphery of the frame 510, along with a plurality of secondary support members 542 spaced between the primary support members 531. Together, the primary and secondary support members 531, 542 join the upper and lower ends 511, 515 of the frame 510 in a spaced arrangement. The horizontal support members 550 may be provided by a plurality of annular rings or curved sections that are joined end-to-end to form a plurality of annular rings in a spaced relationship throughout the basket frame 510.

As shown in FIG. 3, each of the vertical support members 531 may include an interior strut portion 532. The interior strut portion 532 may, in turn, include apertures 534 therethrough. The horizontal support members 550 pass through the apertures 534, thus maintaining the horizontal support members 550 in a stacked and spaced arrangement.

As shown in the top view of FIG. 2, the upper end 511 of the frame 510 is provided with an opening to allow for use in receiving and processing materials within the screen basket 1. The lower end 515 of the frame 510 is provided with a substantially solid or closed bottom 516 for retaining materials in the screen basket 1 during processing. The substantially closed bottom 516 may be provided with a centralized aperture 517 for use in operational arrangements with shafts of processing machines, as discussed in more detail below.

Embodiments of the disclosure may include a high open-area polyurethane screen 600 attached to a periphery of the frame 510, thereby forming a screen basket 1 having an open top, a substantially solid or closed bottom 516, and a polyurethane screen sidewall 601.

Polyurethane screen 600 may be provided in the form of separate, smaller screen members 10, due to potential size constraints in the molding process of the polyurethane screen 600. For example, as in the embodiment shown in FIG. 1, polyurethane screen 600 may feature a plurality of separate screen members 10. Each screen member 10 is attached to the vertical support of the frame 510.

Figure 4:
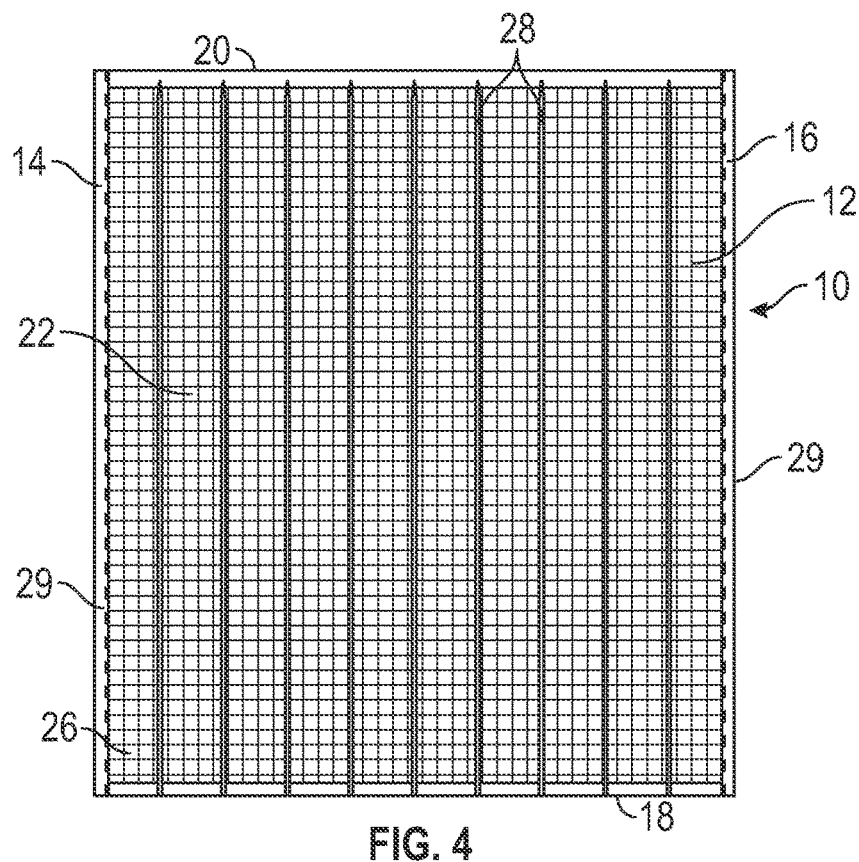
FIG. 4 shows a plan view of a polyurethane screen for use with a basket cage, according to an example embodiment of the present disclosure.
Figure 5:
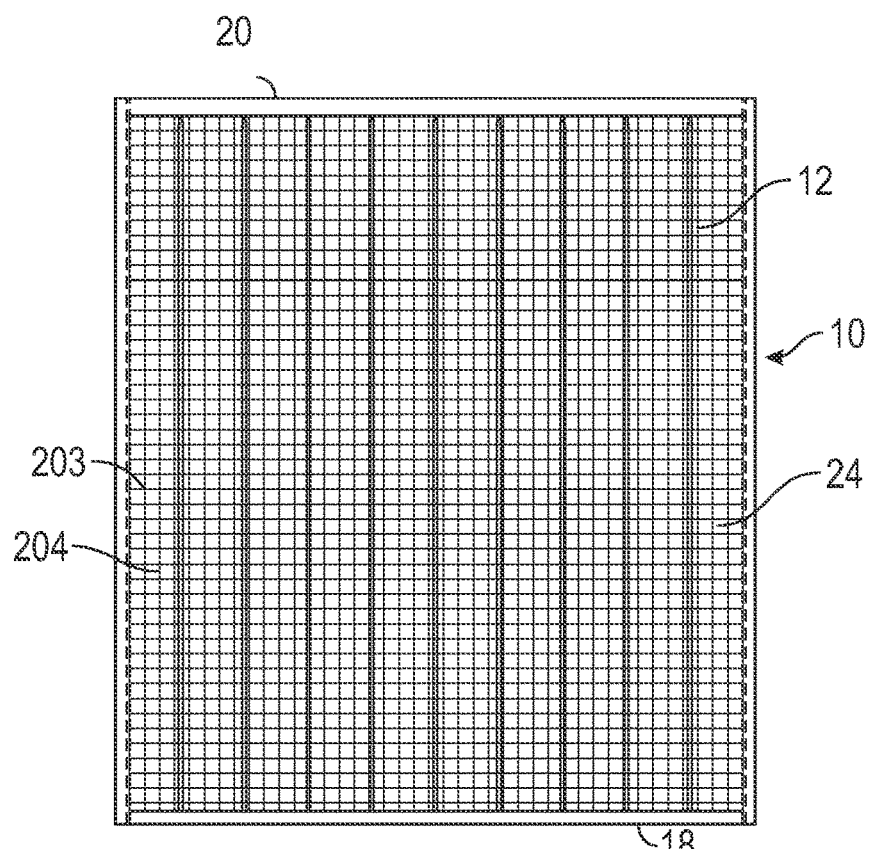
FIG. 5 shows a view of the polyurethane screen of FIG. 4 opposite the plan view of FIG. 4, according to an example embodiment of the present disclosure.
Figure 6:
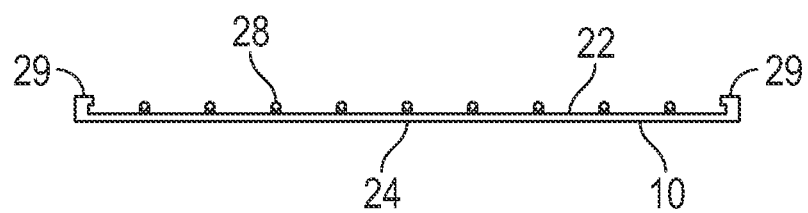
FIG. 6 shows a side view of a polyurethane screen for use with a basket cage, according to an example embodiment of the present disclosure.

FIGS. 4 to 6 show features of an example embodiment of a screen member 10 configured for use in forming the polyurethane screen sidewall 601 of a screen basket 1. FIGS. 4 to 5 show the exterior and interior sides of an embodiment of the screen member 10, respectively, while FIG. 6 shows a side view of an embodiment of the screen member 10. The screen member 10 may comprise polyurethane screens described in more detail in the following patents and patent publications, which share a common assignee with the present disclosure and are incorporated by reference herein: U.S. Pat. Nos. 8,584,866; 9,010,539; 9,375,756; 9,403,192; U.S. Patent Application Publication No. 2015/0197827A1; and U.S. Patent Application Publication No. 2016/0303611A1.

Figure 7:
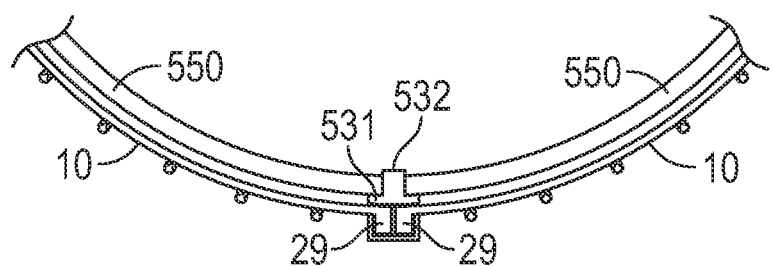
FIG. 7 is a partial top view showing attachment of screen members to a basket frame, according to an example embodiment of the present disclosure.

As shown in FIGS. 4 to 7, an embodiment of the present disclosure may provide for a screen member 10 with a body 12 of molded polyurethane having unperforated side edge portions 14, 16. Side edge portions 14, 16 may each have an integral side ridge portion 29 for use in sealing adjacent screen members 10 to one another and for securing screen members 10 to the basket frame 510, as shown in FIG. 7. Each side edge portion 14, 16 may include a cast-in structural member for use in reinforcing the side ridge portion 29. Side edge portions 14, 16 may also be formed without cast-in structural members or may include other structural members. Side ridge portions 29 may be in any suitable shape for attachment to a basket frame 510. In an exemplary embodiment, side ridge portions 29 may include a formed member, e.g., a metal member that is bent to a desired shape, e.g., a U-shape member, an L-shape member, a C-shape member, or the like. The formed member may be attached to the polyurethane body by heating, pressing, mechanical, chemical, molding, and/or any other suitable method or arrangement.

Body 12 of screen member 10 also includes a lower edge portion 18 and an upper edge portion 20, which, in combination with side edge portions 14, 16, define an outer border of the screen member 10. In certain embodiments, side ridge portion 29 may extend the entire length between upper edge portion 20 and lower edge portion 18.

Body 12 further includes an exterior surface 22 and an interior surface 24. FIG. 4 depicts an exterior surface 22 of the body 12 when screen member 10 is affixed to the basket frame 510, as shown, for example, in FIG. 1, and FIG. 5 depicts an interior surface 24 of the body 12 when screen member is affixed to the basket frame 510 as shown, for example, in FIG. 1. Body 12 includes first members 101 and second members 102 forming screen openings 26, as shown in detail in FIG. 8 and FIG. 8A. First members 101 and second members 102 may, in some embodiments, be configured to include reinforcement members 50, as discussed in more detail below. As shown in the side view of FIG. 6, screen element 10 may further include vertical ribs 28 on the exterior surface 22 of screen element 10. Screen element 10 may, however, not include vertical ribs 28 in certain embodiments of the present disclosure.

Body 12 may further include third members 203 and fourth members 204. Third members 203 and fourth members 204, and vertical ribs 28 if present, may also include reinforcement members 50, discussed in more detail below. Third members 203, fourth members 204, and vertical ribs 28 may, however, not include reinforcement members 50 in certain embodiments of the present disclosure. Third members 203 and fourth members 204 are generally configured to provide support to the screen openings 26 formed by first and second members 101, 102.

Figure 8:
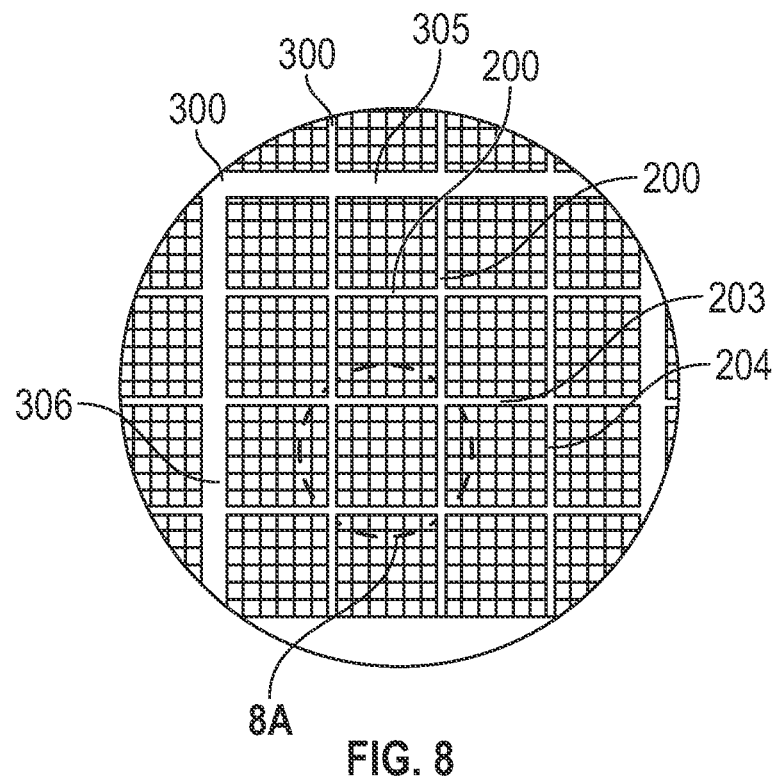
FIG. 8 shows a portion of the polyurethane screen shown in FIG. 4.
Figure 8A:
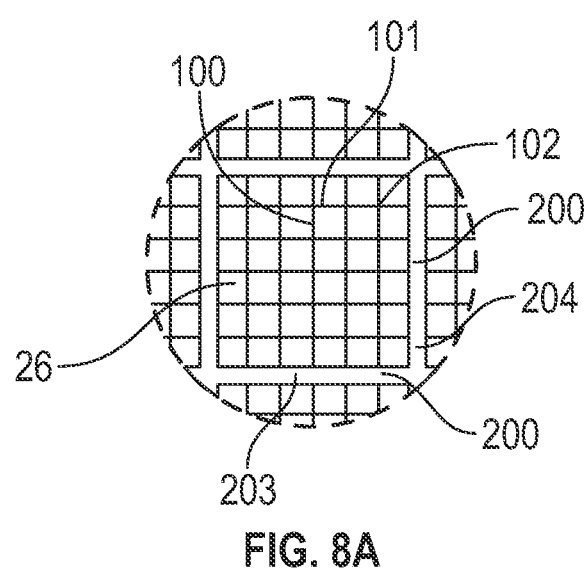
FIG. 8A shows an enlarged view of a portion of the polyurethane screen shown in FIG. 8.

FIG. 8 shows a portion of an embodiment of screen element 10, with FIG. 8A depicting an enlarged view of a portion of FIG. 8. As shown in the detail view of FIG. 8A, first and second members 101, 102 form a first integrally molded grid structure 100 that defines screen openings 26. Third and fourth members 203, 204 may form a second integrally molded grid structure 200, and fifth and sixth members 305 and 306, respectively, may in turn form a third integrally molded grid structure 300.

Reinforcement members 50 may be incorporated into desired members of the screen element 10. Reinforcement members 50 provide stability to screen element 10 by preventing the side edges 14, 16 from deforming and/or hour-glassing. In an exemplary embodiment, reinforcement members 50 may be integrated (such as by molding integrally) with the appropriate members. Reinforcement members 50 may be made of plastic, metal, polymer, or any other suitable material with the necessary structural properties. For example, the reinforcement members 50 may be embodied in rods that are molded integrally with the screen members. The reinforcement members 50 may also be embodied in aramid fibers that are at least one of a twisted multistrand and a woven multistrand, such that the fibers act as wicks to absorb the polyurethane molded around it, thereby providing a strong bond therewith. The twisted or woven multistrand fibers may have a linear density of about 55 denier to about 2840 denier, and may preferably be approximately 1500 denier. When an aramid fiber is used in embodiments of the present disclosure, it may be a set of aramid fibers commercial obtainable under the trademark KEVLAR® of the DuPont Company. Reinforcement members 50 may also be at least one of the aramid fibers commercially obtainable under the commercial names TWARON, SULFRON, TEIJINCONEX, and TECHNORA of the Teijin Company. The flexibility of the aramid fibers provides a flexible reinforcement system for the molded polyurethane, which is able to return to its original molded shape after the necessary bending and flexing that occurs during handling and installation. In certain embodiments, reinforcement members 50 may be tensioned before polyurethane is molded around it.

Referring back to the example embodiment shown in FIGS. 4 to 5, and the detail view shown in FIG. 8, grid structures 200 and 300 include bi-directionally integrally molded members forming support grids within the members. Due to the properties of the reinforcement members 50 and the configuration of the bi-directional grid structure, the members may have a relatively small size and thus provide for increased open screening area. The grid structures provide screen strength and support for openings 26 during vibratory loading, and significantly increase open screening area.

As shown in the detail view of FIG. 8A, first members 101 may extend transversely between side edge portions 14, 16, in a manner substantially parallel with each other. Second members 102 may extend transversely between the lower edge portion 18 and the upper edge portion 20, in a manner substantially parallel with each other and substantially perpendicular to first members 101. In certain embodiments, second members 102 may have a thickness greater than that of the first members 101 to provide additional structural support to screen openings 26.

Figure 9:
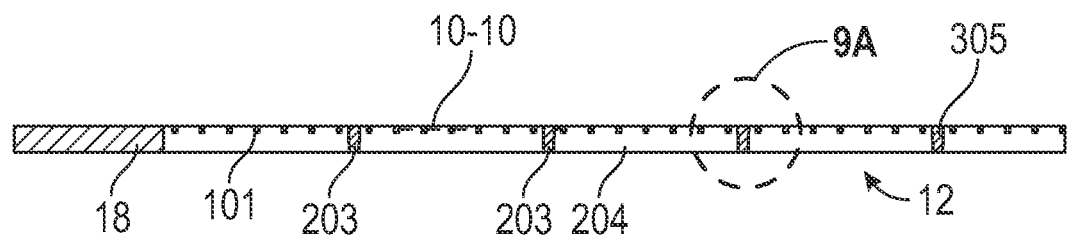
FIG. 9 shows a fragmentary side cross-sectional view of a polyurethane screen, according to an example embodiment of the present disclosure.
Figure 9A:
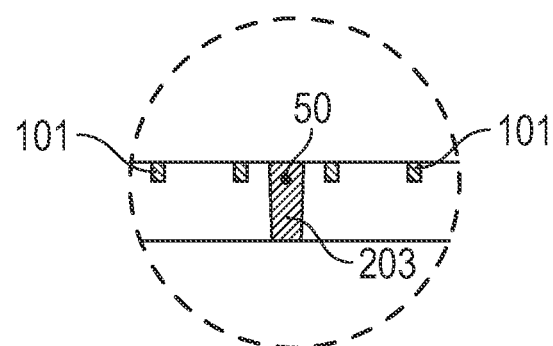
FIG. 9A shows an enlarged view of a portion of the fragmentary cross-sectional view shown in FIG. 9.
Figure 12:
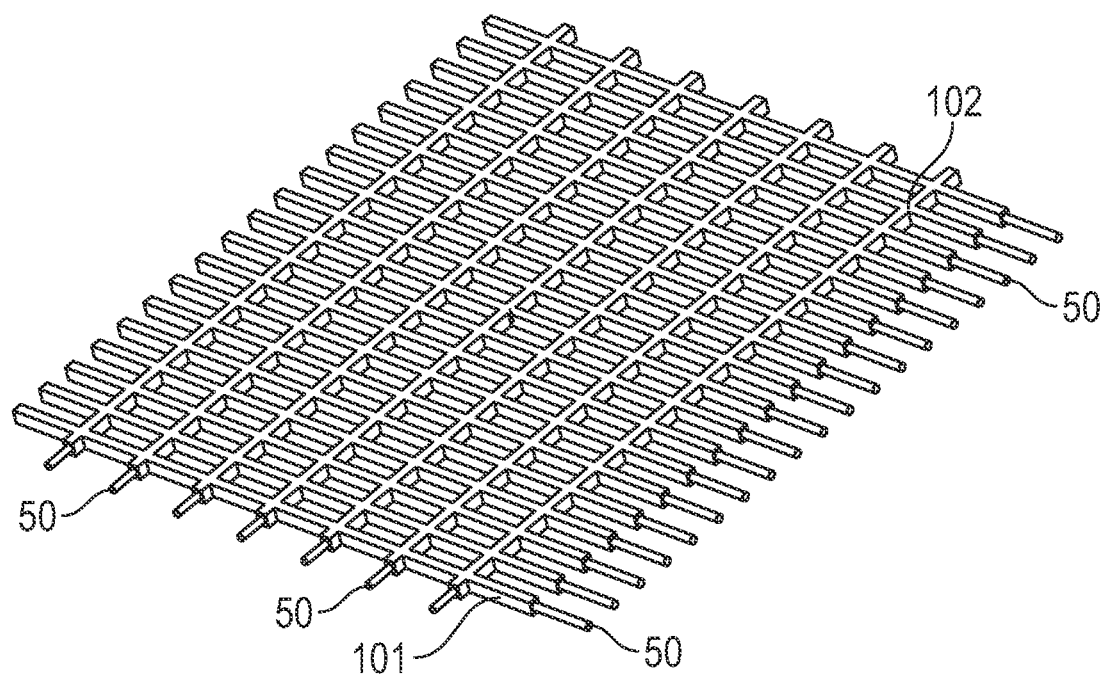
FIG. 12 shows an exploded isometric view of a portion of a polyurethane screen according to an example embodiment of the present disclosure, having reinforcement members integral with the first and second members.

As referred to above, and as shown in the exploded isometric view of FIG. 12, first members 101 and/or second members 102 may include reinforcement members 50, and may or may not be supported by additional support members or support grid structures. For example, as shown in FIG. 9, which depicts a fragmentary cross-sectional view of body 12 of screen member 10, body 12 has first and second members 101, 102 with bi-directional reinforcement members 50 molded integrally therewith. Reinforcement members 50 molded integrally therewith first members 101 have a thickness in the range of about 0.006 inches to about 0.015 inches. Reinforcement members 50 molded integrally therewith second members 102 (not shown) have a thickness in the range of about 0.015 inches to about 0.040 inches. Such configurations may be beneficial for screening applications requiring screens with larger screen openings.

Embodiments of the present disclosure may incorporate reinforcement members 50 in any one of first, second, third, and fourth members 101, 102, 203, 204, as well as ribs 28, and may be incorporated into either all or a portion of the first, second, third, and fourth members 101, 102, 203, 204 and rib members 28.

As shown in FIG. 8 and detail FIG. 8A, screen openings 26 may be elongated, with a greater length dimension along sides and between ends thereof than the width dimensions. Screen openings 26 may be approximately 0.044 mm to about 4.0 mm in width, the width being the dimension between the inner surfaces of adjacent first members 101. Screen openings 26 may be approximately 0.44 mm to about 60 mm in length, the length being the dimension between the inner surfaces of adjacent second members 102. Screen openings 26 may additionally have a variety of different shapes. For example, screen openings 26 may have a rectangular shape, or a square shape, or an ovular shape, or any other shape that may be formed by the first and second members 101, 102. The overall dimensions of screen element 10 may be about 1.2 meters by 1.6 meters, or may be of any other desired size. It may be understood that all dimensions set forth herein are by way of example only, and not of limitation.

Figure 10:
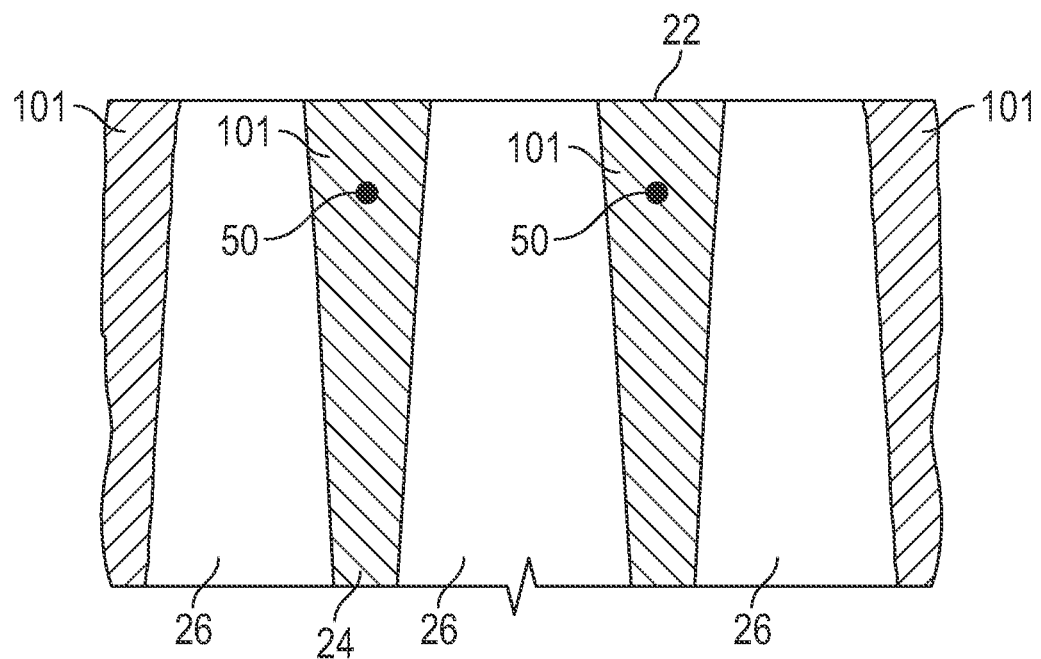
FIG. 10 shows an enlarged fragmentary cross-sectional view taken substantially along line 10-10 of FIG. 9, showing a cross-sectional configuration of a modified shape of the first members with reinforcement members, according to an example embodiment of the present disclosure.
Figure 11:
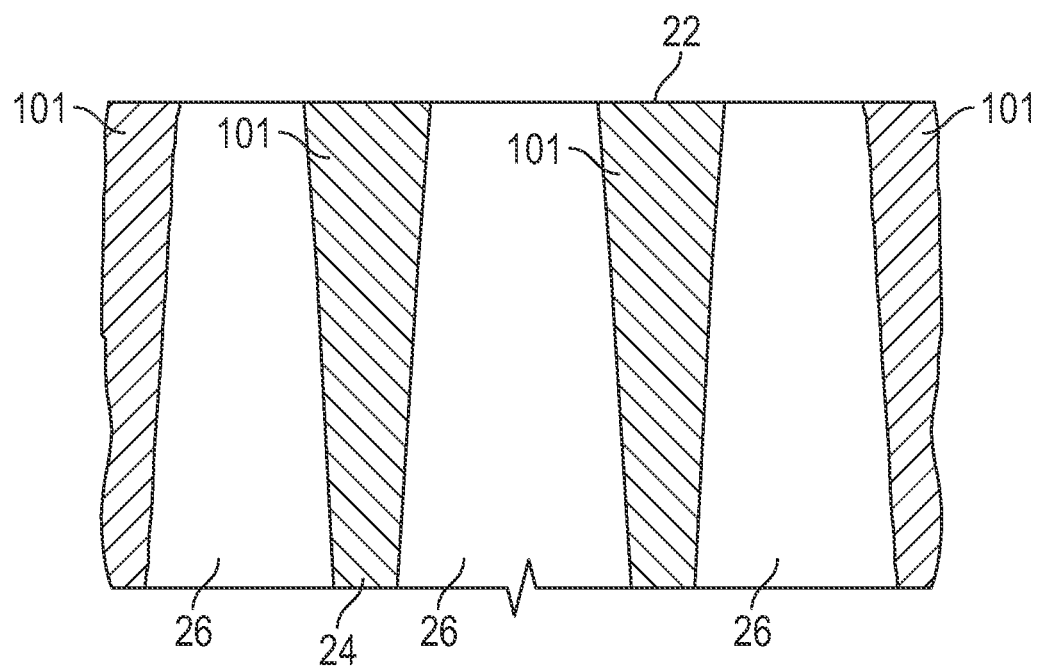
FIG. 11 shows an enlarged fragmentary cross-sectional view similar to that of FIG. 10, but showing first members without reinforcement members, according to an example embodiment of the present disclosure.

Referring briefly to FIG. 10 and FIG. 11, screen openings 26 may diverge downwardly between exterior surface 22 and interior surface 24, with the first members 101 being substantially in the shape of inverted trapezoids. This general trapezoidal shape of first members 101 prevents blinding in screen element 10 and overall polyurethane screen 600. First members 101 may include reinforcement members 50 molded integrally therewith, as shown in FIG. 10, or may optionally not include reinforcement members 50 molded integrally therewith, as shown in FIG. 11.

As illustrated in the detail view of FIG. 8A, third and fourth members 203, 204 may have a thickness greater than first and second members 101, 102. The increased thickness of third and fourth members 203, 204 may provide additional structural support to first and second members 101, 102. As shown in the example embodiment of FIGS. 8 and 8A, third members 203 may extend transversely between the side edge portions 14, 16 in a manner substantially parallel with each other, and may have multiple first members 101 featured therebetween. Fourth members 204 may extend transversely between lower edge portion 18 and upper edge portion 20 in a manner substantially parallel with each other, and may have multiple second members 102 featured therebetween. Reinforcement members 50 may be molded integrally with third and fourth members 203, 204. Third and fourth members 203, 204 may be configured to have a minimal thickness through inclusion of reinforcement members 50, while maintaining the necessary structural support for screen openings 26 formed by first and second members 101, 102 during vibratory screening applications. The bi-directional support system provided by third and fourth members 203, 204 and the added support of reinforcement members 50 integrated therein, where included, greatly reduces the thickness of the support members and provides for increased open screening area and overall screen efficiencies.

Body 12 may further include a plurality of vertical ribs 28. In the embodiment shown in FIGS. 4 to 6, a series of nine ribs 28 may be provided. Ribs 28 may have a thickness greater than that of third and fourth members 203, 204, and may have a portion extending away from the interior surface 24 of body 12. As shown in FIG. 2, ribs 28 may also be provided extending away from the exterior surface 522 of body 12 and thus providing vertical support along the exterior screen sidewall 601. The greater thickness and positioning of ribs 28 provides additional structural support to first and second members 101, 102.

Ribs 28 may extend transversely between the lower edge portion 18 and the upper edge portion 20 in a manner substantially parallel to each other, and may have multiple fourth members 204 therebetween. Ribs 28 may, additionally and in the alternative, extend transversely between the side edge portions 14, 16 in a manner substantially parallel to each other, and may have multiple third members 203 therebetween. Ribs 28 may have reinforcement members 50 molded integrally therein. Ribs 28 may be provided for additional support to screen openings 26 and may be configured to have a minimal thickness through inclusion of reinforcement members 50, while providing the necessary structural support to maintain screen openings 26 during vibratory screening applications. Like third and fourth members 203, 204, provision of a support system of ribs 28 greatly reduces the thickness of the support members and provides for increased open screening area and overall screen efficiencies.

Various configurations of reinforcement members 50 may be provided in the support rib members 28 to add stability to screen member 10. Reinforcement members 50 provided in the support rib members 28 may be an aramid fiber (or individual filaments thereof), a naturally occurring fiber, or other material having relatively large tensile strength with relatively small cross-sectional areas.

Each element of screen element 10 able to incorporate such reinforcement members 50 may include zero, one, or multiple reinforcement members 50, and the reinforcement members 50 used therein may be of different sizes and materials. Reinforcement members 50 may be located in the bottom halves of the members so as not to be exposed relatively early during the life of the screen element 10, as the upper surface of the screen may wear.

The inclusion of the reinforcement members 50, as well as the support framework of the bi-directional support members, allows the first members 101, as well as second members 102, to be relatively thin, creating larger screen openings. Embodiments as described herein have relatively large tensile strengths with relatively small cross-sectional areas. The making of the support members and the thin first members 101 results in the screen member 10 and overall screen 600 having a greater percentage of open area, which, in turn, increases the capacity of the system. Open screening areas according to the embodiments described herein may range, for example, from about 40 percent to about 46 percent of the screen.

According to an embodiment of the present disclosure, a vibratory screen 10 includes a flexible molded polyurethane body 12 having substantially parallel side edge portions 14, 16 at opposite ends of body 12, as well as a lower edge portion 18 substantially perpendicular to the side edge portions 14, 16, and an upper edge portion 20 substantially perpendicular to the side edge portions 14, 16 and opposite the lower edge portion 18. Polyurethane body 12 further includes an exterior surface 22 and interior surface 24. First and second members 101, 102 are provided, forming screening openings 26. The first members 101 extend between the side edge portions 14, 16, and the second members 102 extend between the lower and upper edge portions 18, 20. The body 12 may also include third and fourth members 203, 204, with the third and fourth members 203, 204 having a thickness greater than that of first and second members 101, 102. Third members 203 run substantially parallel to each other and extend transversely between the side edge portions 14, 16, and have multiple first members 101 featured therebetween. Fourth members 204 run substantially parallel to each other and extend transversely between lower and upper edge portions 18, 20, and have multiple second members 102 featured therebetween. Reinforcement members 50 may be molded integrally with the third and/or fourth members 203, 204, and additionally reinforcement members or rods may be molded integrally with fourth members 204. Body 12 also includes ribs 28. Ribs 28 may be substantially parallel to each other and extend transversely between the side edge portions 14, 16. Ribs 28 may also be substantially parallel to each other and extend transversely between the lower and upper edge portions 18, 20. Ribs 28 have a thickness greater than the third and fourth members 203, 204, and may include reinforcement members 50 molded integrally therewith. Body 12 may additionally feature fifth and sixth members 305, 306. Fifth members 305 run substantially parallel to each other and extend transversely between the side edge portions 14, 16, and have multiple third members 203 featured therebetween. Sixth members 306 run substantially parallel to each other and extend transversely between lower and upper edge portions 18, 20, and have multiple fourth members 204 featured therebetween. Reinforcement members 50 may be molded integrally with the fifth and/or sixth members 305, 306, and additionally reinforcement members or rods may be molded integrally with sixth members 306.

Screen members according to this embodiment may have open screening areas greater than 40 percent, and mesh sizes ranging from approximately 0.375 mesh to approximately 400 mesh. By way of example, screens tested having the aforementioned configurations included a 43 mesh size screen, a 140 mesh size screen, and a 210 mesh size screen. Each of these screens had open screening areas ranging from approximately 40 percent to approximately 46 percent. Such large screening areas for such relatively fine mesh sizes are achieved through the relatively strong and thin grid framework created by the third, fourth, fifth, and sixth members 203, 204, 305, 306, and by reinforcement members molded integrally therewith.

In the aforementioned embodiments and examples, the size of each grid unit formed by the intersection of the third and fourth members 203, 204 is approximately 1 inch by 1 inch. Generally, grid units may be larger for screens with larger screen openings and grid units may be smaller for screens with smaller screen openings. This principle may be generally applicable for each example embodiment discussed herein. Grid units may also have a generally rectangular shape, or may have any other suitable shape for supporting the screen openings.

The use of polyurethane screen members 10 as described herein to form a screen sidewall 601 on a basket frame has significant advantages over conventional wedge wire screens. Polyurethane screen members 10 as described herein resist wear, abrasion, bending, and chemicals better than metal, and thus tend to last longer than wedge wire frames in CIL processes. Polyurethane also allows for the formation of significantly smaller screen openings than those of conventional wedge wire frames, which in turn improves screening efficiency. Use of the polyurethane screen members 10 as described herein provides for significantly larger screening areas, and significantly reduces blinding as compared to conventional wedge wire screen baskets.

Figure 13:
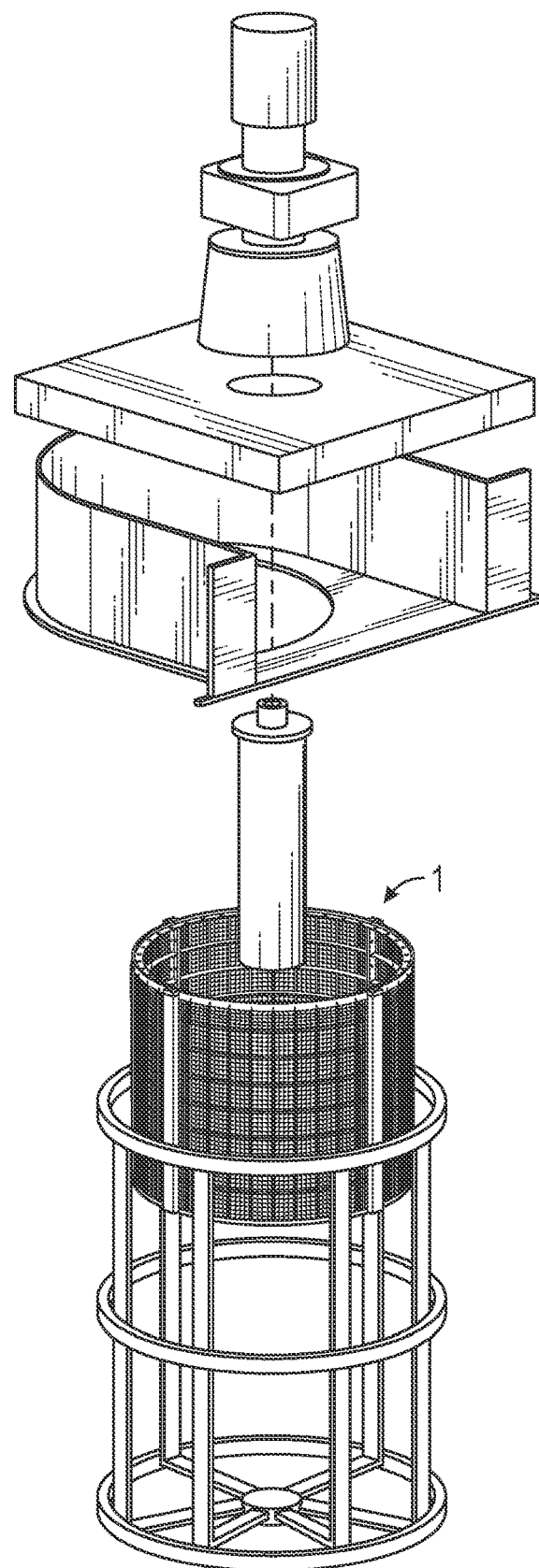
FIG. 13 shows an exploded view of a use of a screen basket according to an example embodiment of the present disclosure, in an embodiment of a screen separator apparatus.
Figure 14:
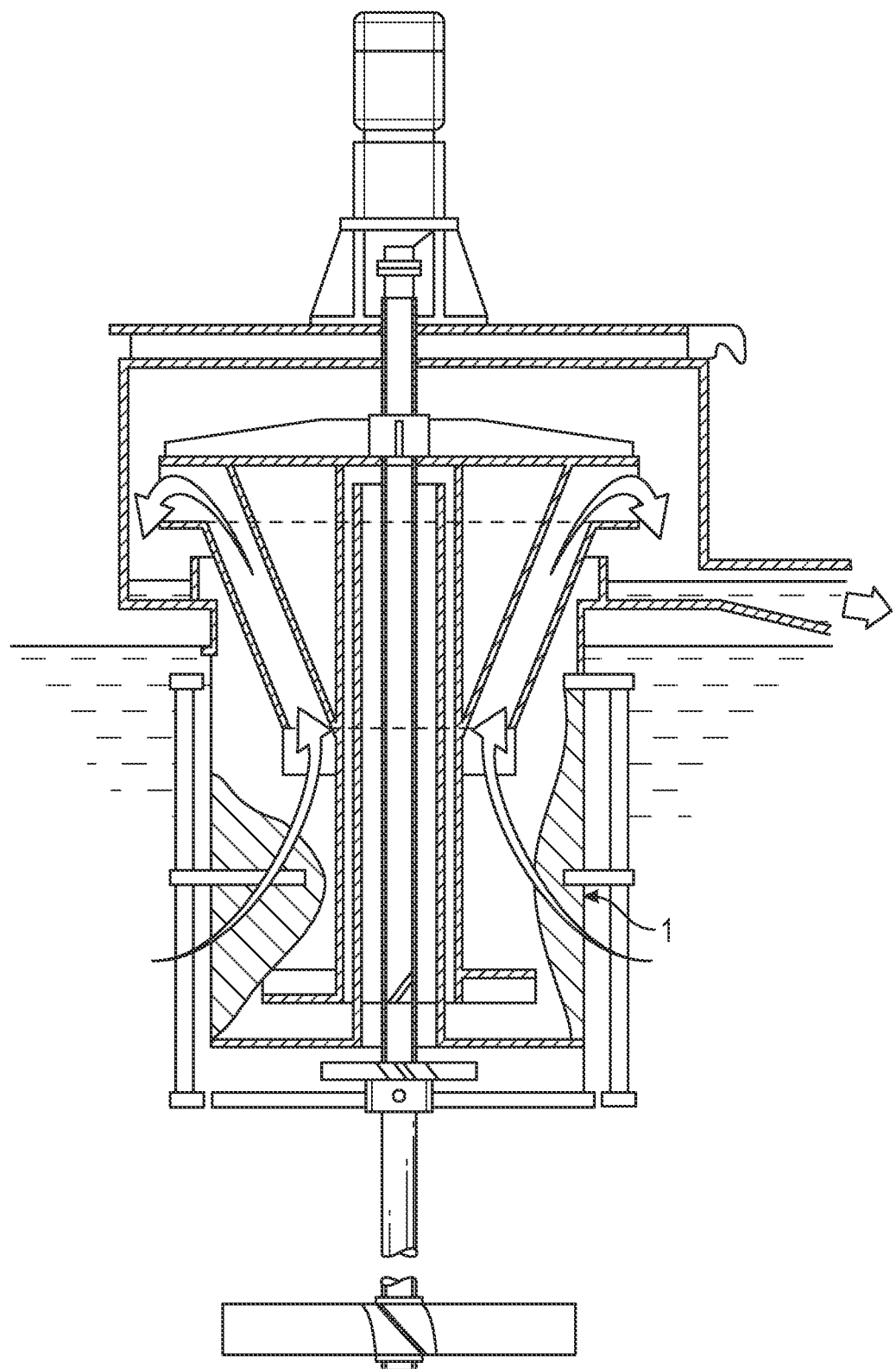
FIG. 14 shows a side cross-sectional view of an example embodiment of use of a screen basket, according to an example embodiment of the present disclosure, in an embodiment of a screen separator apparatus.

In operation, the screen basket 1 described herein may be used with known CIP and CIL devices and processes, such as those described in U.S. Pat. No. 5,238,117. For example, as shown in FIGS. 13 to 14, the screen basket 1 is attached below a volute portion of an NKM vertically swept interstage apparatus. A drive shaft of the NKM apparatus passes from the top to the bottom of the screen basket 1, and through the centralized opening in the closed bottom of the screen basket 1. A gearbox and motor is positioned above the volute to power the drive shaft. A launder interface is situated above the polyurethane screen and volute interface to receive flow of pulp discharge.

With the screen basket 1 attached to the NKM apparatus, the lower portion of the NKM device, including the screen basket 1, is inserted into and suspended over a large adsorption tank containing slurry of pulp to be processed. The level of the pulp in the tank is higher than the level of the fluid in the screen basket 1. This arrangement causes the pulp to naturally flow through the screen of the screen basket 1 in an effort to equalize the fluid levels in the pulp tank and the screen basket 1. Blades on the outside of the NKM unit rotate within the tank around an outer periphery of the screen sidewall of the screen basket 1. The outside blades also assist in preventing particles from clogging the exterior side of the polyurethane screen, such as by carbon and pulp. The pulse and sweeping action the possibility of carbon and near size material blinding the screen openings. Impeller blades located on the inside of the screen, such as on the drive shaft, serve to keep particles in suspension and drive pulp upward toward the volute and launder.

During the process, pulp flows upward through the inside of the screen basket 1. Carbon is retained in the screen. The pulp exists via the launder interface situated above the polyurethane screen and volute interface.

In these processes, it can be seen that the continuous rotation of interior and exterior blades in the vicinity of the polyurethane screen, together with the flow of large volumes of pulp through the openings of the polyurethane screen, subjects the screen to substantial wear and tear. The polyurethane screens and the arrangement of the screen basket described herein are designed to withstand significant wear and tear and to substantially outperform existing wire screen baskets in CIP and CIL processes.

Although the screen basket 1 has been described for use in a CIP or CIL process, the relatively small openings and relatively large screening area of the polyurethane screen members 10 described herein allow the screen basket 1 to be used for other purposes, such as water filtration and desalination.

Figure 15:
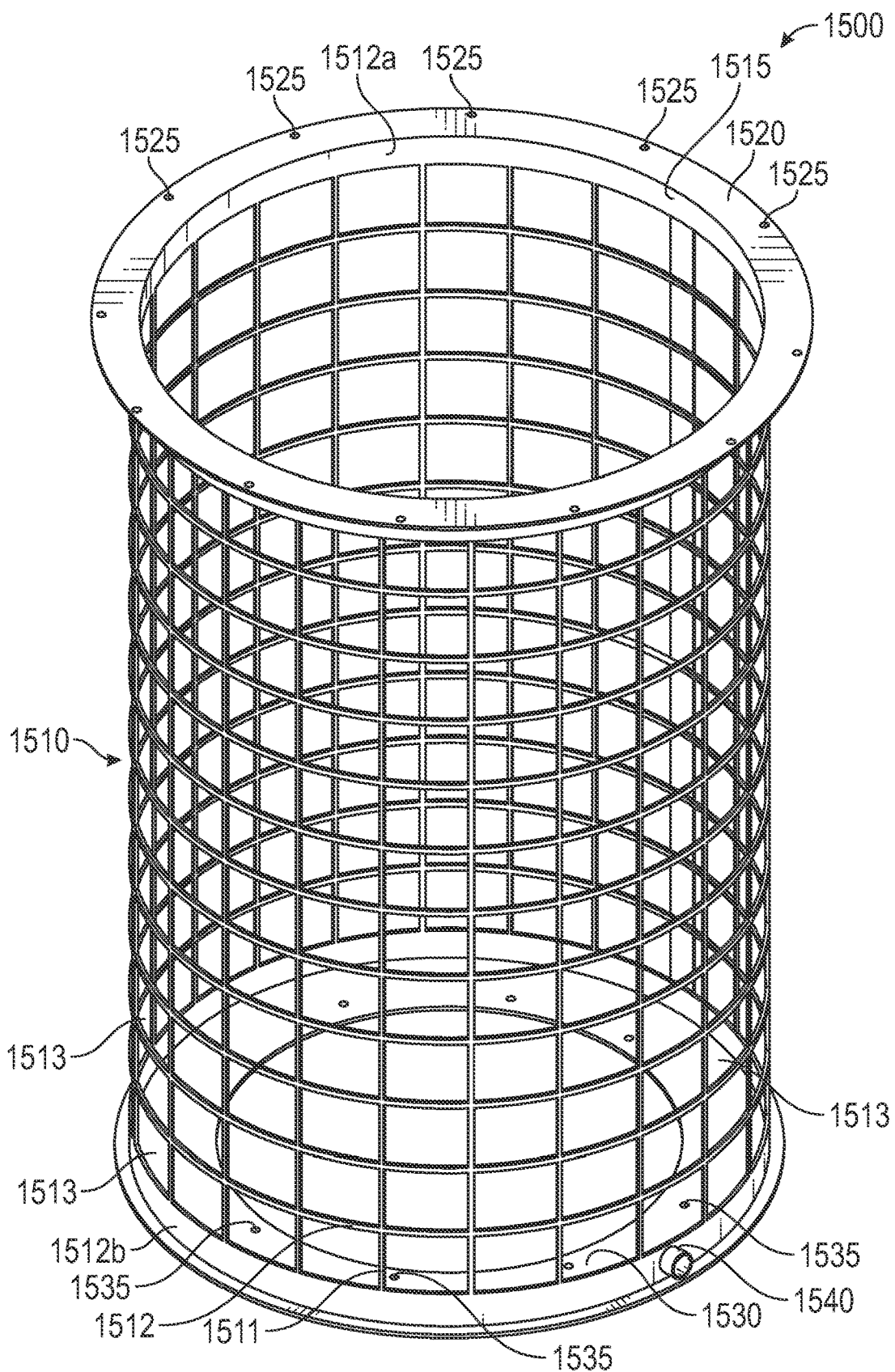
FIG. 15 shows a perspective view of an example of a basket cage in accordance with an example embodiment of the disclosure.

FIG. 15 illustrates a perspective view of an example of a basket cage 1500 in accordance with an additional embodiment of the disclosure. The basket cage 1500 includes a grid frame 1510 that is tubular (or has substantially cylindrical symmetry) with respect to a longitudinal axis and has multiple openings 1513. As such, the grid frame 1510 has a height and a diameter. As an illustration, the height can have a magnitude in a range from about 23 in (about 58 cm) to about 122 in (about 310 cm). As another illustration, the diameter can have a magnitude in a range from about 10 in (about 25.4 cm) to about 73 in (about 185.4 cm). In an example embodiment, the height has a magnitude of about 80 in (about 203.2 cm) and the diameter has a magnitude of about 50 in (about 127 cm). It is noted that the disclosure is not limited to such illustrative magnitudes of height and/or diameter, and other sizes of the grid frame 1510 can be contemplated. Additionally, the grid frame 1510 is not limited to a tubular or cylindrical symmetry, but can be shaped in any configuration suitable for screening, and particularly for carbon retention screening as discussed herein. Grid frame 1510 may also be formed from any material providing sufficient structure for the screening process and sufficient support for the screening cartridges that will be attached to the grid frame 1510. For example, grid frame 1510 may be formed of a metal or metallic alloy, such as stainless steel, or may be a thermoplastic material sufficient to support the screening cartridges. In embodiments featuring a thermoplastic grid frame 1510, the grid frame 1510 may comprise a single injection-molded piece. In other embodiments, the grid frame 1510 may be formed of separable pieces connected together to form the grid frame 1510.

In certain embodiments, the grid frame 1510 can be formed in the desired shape by bending a perforated sheet onto itself, around the longitudinal axis, and joining opposing edges of the perforated sheet. The joined opposing edges can form a longitudinal seam 1515. In some embodiments, the perforated sheet can be formed from a metal or metallic alloy (e.g., stainless steel), and the opposing edges can be joined by welding. In other embodiments, the perforated sheet can be formed from a rigid plastic, and the opposing edges can be joined by laser welding and/or gluing with a suitable adhesive. The multiple openings 1513 in the grid frame 1510 can be arranged in a square lattice, and each one (or, in some embodiments, at least some) of the multiple openings 1513 can have a square shape. Multiple openings 1513 may have shapes other than a square shape, such as a rectangular shape, an ovular shape, a circular shape, and so forth. Moreover, multiple openings 1513 are not required to have a consistent shape throughout the grid frame 1510. For example, some embodiments may feature alternating rectangular openings of varying sizes to form the overall grid frame 1510. In an example embodiment, the multiple openings 1513 can include 264 square openings. A subset of the multiple openings can be defined by longitudinal members 1511 and transversal members 1512. Openings in such a subset may be referred to as inner openings. A second subset of the multiple openings can be defined by longitudinal members 1511 and transversal segments of a first annular section 1512a of the grid frame 1510. Similarly, a third subset of the multiple openings can be defined by longitudinal members 1511 and transversal segments of a second annular section 1512b of the grid frame 1510. The second subset and the third subset of openings can be referred to as outer openings.

The first annular section 1512a and the second annular section 1512b can embody or otherwise can constitute respective opposing end portions of the grid frame 1510, along the longitudinal axis. A flange 1520 can be affixed or otherwise attached to an end of the first annular section 1512a. The flange 1520 can include multiple first openings 1525. The flange 1520 and first openings 1525 can permit or otherwise facilitate mounting a plate or another type of cover on the flange 1520. In addition or in other embodiments, the flange 1520 and first openings 1525 can permit or otherwise facilitate mounting the basket cage 1500 into a screen separator machine (e.g., an NKM vertically swept interstage apparatus, as shown in FIG. 13 and FIG. 14). In addition, a second flange 1530 can be affixed or otherwise attached to the second annular section 1512b. The second flange 1530 can include multiple second openings 1535. The flange 1530 and second openings 1535 can permit or otherwise facilitate mounting the basket cage 1500 into a screen separator machine (e.g., an NKM vertically swept interstage apparatus, as shown in FIG. 13 and FIG. 14), and/or affixing an exterior wiper assembly of the screen separator machine (not shown).

As is illustrated in FIG. 15, the basket cage 1500 can also include an opening in a vicinity of the second end of the grid frame 1510, near the second flange 1530. A pipe member 1540 can be assembled on the vicinity of the opening. The opening and the pipe member 1540 can form an outlet that can permit or otherwise facilitate the egress of a slurry from the interior of the basket cage 1500 when it needs to be drained upon removal.

Figure 16A:
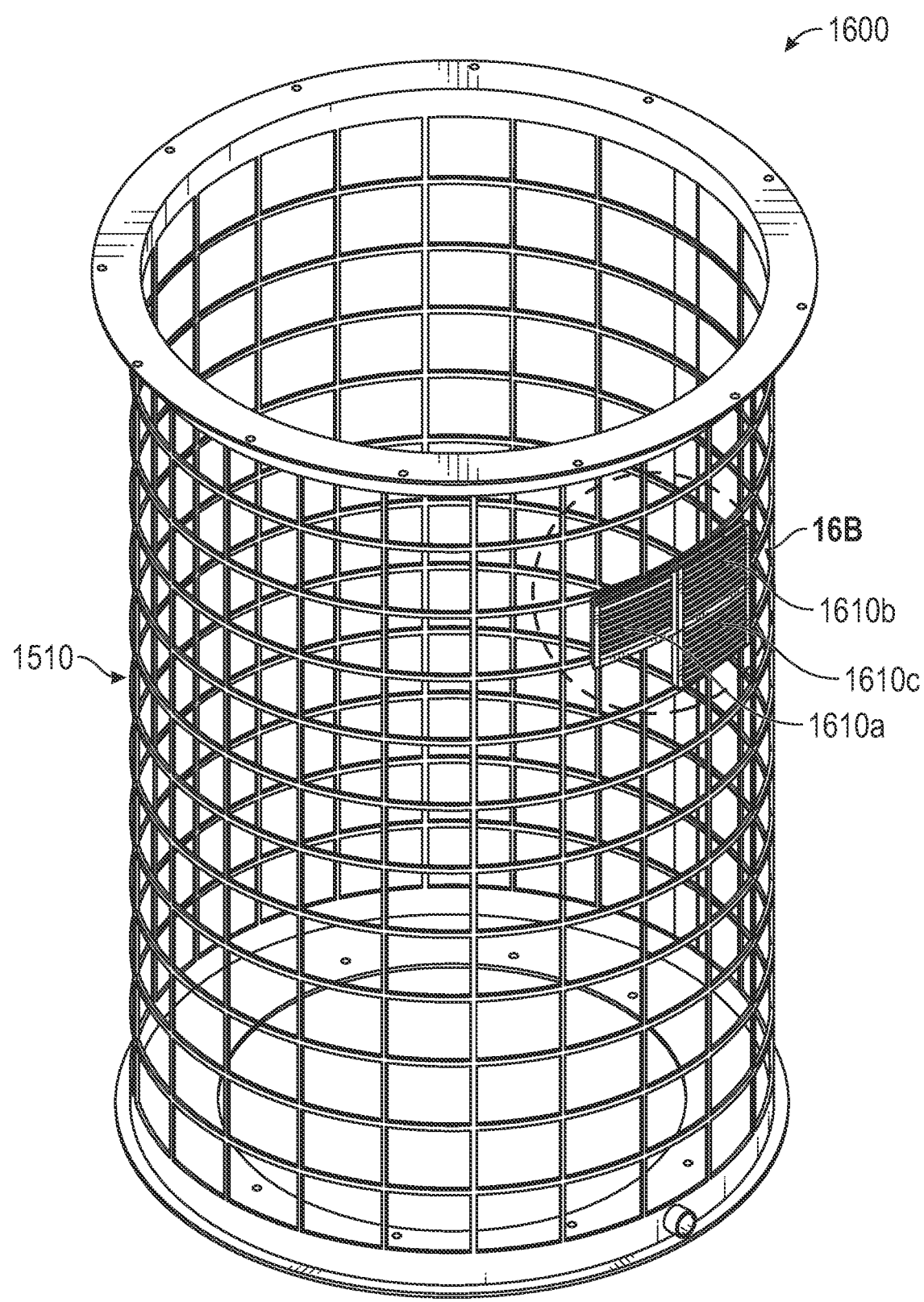
FIG. 16A shows a perspective view of an example screen basket that includes multiple screening cartridge assemblies attached to a basket cage, according to an example embodiment of the present disclosure.

Similar to other screen baskets of this disclosure, the basket cage 1500 in combination with screening elements can be utilized in a separation process to separate specific particulate matter from slurry or another type of fluid source. To that end, in one embodiment, screening cartridge assemblies can be mounted to the basket cage 1500, where the screening cartridge assemblies can permit or otherwise facilitate the separation of specific particulate matter from the slurry. Specifically, as an illustration, FIG. 16A presents a perspective view of an example of a screen basket 1600 that includes multiple screening cartridge assemblies 1610 in accordance with one or more embodiments of the disclosure. The multiple screening cartridge assemblies include a first screening cartridge assembly 1610a, a second screening cartridge assembly 1610b, and a third screening cartridge assembly 1610c. Each one of the screening cartridge assemblies 1610a, 1610b, 1610c can be mounted or otherwise affixed to a respective group of grid members that define, at least in part, a respective opening of the grid frame 1510. Screening cartridge assemblies 1610 may be removable, such that screening cartridge assemblies may be mounted to basket cage 1500 and subsequently removed easily from basket cage 1500 for maintenance or repair, or may be permanently affixed to basket cage 1500. For openings in a row about the longitudinal axis of the grid frame 1510, a group of grid members that support a first one of the screening cartridge assemblies 1610a and 1610b can have a common grid member with another group of grid members that support a second one of the screening cartridge assemblies 1610a and 1610b. More specifically, in one example, the first screening cartridge assembly 1610a can grip or otherwise attach to a first longitudinal member and a second longitudinal member of the grid frame 1510. In addition, the second screening unit 1610b can grip or otherwise attach to the second longitudinal member and a third longitudinal member.

In some embodiments, each one of the multiple screening cartridge assemblies mounted or affixed to the grid frame 1510 includes a screening assembly and a case (or another type of container) configured to receive and hold the screen assembly. In some embodiments, the case can be embodied in a single injection molded piece integrally formed by means of injection molding a thermoplastic polymer (e.g., thermoplastic polyurethane), a thermoset polymer, or other types of polymers. Example embodiments of the injection molded piece and the process of forming the injection molded piece are discussed in more detail in the disclosures of U.S. Pat. Nos. 10,046,363, 9,409,209, 9,884,344, 10,259,013, 10,576,502, U.S. Patent Application Publication No. 2020/0246833, U.S. Patent Application Publication No. 2018/0345319, U.S. Patent Application Publication No. 2019/0076881, and the cross-references included therein, which are hereby incorporated by reference herein in their entireties. The case and screening assembly held therein may be of any shape and structure suitable for mounting to the grid frame. In some embodiments, the case and screening assembly may be substantially rectangular. In other embodiments, the case and screening assembly may have a square shape, or may be of an ovular shape, or may have a triangular shape, or so forth.

Figure 16B:
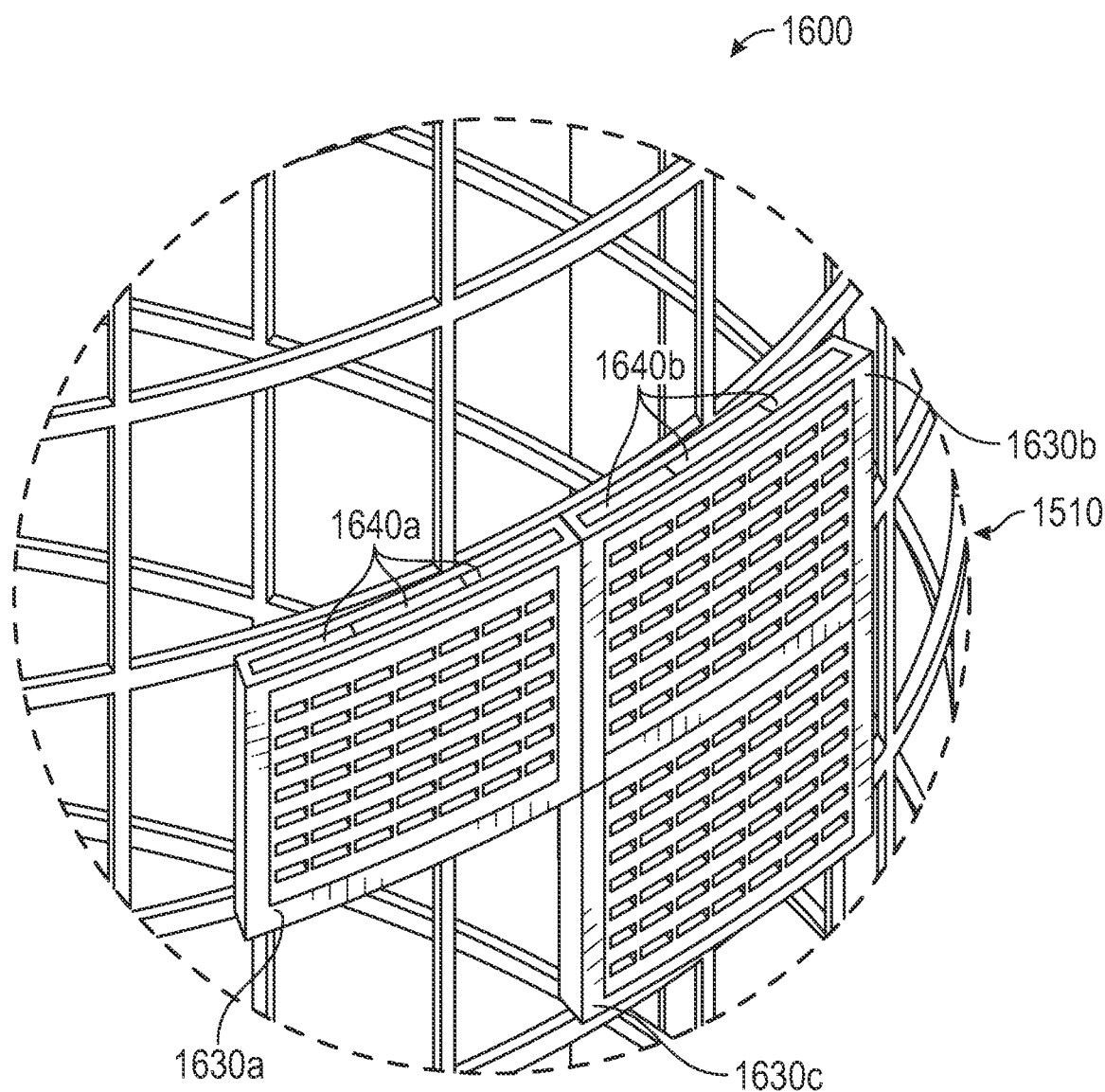
FIG. 16B shows a fragmentary perspective view of the screen basket shown in FIG. 16A, featuring multiple screening cartridge assemblies, according to an example embodiment of the present disclosure.

As is illustrated in FIG. 16B, screening cartridge assembly 1610a includes a case 1630a and a screen assembly having three screen units 1640a. It is noted that the disclosure is not limited to three screen units and, in some embodiments, less or additional screen units can be implemented. For a defined size of a screen unit, a larger number of screen units results in a case 1630a with larger dimensions, thus resulting in a larger screening cartridge assembly. Larger screening cartridge assemblies may be utilized in grid frames having larger grid openings.

Figure 16C:
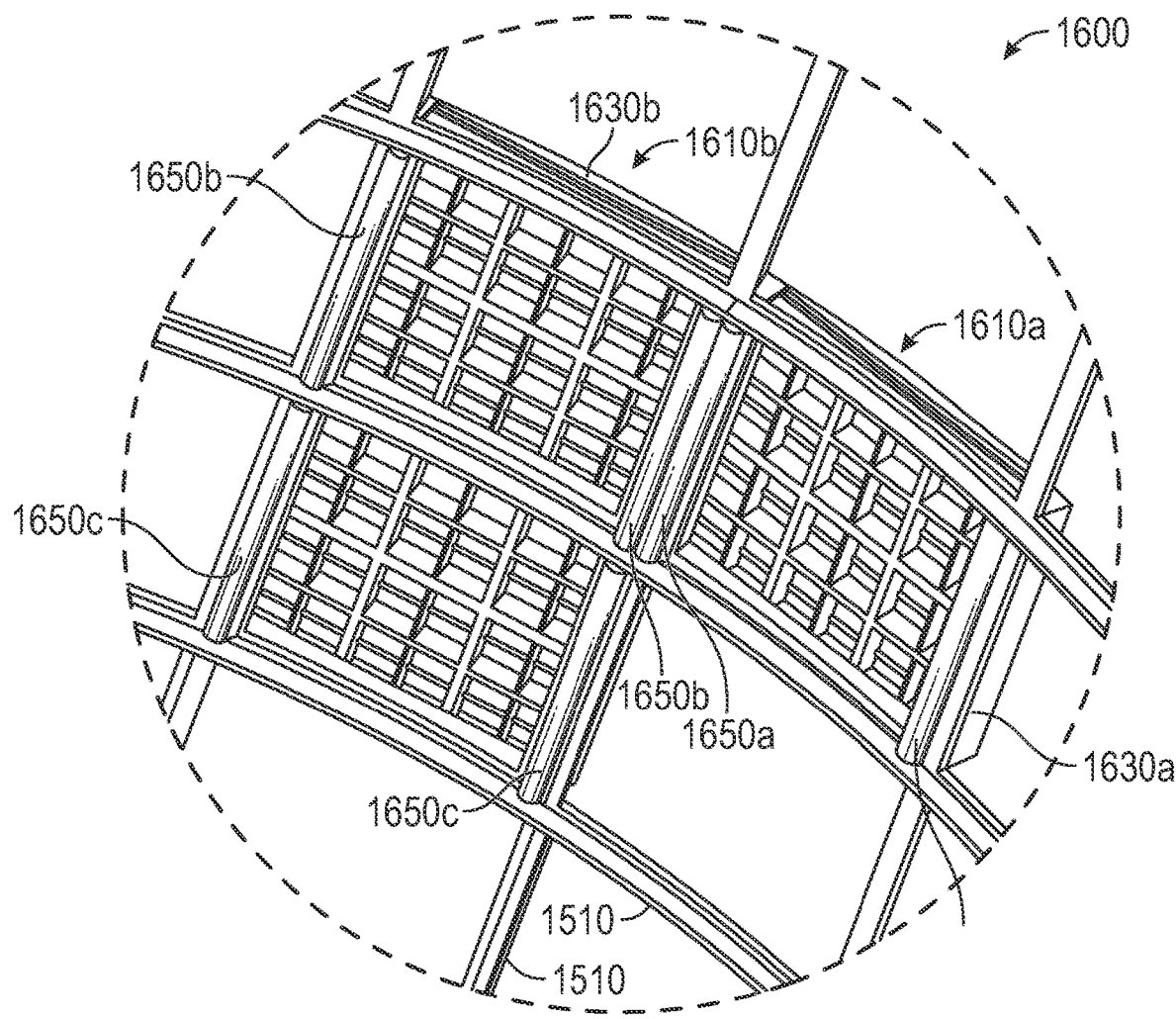
FIG. 16C shows a fragmentary perspective view of an interior portion of the screen basket shown in FIG. 16A, featuring the multiple screening cartridge assemblies, according to an example embodiment of the present disclosure.

The case 1630a includes a first opening configured to receive and/or fit the screen assembly within the case 1630a. The case 1630a also includes a second opening that permits exposing a screening surface of the screen assembly to an exterior of the grid frame 1510. The screening surface can be embodied in or can include, for example, a substantially seamless and planar surface including multiple screening openings having, for example, a substantially uniform size and/or substantially uniform shape. The multiple screening openings can have rectangular shape, square shape, circular shape, a combination thereof, or the like. In addition, as is illustrated in FIG. 16C, the case 1630 also includes ridges 1650a that extend from a first edge of the case 1630a, near the first opening, to an opposing second edge of the case 1630a. The ridges 1650a and respective portions of the case 1630a form respective recesses that permit or otherwise facilitate mounting (e.g., gripping or clipping) the case 1630a to the grid frame 1510. Case 1630a may be permanently mounted to the grid frame 1510 by use of the ridges 1650a and respective portions of the case 1630a, or may be removably mounted to the grid frame 1510, such that the case 1630a may be removed as required for maintenance or repair.

Similarly, screening cartridge assembly 1610b includes a case 1630b and a screen assembly having three screen units 1640b. As mentioned, the disclosure is not limited to three screen units and, in some embodiments, less or additional screen units can be implemented. The case 1630b also includes a first opening configured to receive and/or fit the screen assembly within the case 1630b. The case 1630b also includes a second opening that permits exposing a screening surface of the screen assembly to an exterior of the grid frame 1510. The screening surface can be embodied in or can include, for example, a substantially seamless and planar surface including multiple screening openings having, for example, a substantially uniform size and/or substantially uniform shape. In addition, as is illustrated in FIG. 16C, the case 1630b further includes ridges 1650b that extend from a first edge of the case 1630b, near the first openings, to an opposing second edge of the case 1630b. The ridges 1650b and respective portions of the case 1630b can form respective recesses that permit or otherwise facilitate mounting (e.g., gripping or clipping) the case 1630b to the grid frame 1510. In regard to the screen assembly contained in the case 1630b, as is further illustrated in FIG. 16C and FIG. 17, each one of the screen units 1640b includes a framework unit having one or more screen elements affixed to a surface of the framework unit, and the screen units 1640b can be mechanically joined or otherwise secured together to form the screen assembly. To that end, each one of the screen units 1640, such as is illustrated with reference to 1640b, can include one or more fasteners that can permit or otherwise facilitate fastening a first one of the screen units (e.g., screen unit 1640a) to a second one of the screen units (e.g., 1640b). Regardless of the mechanism for adjoining the screen units 1640b, the respective screen elements of the screen units 1640 can form the screening surface that can be exposed to slurry in the exterior of the grid frame 1510.

In some embodiments, each one (or, in other embodiments, at least one) of the screen elements can be embodied in a single injection molded piece integrally formed by means of injection molding of a thermoplastic material. Example thermoplastic materials and the processes of creating the example thermoplastic materials used as the screen elements in the present disclosure are discussed in detail in the disclosures of U.S. Pat. Nos. 10,046,363, 9,409,209, 9,884,344, 10,259,013, 10,576,502, U.S. Patent Application Publication No. 2020/0246833, U.S. Patent Application Publication No. 2018/0345319, U.S. Patent Application Publication No. 2019/0076881, and the cross-references included therein, which are incorporated by reference herein in their entireties.

Figure 17:
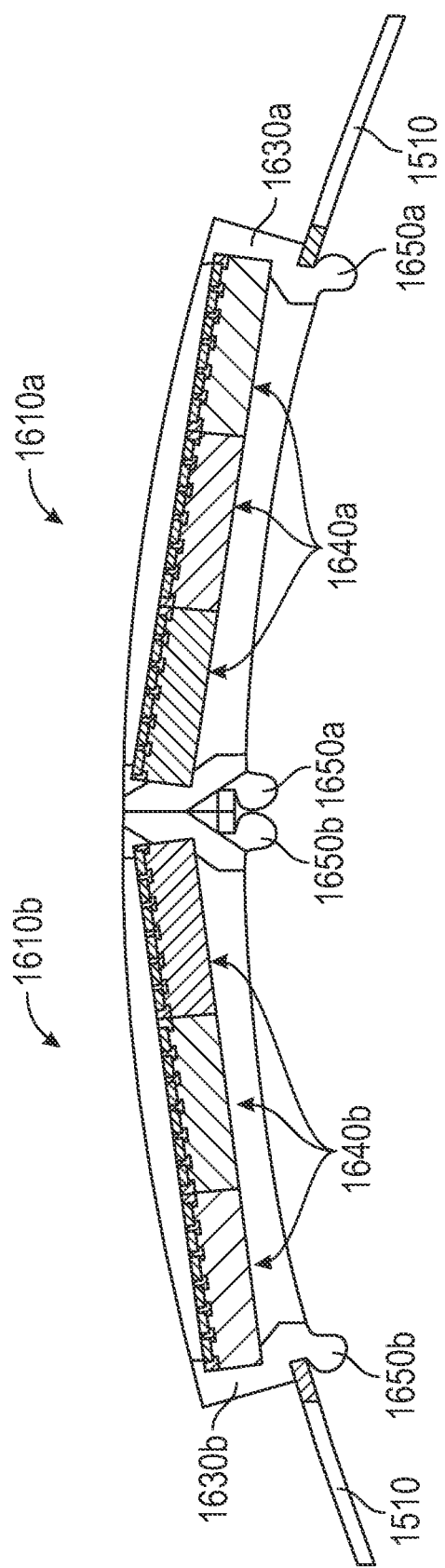
FIG. 17 shows a fragmentary cross-sectional view of example screening cartridge assemblies mounted on a grid frame, according to an example embodiment of the present disclosure.

Screening cartridge assembly 1610c, like screening cartridge assemblies 1610a, 1610b, also includes a case 1630c and screen assembly having three screen units (not depicted in FIG. 16B). As mentioned, the disclosure is not limited to three screen units and, in some embodiments, less or additional screen units can be implemented. The case 1630c also includes a first opening configured to receive and/or fit the screen assembly within the case 1630c. The case 1630c also includes a second opening that permits or otherwise facilitates exposing a screening surface of the screen assembly to an exterior of the grid frame 1510. The screening surface can be embodied in or can include, for example, a substantially seamless and planar surface including multiple screening openings having, for example, a substantially uniform size and/or substantially uniform shape. In addition, as is illustrated in FIG. 16C, the case 1630c further includes ridges 1650c that extend from a first edge of the case 1630c, near the first opening, to an opposing second edge of the case 1630c. The ridges 1650c and respective portions of the case 1630c form respective recesses that permit or otherwise facilitate mounting (e.g., gripping or clipping) the case 1630c to the grid frame 1510. FIG. 17 illustrates the mechanical coupling of the screening cartridge assembly 1610a and the screening cartridge assembly 1610b to transversal grid members of the grid frame 1510. As mentioned, ridges 1650a permit or otherwise facilitate mounting the screening cartridge assembly 1610a to the grid frame 1510. Likewise, ridges 1650b permit or otherwise facilitate mounting the screening cartridge assembly 1610b to the grid frame 1510.

The screening cartridge assembly 1610a and the screening cartridge assembly 1610b include respective screen assemblies. The screen assembly contained in the cartridge assembly 1610a includes three screen units 1640a in accordance with embodiments described herein. The other screen assembly contained in the cartridge assembly 1610b also includes three screen units in accordance with embodiments described herein. As mentioned, the disclosure is not limited to screen assemblies having three screen units and, in some embodiments, less or additional screen units can be implemented. Screen assemblies having different number of screen units also can be implemented.

In connection with the screen assembly contained in the case 1630c, as is further illustrated in FIG. 16C, each one of the screen units that constitutes the screen assembly includes a framework unit having a screen element affixed to a surface of the framework unit. The screen units can be mechanically joined or otherwise secured together to form the screen assembly. To that end, in an embodiment, each one of the screen units can include one or more fasteners that can permit or otherwise facilitate fastening a first one of the screen units to a second one of the screen units. Regardless of the mechanism for adjoining the screen units, the respective screen elements of the screen units 1640 can form the screening surface that can be exposed to the exterior of the grid frame 1510.

It is noted that while three screening cartridge assemblies are illustrated in FIGS. 16A to 16C and FIG. 17, the entirety or substantially the entirety of the grid frame 1510 of the screen basket 1600 can be covered for operation in a separation process. As such, in an example embodiment, 264 screening cartridge assemblies can be mounted to the respective 264 square openings 1513 in an embodiment of grid frame 1510.

Figure 18A:
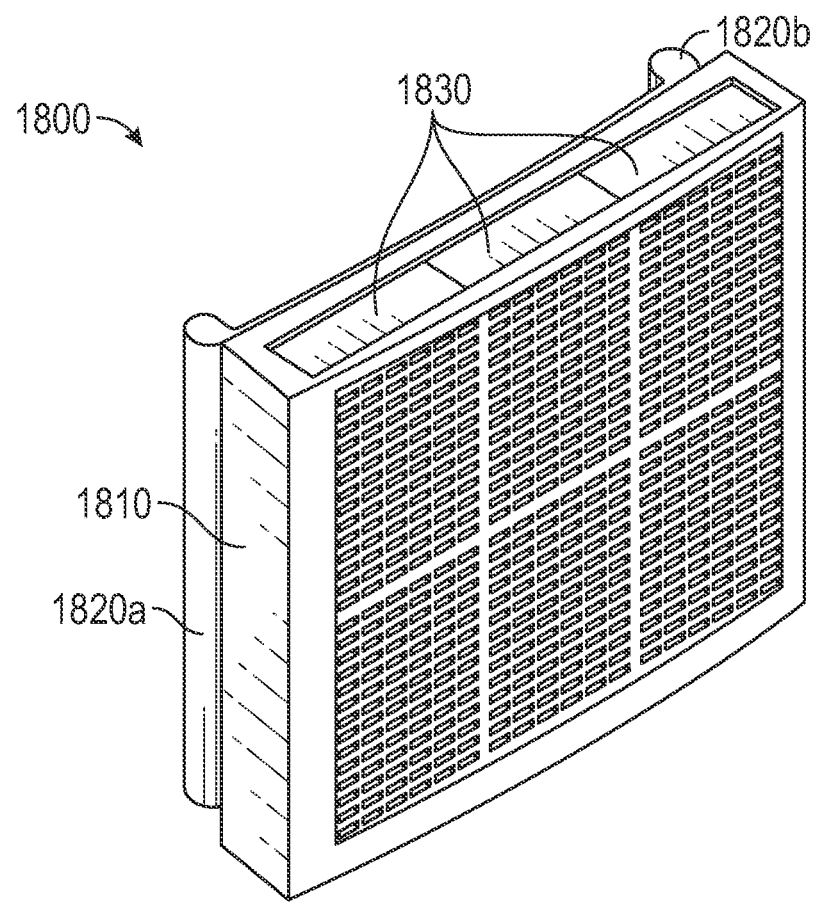
FIG. 18A shows a perspective view of an example of a screening cartridge assembly, according to an example embodiment of the present disclosure.

FIG. 18A illustrates a perspective view of an example of a screening cartridge assembly 1800, in accordance with one or more embodiments of the present disclosure. The exemplified screening cartridge assembly 1800 includes a case 1810 and a screen assembly having three screen units 1830. As mentioned, the disclosure is not limited to three screen units and, in some embodiments, less or additional screen units can be implemented. The case 1810 has a generally arcuate shape, and includes a first opening configured to receive and/or fit the screen assembly within the case 1810. The case also includes a first ridge 1820a and a second ridge 1820b. Each one of the ridge 1820a and the ridge 1820b extends from a vicinity of a first, top edge of the case 1810 to a vicinity of an opposing second, bottom edge of the case 1810. In use, the arcuate shape of case 1810 allow for a substantially consistent distance between the external propulsion blades of the screening apparatus and the screening cartridge assembly, thereby reducing clogging and elongating the life of the screen elements.

Figure 18B:
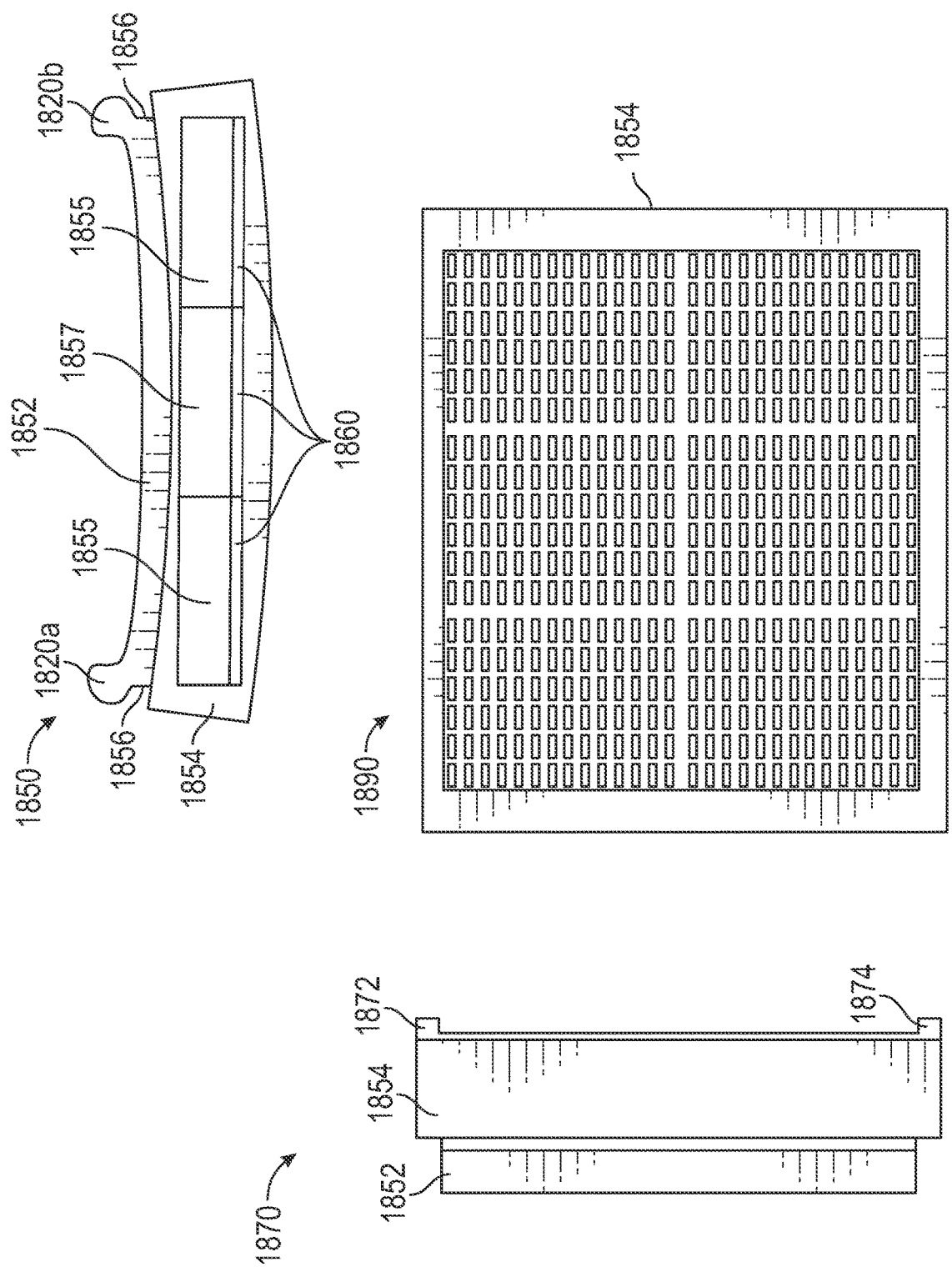
FIG. 18B shows cross-sectional and side views of the example screening cartridge assembly shown in FIG. 18A. Example dimensions, in units of inches, are presented in the views. The disclosure is not limited to such dimensions, and other dimensions can be contemplated.

Similar to other screening cartridge assemblies of this disclosure, as is illustrated in the top cross-sectional view 1850 of screening cartridge assembly 1800 shown in FIG. 18B, each one of the screen units 1830 can include two end framework units 1855 and a single medial framework unit 1857, each of the two end framework units 1855 and the single medial framework unit 1857 having a screen element 1860 affixed to a respective surface of the framework units.

The screen units 1830 can be mechanically joined or otherwise secured together to form the screen assembly. To that end, in an embodiment, each one of the screen units 1830 can include one or more fasteners that can permit or otherwise facilitate fastening a first one of the screen units 1830 to a second one of the screen units 1830. Regardless of the mechanism for adjoining the screen units, the respective screen elements of the screen units 1830 can form a screening surface of the screening cartridge assembly 1800. The case 1810 also includes an opening that permits exposing at least a portion of the screening surface, as is shown in the side view 1890 of screening cartridge assembly 1800 in FIG. 18B.

As is illustrated in the cross-sectional views 1850 and 1870 shown in FIG. 18B, the case 1810 can include an attachment frame section 1852 and a holder frame section 1854. The attachment frame section 1852 and the holder frame section 1854 are also illustrated in the perspective view of the case 1810 shown in FIG. 19A. The holder frame section 1854 can receive and/or hold the screen assembly formed by screen units 1830. To that end, in some embodiments, the holder frame section 1854 includes an opening 1910, and internal sidewalls including sidewall 1920, sidewall 1930, and sidewall 1940. Other internal sidewalls are not visible in the perspective view of FIG. 19A. For instance, as is shown in the cross-sectional view 1950 of case 1810 shown in FIG. 19B, a sidewall 1960 opposite the sidewall 1920 and a sidewall 1980 opposite the sidewall 1930 also are included in the internal sidewalls of the holder frame section 1854. The sidewall 1920, in connection with sidewalls 1930 and 1980, can define a first opening, and the opposing sidewall 1960, in connection with sidewalls 1930 and 1980, can define a second opening. The second opening can have a cross-sectional area greater than the cross-sectional area of the first opening in order to mitigate undesired reduction of screening area. The smaller cross-section can provide greater mechanical stability for a screen assembly arranged within the case 1810. The first opening and the second opening can permit the flow of particulate matter from the exterior to the interior of a screening cartridge assembly including the case 1810. The particulate matter can be screened or otherwise separated by such a screen assembly. Specifically, the particulate matter can be separated from slurry external to a screen basket apparatus having a screening cartridge assembly including the screen assembly, and can flow to an internal region of the screen basket apparatus as intended or required for the screening application (e.g., CIL process, CIP process, ore treatment, water desalinization, or the like).

Figure 19A:
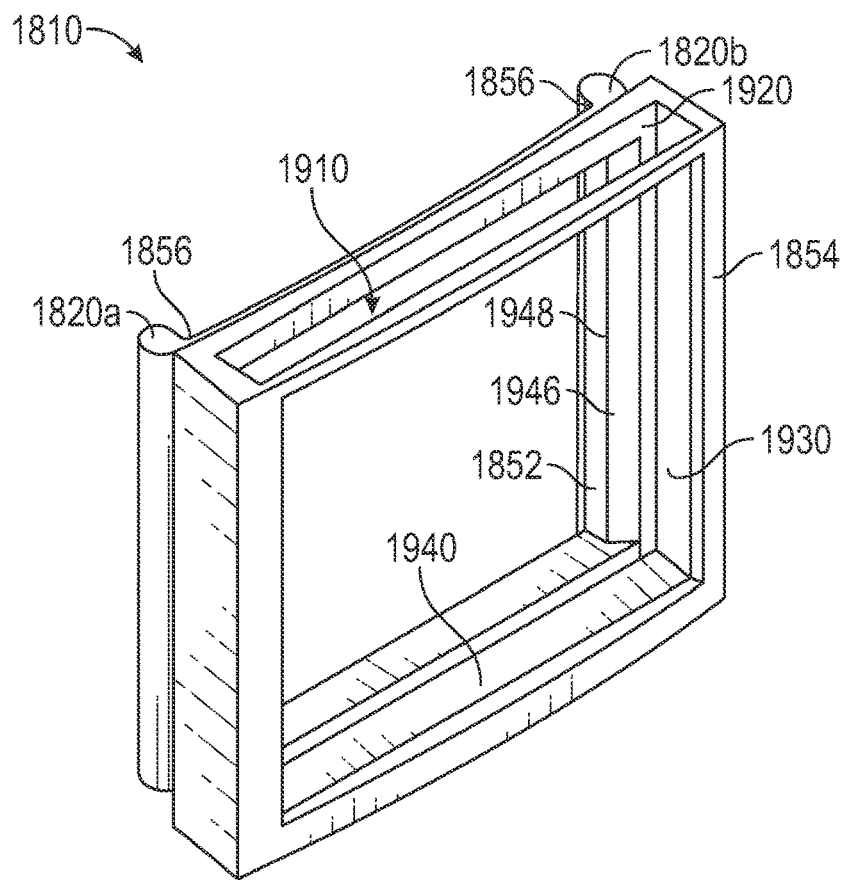
FIG. 19A shows a perspective view of an example of a case of a screening cartridge assembly, according to an example embodiment of the present disclosure.
Figure 19B:
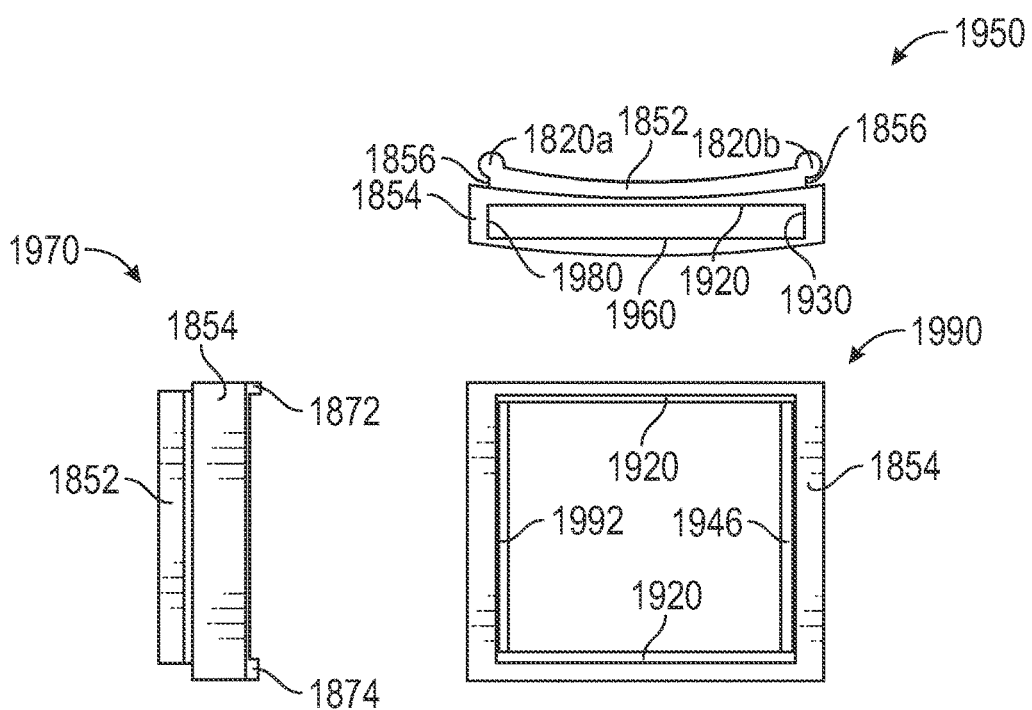
FIG. 19B shows cross-sectional and side views of the example case shown in FIG. 19A. Example dimensions, in units of inches, are presented in the views. The disclosure is not limited to such dimensions, and other dimensions can be contemplated.

As is further illustrated in cross-sectional views 1870 and 1970 in FIG. 18B and FIG. 19B, respectively, the holder frame section 1854 can include a ridge 1872 near the opening configured to receive a screen assembly, and a ridge 1874 near a base of the case 1810.

In addition, with further reference to FIG. 19A, the attachment frame section 1852 includes internal sidewalls, including sidewall 1946 and sidewall 1948, as well as other sidewalls respectively opposite thereto. One of such opposing sidewalls can be gleaned in the side view 1990 in FIG. 19B. Specifically, sidewall 1992 is opposite sidewall 1946. The attachment frame section 1852 also includes the ridge

Figure 19C:
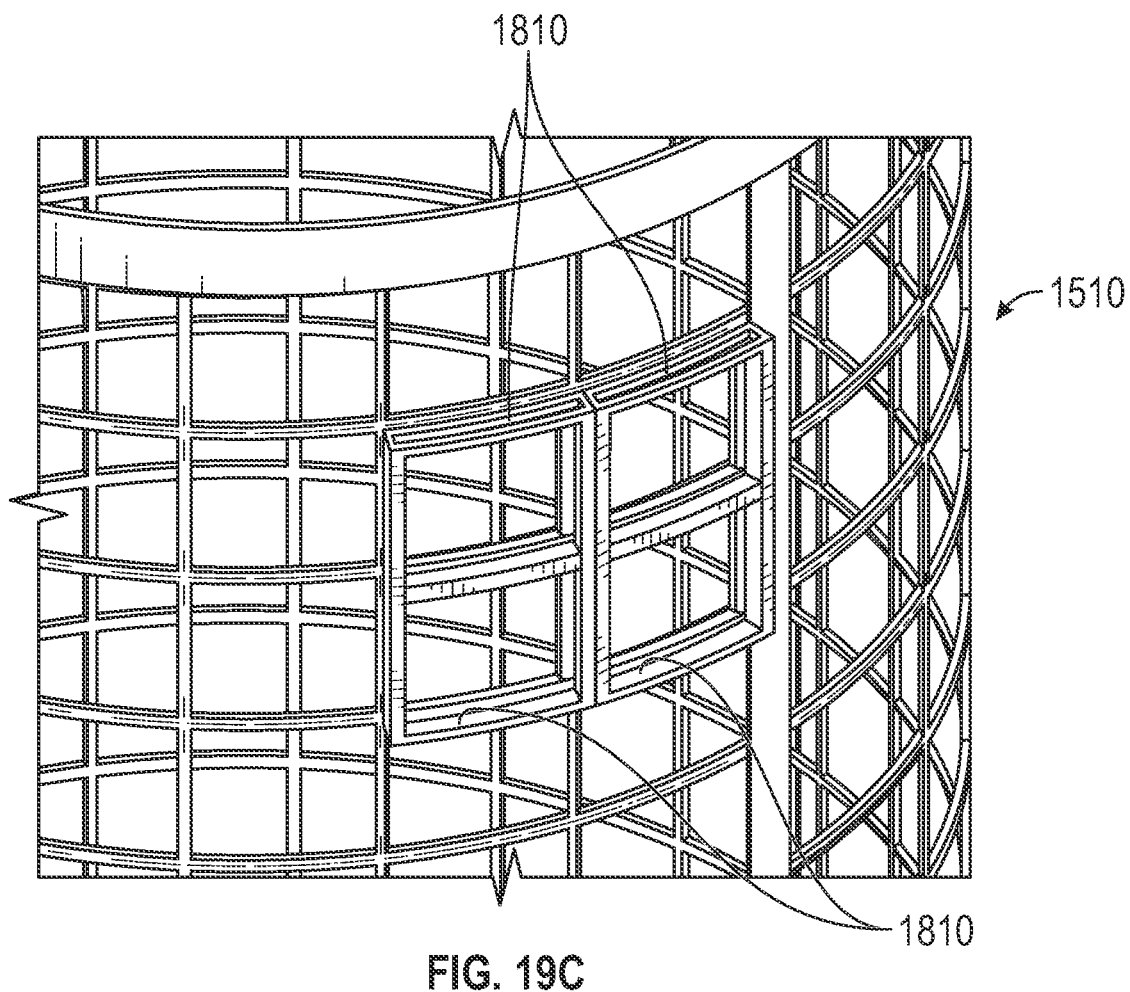
FIG. 19C illustrates an example of multiple cases affixed to a grid frame of a basket cage, according to an example embodiment of the present disclosure.

1820*a* and the ridge 1820*b*. In one embodiment, the ridge 1820*a* and the ridge 1820*b* and respective portions of the attachment frame section 1852 form respective recesses 1856. Such recesses, as mentioned, can permit or otherwise facilitate mounting (e.g., clipping, clutching, or otherwise engaging) the screening cartridge assembly 1800 to a grid frame of this disclosure, such as grid frame 1510 disclosed hereinbefore. As an illustration, FIG. 19C presents four cases 1810 mounted adjacent to each one another on a grid frame 1510. Respective four screen assemblies can be inserted or otherwise fitted into the four cases 1810 in order to form four screening cartridges and assemble a screen basket for numerous separation processes, such as CIL process, CIP process, water filtration and desalinization, and the like.

Figure 20A:
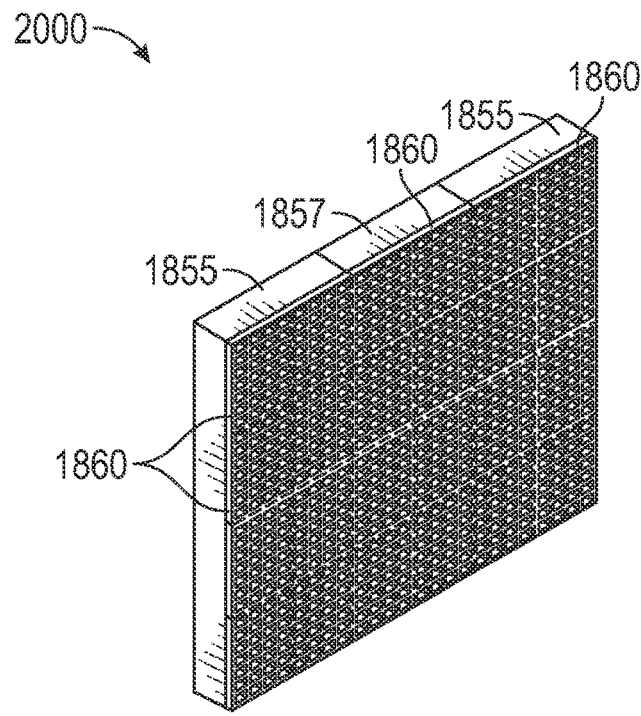
FIG. 20A shows an example of a screen assembly element, according to an example embodiment of the present disclosure.

FIG. 20A illustrates an example of a screen assembly 2000 in accordance with one or more embodiments of the disclosure. The exemplified screen assembly 2000 can be arranged or otherwise fitted within a case 1810 or any other case described herein in order to form a screening cartridge assembly in accordance with this disclosure. Consistent with other screen assemblies disclosed herein, the screen assembly 2000 includes three framework units, which may include two end framework units 1855 and a single medial framework unit 1857, each of the end framework units 1855 and medial framework unit 1857 including screen elements 1860 affixed thereto. The disclosure is not limited to three framework units 1855, 1857 and/or a specific number of screen elements 1860 per framework unit 1855, 1857. In some embodiments, two screen elements 1860 may be affixed thereto to each of three framework units 1855, 1857. In some embodiments, less or additional framework units 1855, 1857 and/or screen elements 1860 can be implemented. Each one (or, in some embodiments, at least one) of the framework units 1855, 1857 can be embodied in a single injection molded piece integrally formed by means of injection molding of a polymer. The framework units 1855, 1857 can be mechanically joined or otherwise secured together to form the screen assembly 2000. To that end, in an embodiment, each one of the framework units 1855, 1857 can include one or more fasteners that can permit or otherwise facilitate fastening a first one of the framework units 1855, 1857 to a second one of the framework units 1855, 1857. Regardless of the mechanism that is utilized or otherwise relied upon to join framework units, the joined framework units 1855, 1857 form a first segmented edge member and an opposing second segmented edge member (not visible in FIG. 20A). The joined framework units 1855, 1857 also includes a first monolithic edge member and a second monolithic edge member (not visible in FIG. 20A) corresponding, respectively, to edge members of the outer framework units 1855, 1857.

Figure 20B:
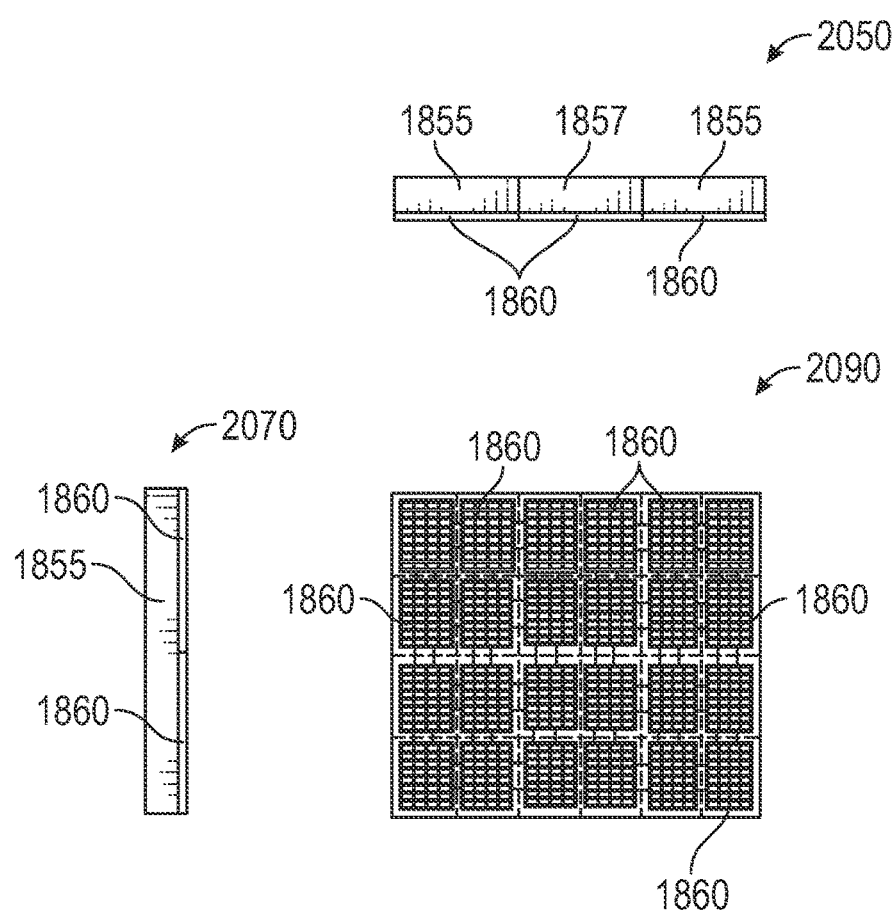
FIG. 20B illustrates cross-sectional and side views of the example screen assembly element shown in FIG. 20A. Example dimensions, in units of inches, are presented in the views. The disclosure is not limited to such dimensions, and other dimensions can be contemplated.

Screen elements 1860 affixed to each one of the framework units 1855, 1857 can form a screening surface of the screen assembly 2000 and a screening cartridge assembly that includes the screen assembly 2000. The screening surface can be essentially seamless, as is illustrated in cross-sectional views 2050 and 2070 of screen assembly 2000 in FIG. 20B. In some embodiments, as is illustrated in the side view 2090 of screen assembly 2000 in FIG. 20B, each one (or, in other embodiments, at least one) of the screen elements 1860 can include four adjacent sections having respective groups of screening openings. Such sections may be separated by support members (represented with dashed lines in the plan view 2090). The disclosure is not limited to screen elements having four sections and, in some embodiments, less or additional sections having screening openings can be implemented.

Figure 21A:
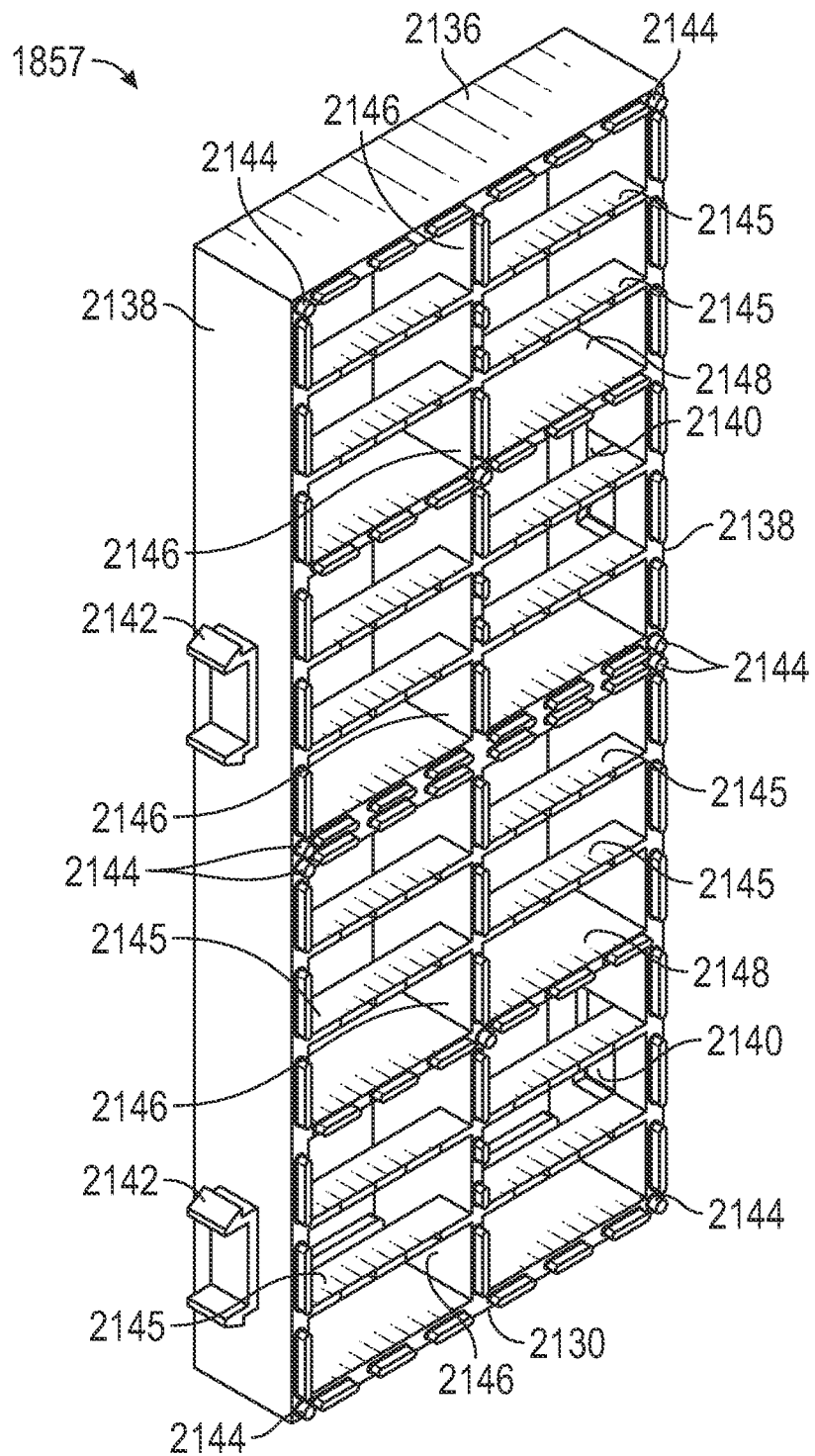
FIG. 21A shows a perspective view of an example of a framework unit of a screen assembly, according to an example embodiment of the present disclosure.

FIG. 21A illustrates a perspective view of medial framework unit 1857 in accordance with one or more embodiments of the disclosure. The medial framework unit 1857 is elongated, and includes longitudinal side members 2138 opposite and substantially parallel to one another. The medial framework unit 1857 also includes transversal side members 2136 opposite and substantially parallel to one another. Each one of the transversal side member 2136 is substantially perpendicular to the longitudinal side members 2138. As mentioned, the medial framework unit 1857 can include fastening mechanisms that permit or otherwise facilitate mechanically joining or otherwise securing together the medial framework unit 1857 and another framework unit (either an end framework unit 1855 or a medial framework unit 1857). Specifically, in some embodiments, the fastening mechanisms can be assembled or otherwise formed on respective portions of the longitudinal side members 2138, with the transversal side members 2136 free from fastening mechanisms. As is illustrated in FIG. 21A, in at least one of such embodiments, the fastening mechanisms can be embodied in or can include clips 2142 and clip apertures 2140. The medial framework unit 1857 and another framework unit (e.g., end framework unit 1855) also having clips 2142 and clip apertures 2140 can be mechanically joined or otherwise secured together along their respective longitudinal side members 2138. To that end, in one embodiment, a clip 2142 of the medial framework unit 1857 can be passed into a clip aperture 2140 of the other framework unit until extended members of the clip 2142 extend beyond the clip aperture 2140 and a longitudinal side member of the other framework unit. As the clip 2142 is pushed into the clip aperture 2140, extended members of the clip 2142 can be forced together until a clipping portion of each extended member is beyond the longitudinal side member of the other framework unit, allowing the clipping portions to engage an interior portion of the longitudinal side member of the other framework unit. When the clipping portions are engaged into the clip aperture 2140, longitudinal side members of two independent framework units can be side by side and secured together (e.g., mechanically joined). The framework units can be separated by applying a force to the extended members of the clips such that the extended members are moved towards each other allowing for the clipping portions to pass out of the clip aperture 2140. Although the fasteners described herein and shown in drawings are clips and clip apertures, the disclosure is not limited in that respect and alternative fasteners and alternative forms of clips and/or apertures can be used, including other mechanical arrangements, adhesives, etc.

The medial framework unit 1857 also includes longitudinal support members 2146 and transversal support members 2148. Each one of the longitudinal support members 2146 is substantially parallel to longitudinal side members 2138 and is substantially perpendicular to the transversal side members 2136. Each one of the transversal support member 2148 is substantially parallel to transversal side members 2136 and is substantially perpendicular to the longitudinal support members 2146. The longitudinal support members 2146 and transversal support members 2148 define, at least in part, multiple grid openings within the medial framework unit 1857. In addition, the longitudinal support members 2146 and the transversal support members 2148 can provide mechanical stability to a screen element that is affixed to the medial framework unit 1857.

Figure 21B:
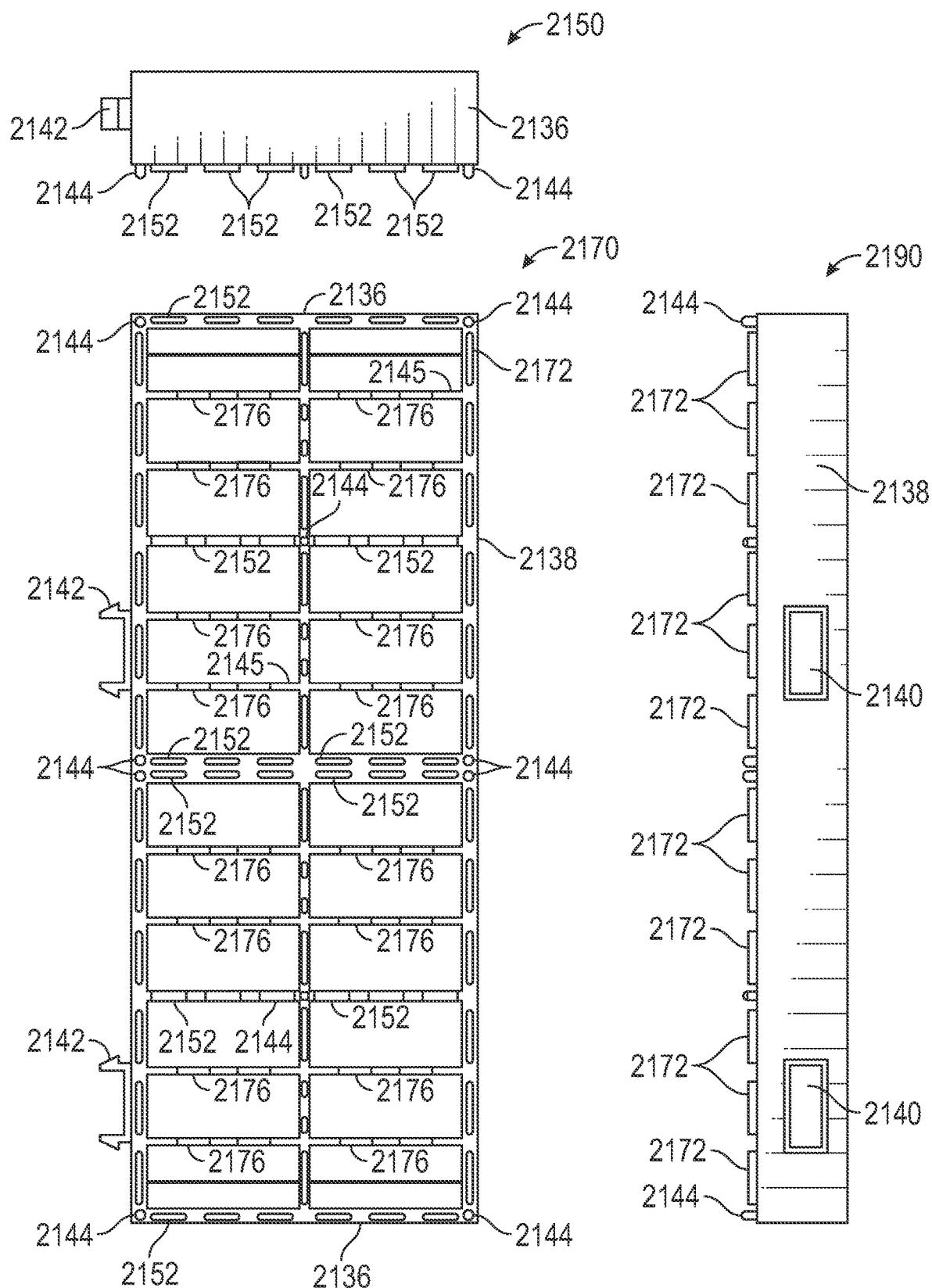
FIG. 21B shows top and side views of the example framework unit shown in FIG. 21A.

The medial framework unit 1857 also can include second transversal support members 2145 substantially perpendicular to the longitudinal side members 2138. As is illustrated in FIG. 21A and the side view 2170 in FIG. 21B, the second transversal support members 2145 can be distributed across the grid openings in the medial framework unit 1857. The second transversal support members 2145 can provide further mechanical stability to the screen element that is affixed to the medial framework unit 1857.

In order to permit or otherwise facilitate affixing one or more screen elements to the medial framework unit 1857, attachment members 2144 and several adhesion arrangements are included in the medial framework unit 1857. As is illustrated in side view 2190 of medial framework unit 1857 shown in FIG. 21B, a first adhesion arrangement includes multiple fusion bars 2172 assembled (e.g., formed) on surfaces of the longitudinal side members 2138. As is shown in the top view 2150 of medial framework unit 1857 of FIG. 21B, a second adhesion arrangement includes multiple fusion bars 2152 assembled (e.g., formed) on surfaces of the transversal side members 2136 and transversal support members 2148. As is shown in the side view 2170 of medial framework unit 1857 of FIG. 21B, a third adhesion arrangement includes multiple fusion bars 2176. In some embodiments, fusion bars 2176 can have a height that is less than a height of the fusion bars 2172, and also less than a height of the fusion bars 2152.

In some embodiments, the attachment members 2144 can permit or otherwise facilitate aligning a screen element for laser welding to the medial framework unit 1857 or another type of framework unit disclosed herein. The attachment members 2144 and/or the various fusion bars can be melted during laser welding.

End framework units 1855 can have similar structure to that of a medial framework unit 1857. Fastening mechanisms in an end framework unit 1855 can be included in a single longitudinal side member of the framework unit 1855.

Figure 22A:
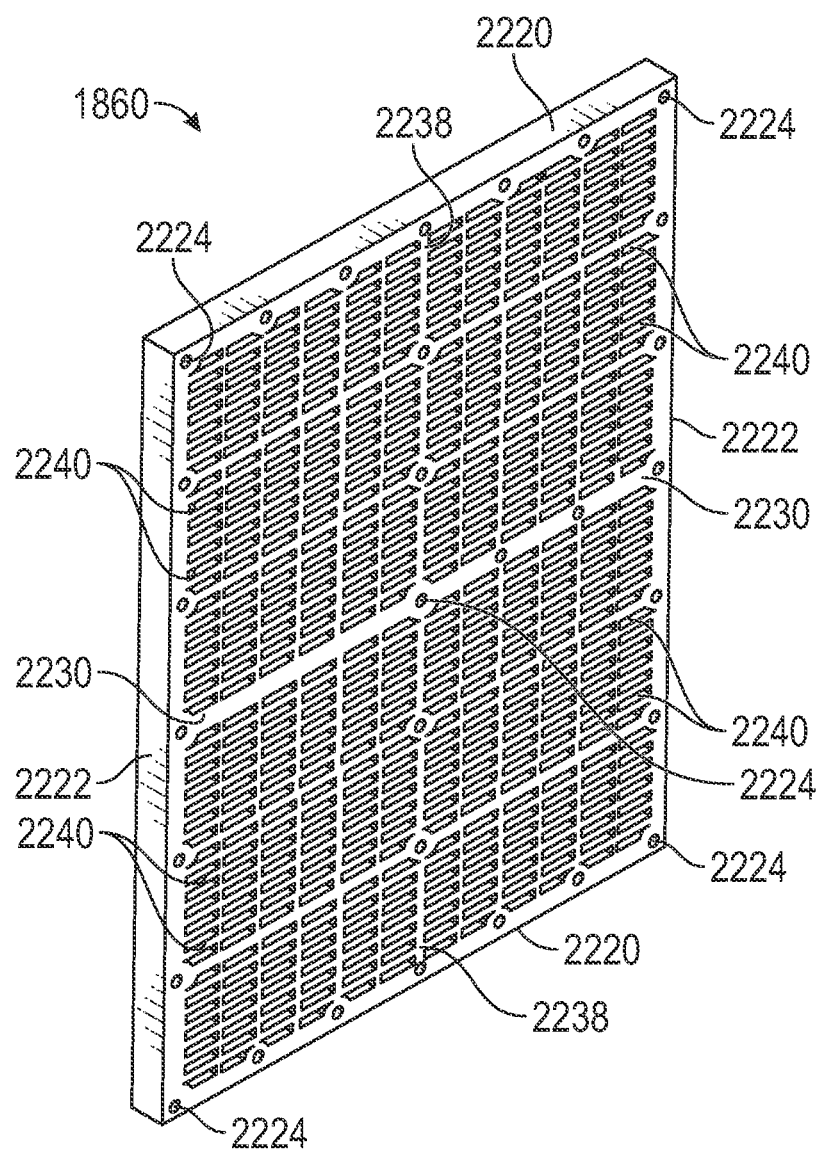
FIG. 22A shows an example of a screen element of a screen assembly, according to an example embodiment of the present disclosure.

In some embodiments, a screen element can be embodied in or can include the screen element 1860 as is illustrated in FIG. 22A. The screen element 1860 includes first side portions 2220 and second side portions 2222 that form a seamless periphery. The first side portions 2220 are substantially parallel to one another, and each one of the first side portions 2220 is substantially perpendicular to the second side portions 2222. Similarly, the second side portions 2222 are substantially parallel to one another, and each one of the second side portions 2222 is substantially perpendicular to the first side portions 2220. Each one of the side portions 2220 is configured to rest on and be affixed to transversal side members (e.g., members 2136) of a framework unit 1855, 1857 (e.g., medial framework unit 1857) in accordance with embodiments of this disclosure. As such, each one of the side portions 2220 can include cavities configured to receive or otherwise engage fusion bars on a surface of the transversal side members. Similarly, side portions 2222 are configured to rest on longitudinal side members of a framework unit 1855, 1857 (e.g., framework unit 1857) in accordance with this disclosure. Thus, each one of the side portions 2222 includes cavities configured to receive or otherwise engage fusion bars on a respective surface of the longitudinal side members.

The screen element 1860 also includes several support members. More specifically, the screen element 1860 includes support members 2230 and support members 2238. Support members 2230 are substantially collinear and substantially perpendicular to support members 2238. Support members 2238 also are substantially collinear. The screen element 1860 also includes supports members 2240 that extend from a first one of the side portions 2222 to a second one of the second side portions 2222. Each one of the support members 2230, 2238, and 2240 are configured to rest on or be affixed to respective support members of a framework unit 1855, 1857, such as medial framework unit 1857. Thus, each one of the support members 2230, 2238, and 2240 includes cavities configured to receive or otherwise engage fusion bars on a respective surface of support members of the framework unit.

The screen element 1860 further includes attachment apertures 2224. One of the attachment apertures 2224 is positioned essentially at the center of the screen element 1860. Other attachment apertures 2224 are positioned at respective corners of the seamless periphery of the screen element 1860. Regardless of position in the screen element 1860, each one (or, in some embodiments, at least one) of the attachment apertures 2224 is configured to permit or otherwise facilitate passage of an elongated attachment member 2144 (e.g., see FIG. 21A) can pass through the attachment aperture 2224. In one or more of such embodiments, the attachment apertures 2224 may include a tapered bore that may be filled when a portion of the elongated attachment member 2144 above a screening surface of the screen element 1860 is melted, fastening screen element 1860 to the medial framework unit 1857 or to another type of framework unit disclosed herein. In other embodiments, the attachment apertures 2224 can be configured without a tapered bore, permitting formation of a bead on a screening surface 2013 of the screen element 1860 when a portion of an elongated attachment member 2144 above such a screening surface is melted, fastening the screen element 1860 to the medial framework unit 1857 or to another type of framework unit disclosed herein. The screen element 1860 can cover a half portion of the medial framework unit 1857 (or another type of framework unit disclosed herein), and each one of the four sections included in the screen element 1860 can respectively cover four grid openings of the medial framework unit 1857.

The screening surface 2213 has multiple screening openings. Each one (or, in some embodiments, at least some) of the multiple screening opening can be elongated and can have a defined length L and defined width W (e.g., see FIG. 22C and related description below) having respective magnitudes based on the screening application (e.g., CIL process, CIP process, ore treatment, water desalinization, or the like) in which the screen element 1860 is utilized.

Figure 22B:
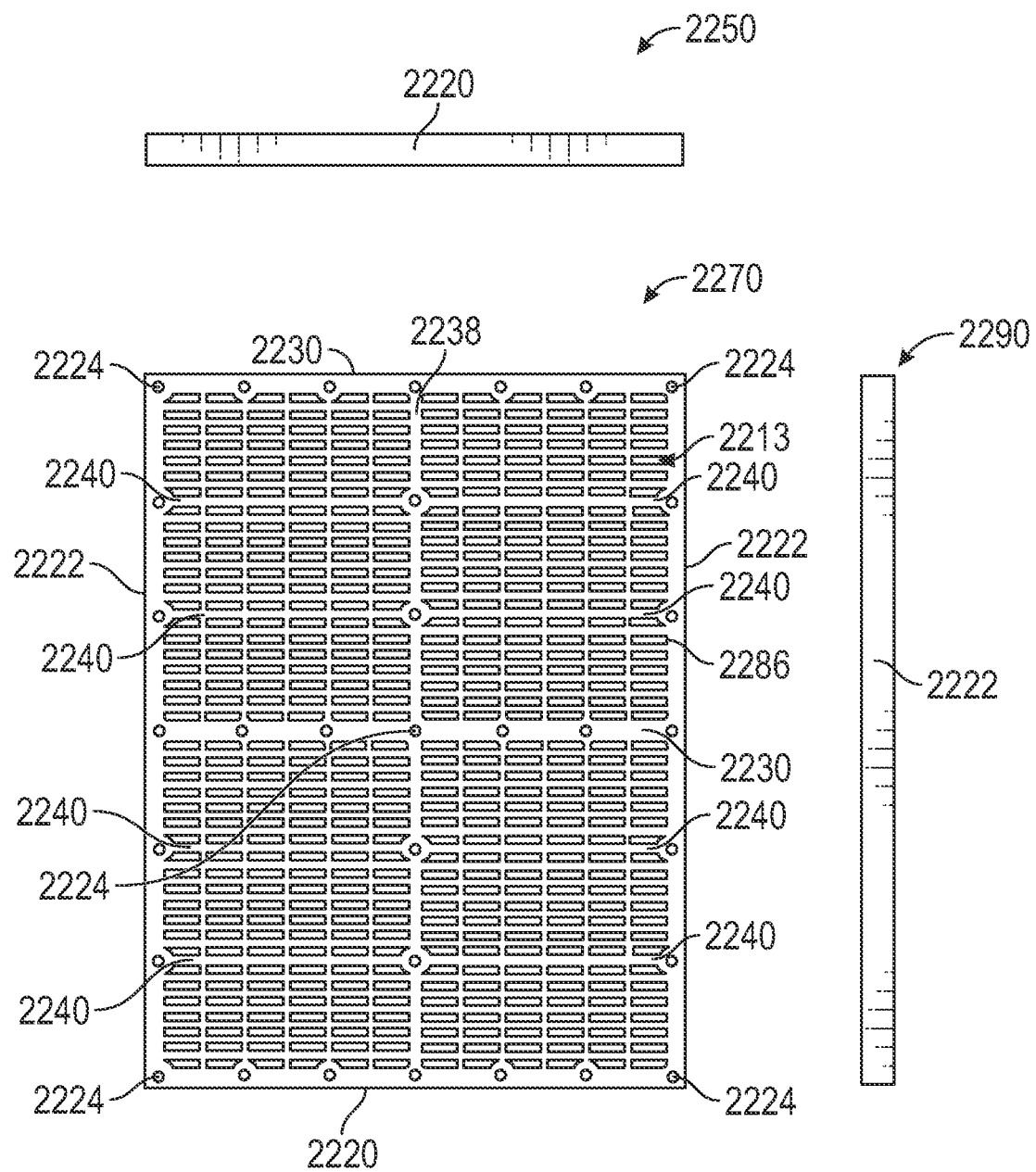
FIG. 22B shows top and side views of the example screen element shown in FIG. 22A.

As is illustrated in FIG. 22A and FIG. 22B (depicting top and side views 2250, 2270, and 2290 of screen element 1860), the multiple openings can be arranged in sections, with screening openings in a section arranged in a lattice. Each one of the sections is defined, at least in part, by support members 2230, 2238, and 2240 of the screen element 1860. In one embodiment, screening openings that are adjacent to a periphery of the screen element 1860 can be defined by longitudinal bars parallel to first side portions of the screen element 1860, transversal bars perpendicular to the longitudinal bars, and segments of edges of side portions of the screen element 1860. In addition, screen openings that are in the interior portion of a section can be defined by longitudinal bars and transversal bars. Longitudinal bars define a major side of the elongated openings, and transversal bars define a minor side of elongated openings.

Figure 22C:
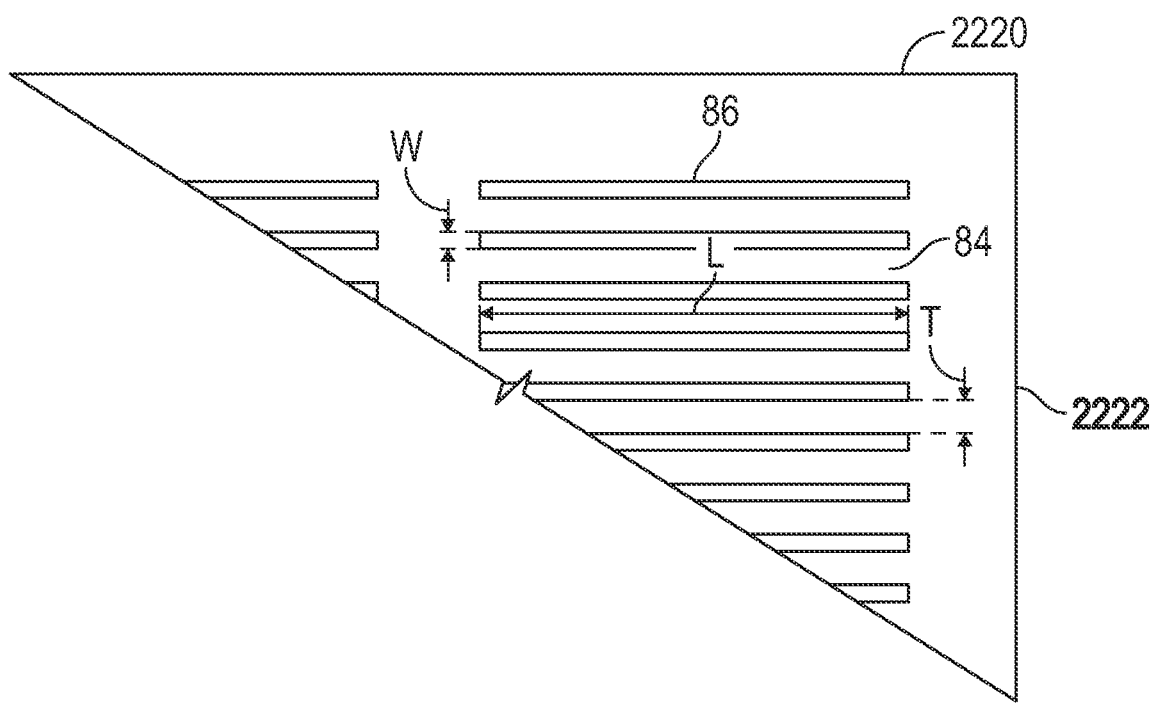
FIG. 22C is an enlarged top view of a portion of a screen element, according to an example embodiment of the present disclosure.

FIG. 22C is an enlarged top view of a portion of a screen element, according to an example embodiment of the present disclosure. FIG. 22C illustrates features common to various screens of the disclosure, such as screen 1860 shown in FIGS. 22A and 22B. As shown in FIG. 22C, a screen element includes surface elements 84 running parallel to the screen element end portions 2220 and forming screening openings 86. Surface elements 84 have a thickness T, which may vary depending on the screening application and configuration of the screening openings 86. In this example, screening openings 86 are elongated slots having a length L and a width W, which may be varied for a chosen configuration. Thickness T of surface elements 84 may be approximately 43 µm to approximately 1000 µm (i.e., 0.0017 inches to 0.0394 inches) depending on the open screening area desired and the width W of screening openings 86.

In some embodiments, the multiple screening openings may have a substantially uniform length L having a magnitude in a range from about 300 µm to 4000 µm (i.e., 0.0118 inches to 0.1575 inches). In addition, the multiple screening openings may have a substantially uniform width W having a magnitude in a range from about 35 µm to about 4000 µm (i.e., 0.0014 inches to 0.1575 inches). As an illustration, in some embodiments, the magnitude of width W may be approximately equal to one of 43 µm (i.e., 0.0017 inches), 74 µm (i.e., 0.0029 inches), 90 µm (i.e., 0.0035 inches), 104 µm (i.e., 0.0041 inches), 125 µm (i.e., 0.0049 inches), 150 µm (i.e., 0.0059 inches), 180 µm (i.e., 0.0071 inches), 500 µm (i.e., 0.0197 inches), 700 µm (i.e., 0.0276 inches), or 1000 µm (i.e., 0.0394 inches=1 mm). In an example embodiment, the multiple screening openings may have a substantially uniform length L having a magnitude of about 500 µm (i.e., 0.0197 inches).

Table 1 (below) illustrates several example configurations of surface elements 84 and screening openings 86.

TABLE 1

| Example # | L (in) | W (in) | T (in) |
|---|---|---|---|
| 1 | 0.1295 | 0.0182 | 0.0283 |
| 2 | 0.1295 | 0.0214 | 0.0252 |
| 3 | 0.1295 | 0.0262 | 0.0241 |

Table 2 (below) illustrates further example configurations of surface elements 84 and screening openings 86.

TABLE 2

| Screen Size | Opening (in) W | Slot Length (in) L | Bar Thickness (in) T |
|---|---|---|---|
| 500 µm | 0.0197 | 0.1230 | 0.0271 |
| 500 LP µm | 0.0197 | 0.1816 | 0.0251 |
| 650 µm | 0.0256 | 0.1244 | 0.0301 |
| 700 µm | 0.0276 | 0.1244 | 0.0360 |
| 700 LS µm | 0.0276 | 0.2009 | 0.0360 |
| 700 LP µm | 0.0276 | 0.1991 | 0.0384 |
| 700 SQ. µm | 0.0276 | 0.0276 | 0.0128 |
| 800 µm | 0.0315 | 0.1244 | 0.0315 |
| 850 µm | 0.0331 | 0.1245 | 0.0296 |
| 900 µm | 0.0354 | 0.1244 | 0.0269 |
| 1000 µm | 0.0394 | 0.2015 | 0.0506 |
| 1200 µm | 0.0472 | 0.1862 | 0.0414 |

As indicated above, the screen opening size can range from about 35 to about 4000 microns. Exemplary ranges for screen opening sizes include without limitation about 50 to about 3000 microns, or about 100 to about 2500 microns, or about 200 to about 2000 microns, or about 500 to about 1200 microns. Further exemplary ranges for screen opening sizes include about 35 to about 200 microns, about 200 to about 400 microns, about 400 to about 600 microns, about 600 to about 800 microns, about 800 to about 1000 microns, about 1000 to about 1200 microns, about 1200 to about 1400 microns, about 1400 to about 1600 microns, about 1600 to about 1800 microns, about 1800 to about 2000 microns, about 2000 to about 2400 microns, about 2400 to about 2800 microns, about 2800 to about 3200 microns, about 3200 to about 3600 microns, and about 3600 to about 4000 microns. In embodiments, when smaller size opening are needed, e.g. 35 to about 200 microns, for a thermoplastic injection molded screening surface, it can be helpful to micro-mold smaller screen elements, e.g. 1" by 6" pieces, and then assembly them together with subgrids or other support structures to form a screening surface. This is beneficial for maximizing total open screening area on a particular screening surface.

In certain embodiments, the openings W can have approximately the same size as the thickness T of the bars that separate the openings. This can assist with structural support and rigidity for synthetic screening surfaces that are configured to separate carbon or resin from a slurry of a carbon-in-leach, carbon-in-pulp, resin-in-leach, or resin-in-pulp (or other similar slurry) material as fluid flows from outside the screen basket apparatus to inside the screen basket apparatus due at least in part to a static pressure differential between fluid outside relative to fluid inside the screen basket apparatus, such that carbon or resin is retained on an external surface of the synthetic screening surface. Further orientation of the of elongated slots can be configured such that a wiper apparatus rotating around the circumference of a screen basket helps to move fluid through and across slot lengths.

Figure 23A:
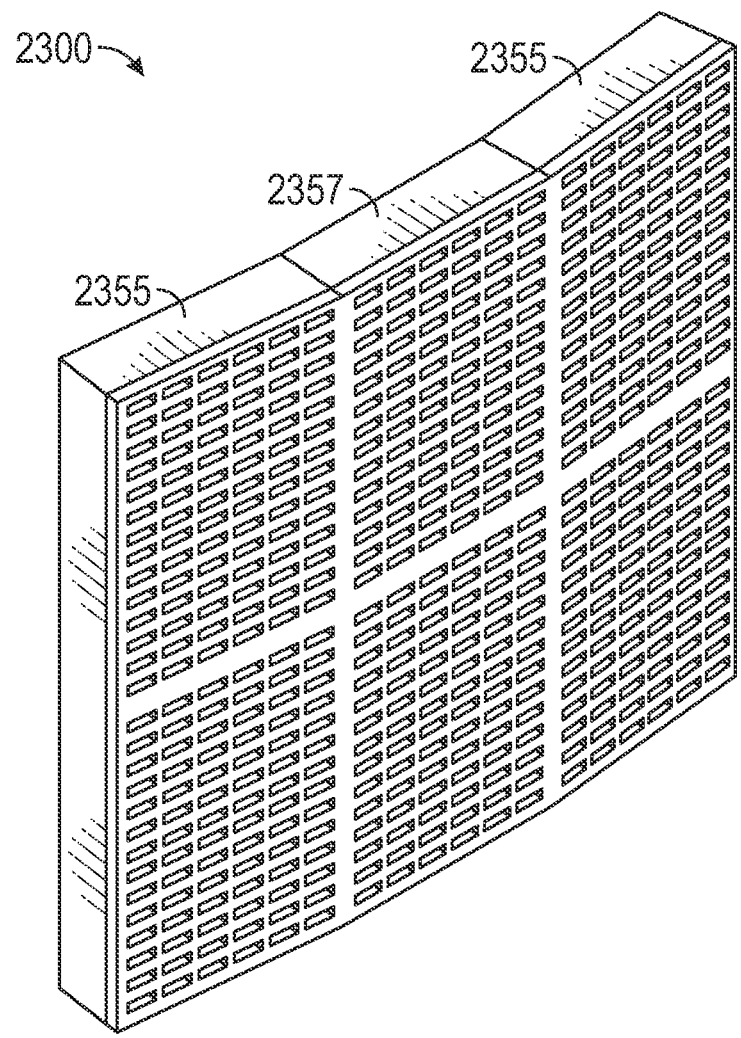
FIG. 23A shows another example of a screen assembly element, according to an example embodiment of the present disclosure.
Figure 23B:
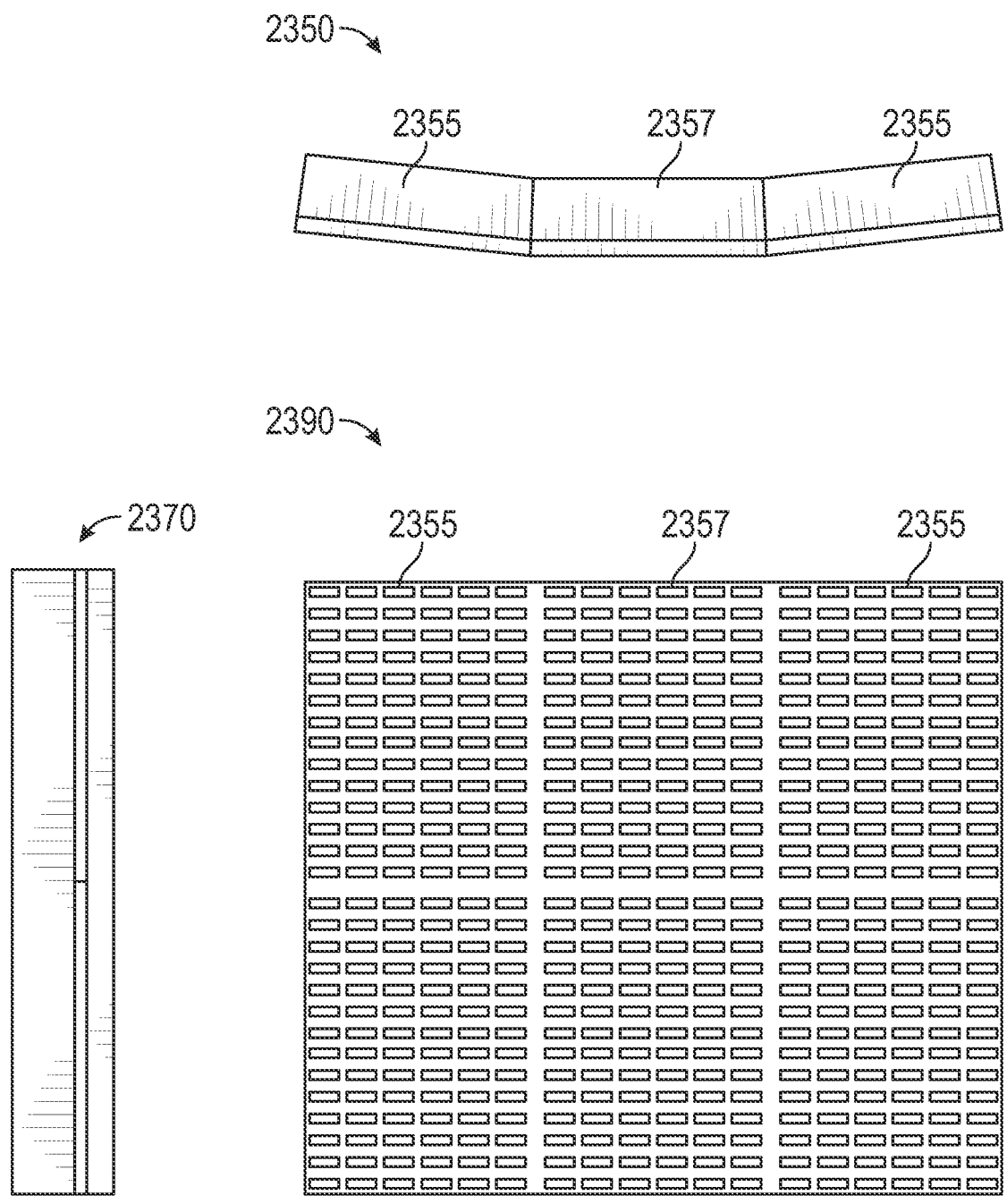
FIG. 23B shows side views of the example screen assembly element shown in FIG. 23A.

As is illustrated in FIGS. 23A and 23B, some embodiments may include fastening mechanisms in framework units (either medial framework units 2357 or end framework units 2355) that can permit or otherwise facilitate assembling a screen assembly 2300 that has certain curvature. In one of such embodiments, the fastening mechanisms can include clips and clip apertures such that the screen assembly 2300 that is assembled is curved rather than substantially planar, as shown in the side views 2350, 2570, and 2390 of curved screen assembly 2300 shown in FIG. 23B.

Figure 24:
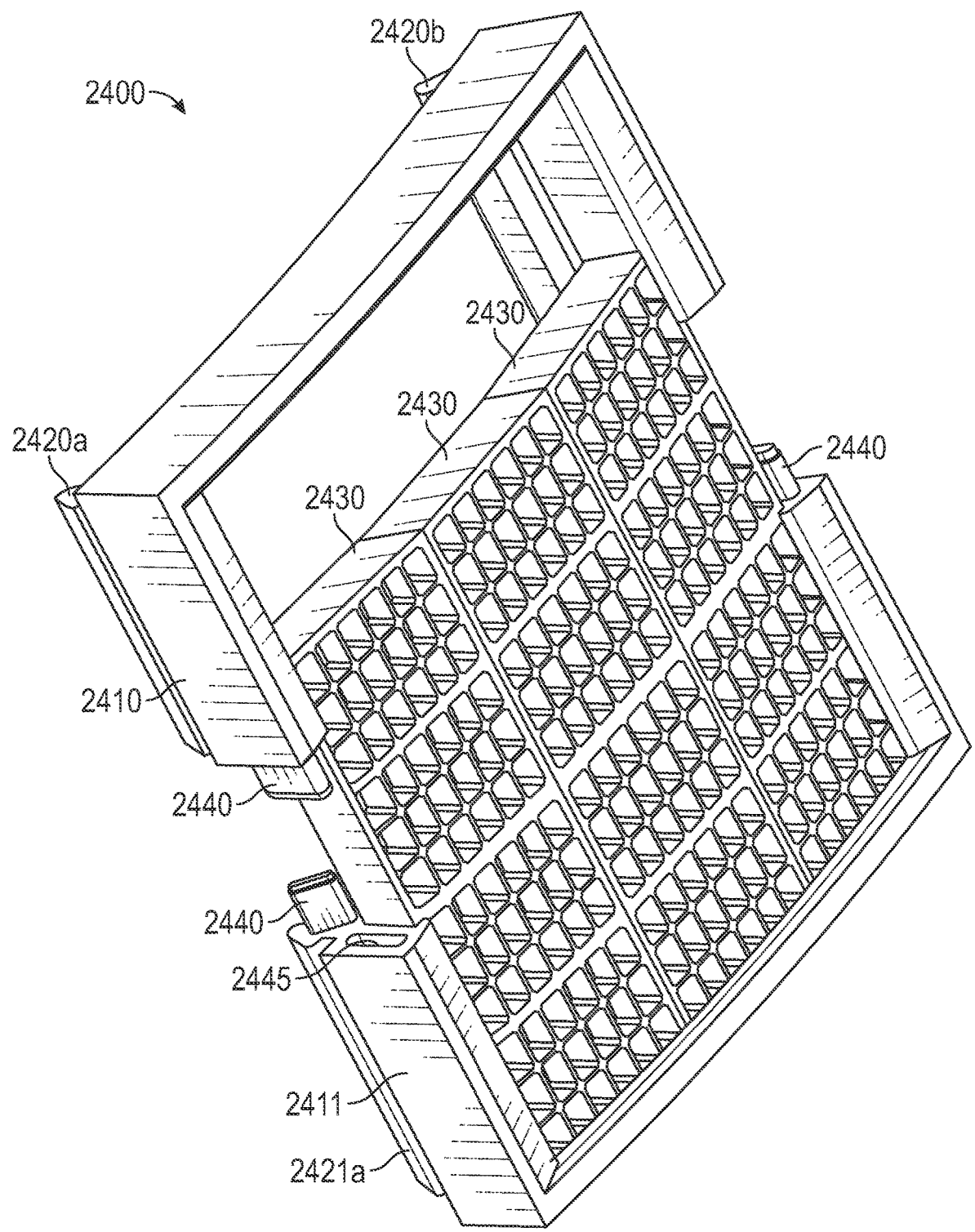
FIG. 24 shows an example of a cartridge screen element, according to an example embodiment of the present disclosure.
Figure 25:
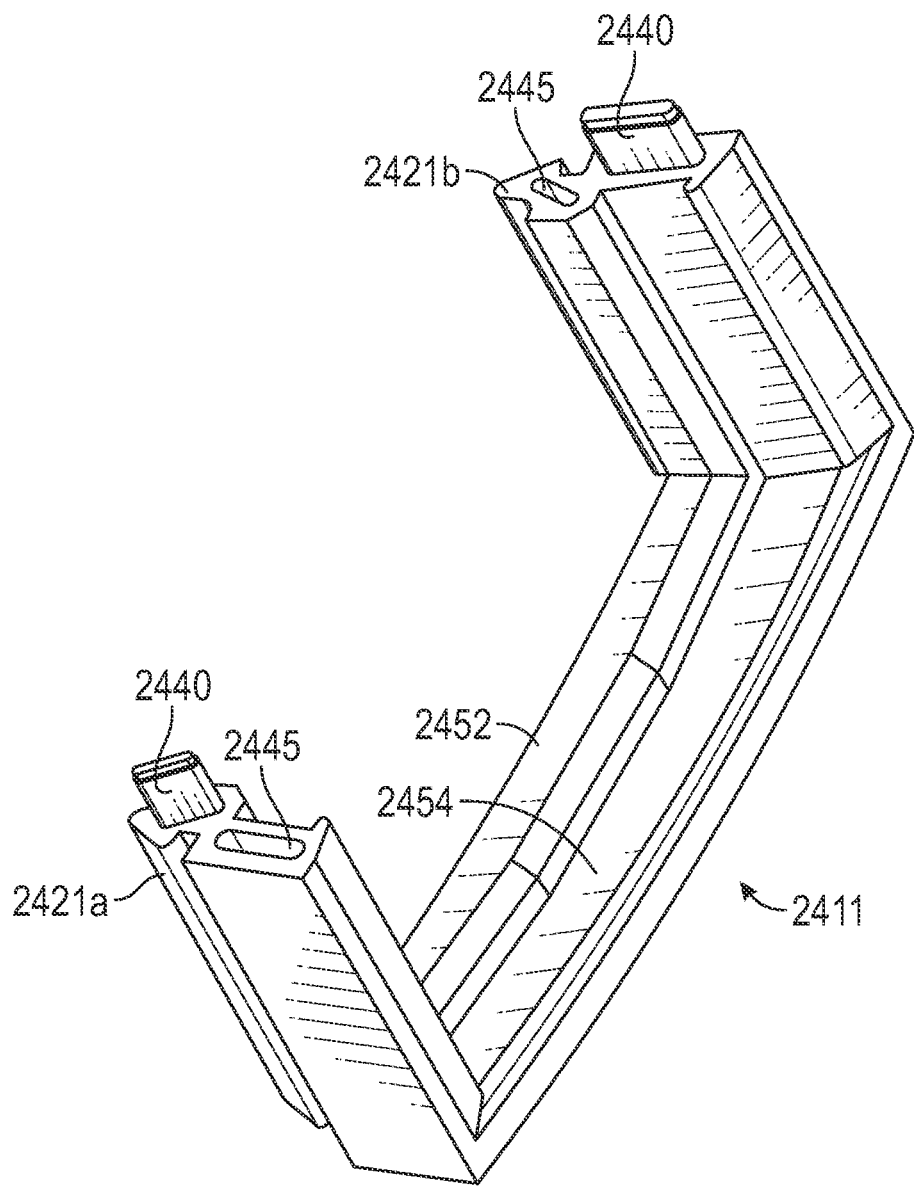
FIG. 25 shows an example of a bottom case portion of the cartridge screen element shown in FIG. 25.

FIG. 24 and FIG. 25 illustrate an alternative embodiment of a cartridge assembly 2400 for use in a screening basket of the disclosure. Cartridge assembly 2400 includes a detachable case with top case portion 2410 and a separate bottom case portion 2411. Top case portion 2410 and bottom case portion 2411 each include attachment mechanisms 2440 that may be detachably engaged with apertures 2445 featured on the top case portion 2410 and bottom case portion 2411. In use, screen assembly having screen units 2430 may be fitted into a top or bottom case portion 2410, 2411, and the opposing case portion may then be fitted around the screen assembly with screening units 2430. Attachment mechanisms 2440 engage the apertures 2445, securing the screen assembly with screening units 2430 securely within the case.

Detachable case with top case portion 2410 and bottom case portion 2411 includes substantially the same features as case 1810 discussed herein, including an attachment frame section, holder frame section, and ridges. As shown in the perspective view of bottom case portion 2411 illustrated in FIG. 25, attachment frame section 2452 includes internal sidewalls and attachment ridges 2420a and 2420b permit or otherwise facilitate mounting (e.g., clipping, clutching, or otherwise engaging) the screening cartridge assembly 2410 to a grid frame of this disclosure, such as grid frame 1510. Holder frame section 2454 can receive and/or hold the screen assembly formed by screen units, in a manner substantially similar to that of holder frame section 1854 of case 1800 discussed in more detail herein.

Top case portion 2410 and bottom case portion 2411 may each be formed of a single injection molded piece integrally formed by means of injection molding a polyurethane, a thermoset polymer, or other types of polymer. Due to the relative simplicity of separate top case portion 2410 and bottom case portion 2411, as related to a single case (such as case 1810), the top case portion 2410 and bottom case portion 2411 may more easily be created by an injection-molding process. Example embodiments of the injection molded process are discussed in more detail in the disclosures of U.S. patent application Ser. No. 13/800,826, U.S. Pat. Nos. 9,409,209, 9,884,344, U.S. patent application Ser. No. 15/851,009, U.S. patent application Ser. No. 15/965,195, and the cross-references included therein, which are incorporated by reference herein in their entireties.

Figure 26A:
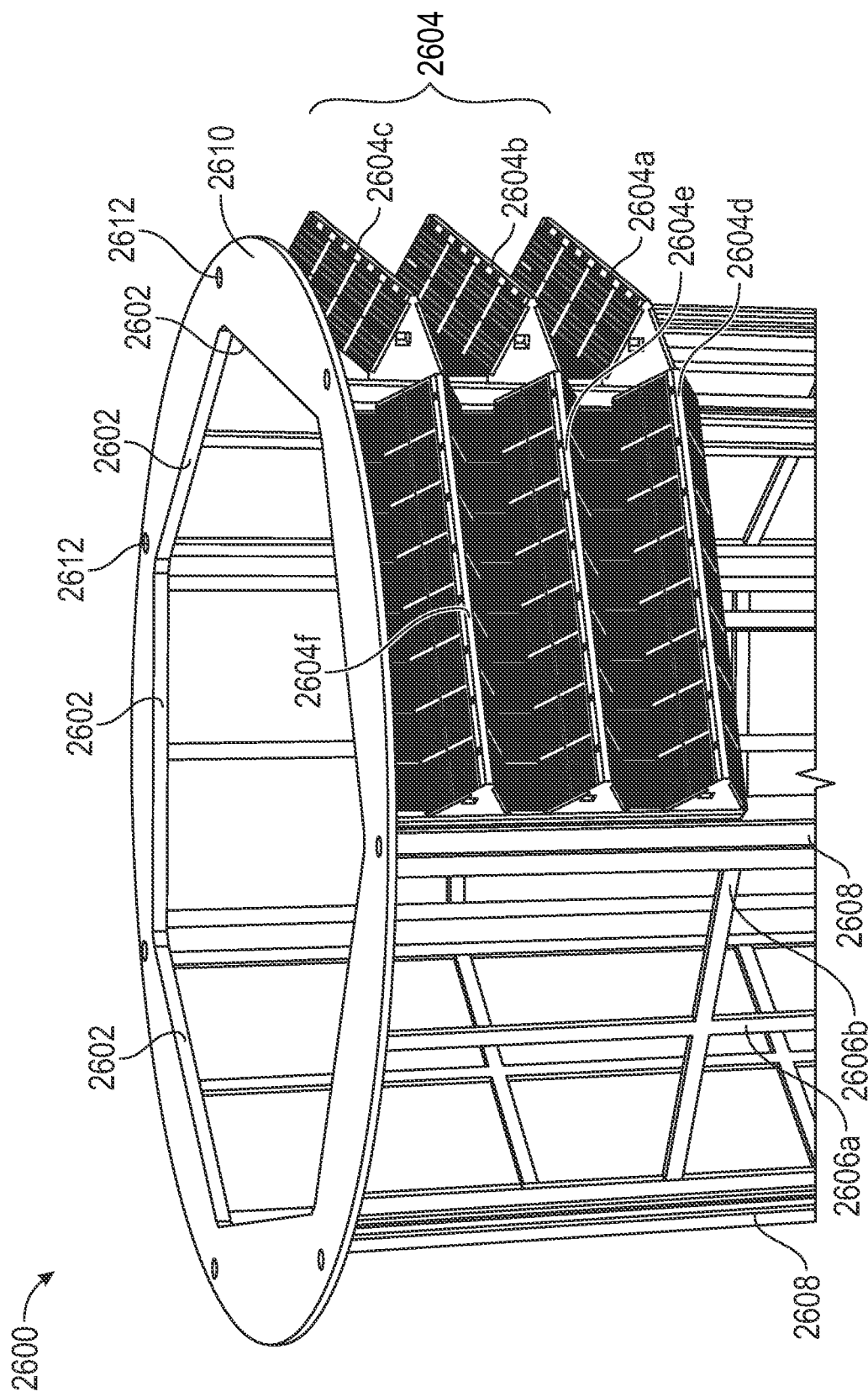
FIG. 26A is a three-dimensional perspective view of a screen basket frame having flat segments with corrugated screen assemblies attached thereto, according to an embodiment.

FIG. 26A is a three-dimensional perspective view of a screen basket frame 2600 having flat segments 2602 with three-dimensional (e.g., corrugated) screen assemblies 2604 attached thereto, according to an embodiment. Example embodiments of three-dimensional (e.g., corrugated) screen assemblies and techniques for making them are collectively described in U.S. Pat. Nos. 9,409,209, 9,884,344, 10,046,363, 10,259,013, 10,576,502, U.S. Patent Application Publication No. 2020/0246833, U.S. Patent Application Publication No. 2018/0345319, and U.S. Patent Application Publication No. 2019/0076881, each of which is incorporated herein by reference. Each flat segment 2602 includes a longitudinal support member 2606a and a transversal support member 2606b. In this example, each flat segment 2602 includes only a single longitudinal support member 2606a and a single transversal support member 2606b. In further embodiments, flat segments 2602 may include two or more longitudinal support members 2606a and two or more transversal support members 2606b. In this example, screen basket frame 2600 has seven flat segments 2602. In further embodiments, screen basket frame 2600 may have greater or fewer flat segments 2602. For example, in some embodiments, screen basket frame 2600 may have six flat segments 2602, five flat segments 2602, four flat segments 2602, or three flat segments 2602. In further embodiments, screen basket frame 2600 may have eight flat segments 2602, nine flat segments 2602, ten flat segments 2602, eleven flat segments 2602, twelve flat segments 2602, or any number of flat segments 2602 as appropriate for a given screening application.

Screen basket frame 2600 may include vertical support structures 2608 that are configured to secure adjacent flat segments 2602. Vertical support structure 2608 may be attached to a flange 2610. As with other embodiments described above (e.g., see FIGS. 15 and 16A), screen basket frame 2600 may be provided with a top flange 2610 and a bottom flange (e.g., see bottom flange 2710 in FIG. 27A). Flange 2610 may further include openings 2612 that may be used to mount screen basket frame 2600 into a screen separator machine (e.g., an NKM vertically swept interstage apparatus, as shown in FIGS. 13, 14, 30A, 30B, and 30C). For example, openings 2612 may be screw or bolt holes configured to receive a corresponding screw or bolt that may be used to secure screen basket frame 2600 into a screen separator machine. Screen basket frame 2600 may have other configurations suitable for supporting various different screening surfaces, including arched or round surfaces or different polygon shapes.

As mentioned above, screen assemblies 2604 may be configured to have a corrugated shape. The use of corrugations increases the surface area of the screen basket that is available for filtration. The corrugations may be configured to increase the filtration surface area by at least about 10%, or at least about 20%, or at least about 30%, or at least about 40%, or at least about 50%, or at least about 60%, or at least about 70%, or at least about 80%, or at least about 90%, or at least about 100% comparted to screen basket that is flat, and that is otherwise similarly configured. In this example, a first set of three corrugated screen assemblies 2604a, 2604b, and 2604c are shown attached to a first flat segment 2602 and a second set of three corrugated screen assemblies 2604d, 2604e, and 2604f are shown attached to a second flat segment 2602. Each of corrugated screen assemblies 2604a to 2604d has a pyramid shape. In various other embodiments, screen assemblies may be configured to have various other corrugated shapes. For example, each of corrugated screen assemblies 2604a to 2604d includes a triangular cross section, as described in greater detail below. In the illustrated embodiment, the corrugated screen assemblies can include corrugations that are oriented perpendicular to a longitudinal axis of the screen basket frame 2600 and the screen basket, such that the corrugations are substantially horizontal when the screen basket frame 2600 and screen basket are positioned in an upright position. In other embodiments, the corrugated screen assemblies can include corrugations the are oriented parallel to the longitudinal axis of the screen basket frame and screen basket so that the corrugations are substantially vertical when the screen basket frame and screen are upright. In other embodiments, the corrugated screen assemblies can include vertical corrugations and horizontal corrugations in different regions, and or corrugations oriented at various selected angles. In other embodiments, corrugated screen assemblies may be provided having other cross sectional shapes (e.g., semi-circular, trapezoidal, rectangular, square, n-sided polygon, etc.) and may be oriented in different directions or a combination of different directions as described above and below.

When the corrugations have a horizontal orientation and when the substantially cylindrical screen basket frame 2600 is upright, the corrugations are substantially parallel to the top and base of the cylindrical screen basket frame 2600 and screen basket and substantially perpendicular to a longitudinal axis of the cylindrical screen basket frame 2600 and screen basket. When the corrugations can have a vertical orientation and when the substantially cylindrical screen basket is upright, the corrugations are substantially perpendicular to the top and base of the cylindrical screen basket and substantially parallel to a longitudinal axis of the cylindrical screen basket. When the screen basket assembly 2604 includes both vertical and horizontal corrugations, they can be located in different regions in the screen basket assembly 2604. When the screen assembly 2604 includes angular corrugations that are neither vertical nor horizontal, such angular corrugations can cover the entire screen basket or be located in selected regions thereof. The screen basket can include a mixture of angular corrugations and horizontal corrugations; a mixture of angular corrugations and vertical corrugations; or a mixture of angular corrugations, horizontal corrugations, and vertical corrugations. The angular corrugations can be disposed at angles that are more than zero and less than 90 degrees relative to the longitudinal axis of the substantially cylindrical screen basket frame 2600 and screen basket, or from about 5 to about 85 degrees relative to the longitudinal axis thereof, or from about 15 to about 75 degrees relative to the longitudinal axis thereof, or from about 25 to about 65 degrees relative to the longitudinal axis thereof, or from about 35 to about 55 degrees relative to the longitudinal axis thereof, or about 45 degrees relative to the longitudinal axis thereof. In still other embodiments, the screen basket assembly 2604 can include corrugations that are disposed at a mixture of different angles relative to the longitudinal axis of the cylindrical screen basket frame 2600 and screen basket.

Figure 26B:
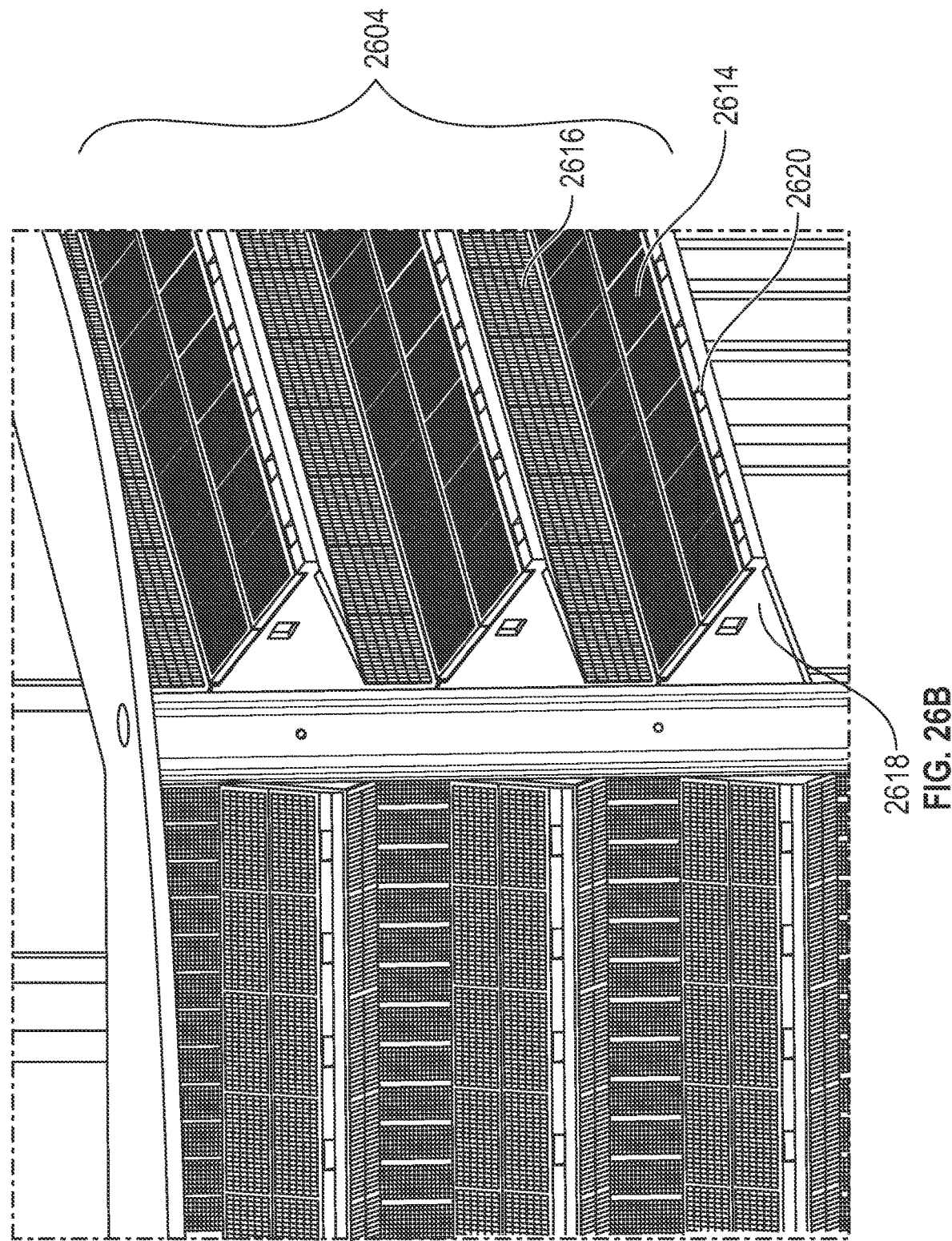
FIG. 26B is a close-up three-dimensional perspective view of the screen assemblies of FIG. 26A, according to an embodiment.

FIG. 26B is a close-up three-dimensional perspective view of the corrugated screen assemblies 2604 of FIG. 26A, according to an embodiment. As shown, each of corrugated screen assemblies 2604 includes a pyramid shaped structure 2614 and a flat portion 2616. The pyramid structure has a triangular cross section 2618 and a ridge portion 2620. In this example, the pyramid structure is oriented so that the ridge 2620 has a horizontal (i.e., transversal) alignment. In further embodiments, corrugated screen assemblies 2604 may be provided having a vertical (i.e., longitudinal) alignment, as described in greater detail below with reference to FIG. 27C. Screen assemblies 2604 may include a support structure (e.g., a subgrid) with screen elements attached to the subgrid, as described in various other embodiments above (e.g., see FIGS. 20A to 23B and related description, above). As described above, screen elements may include a polyurethane or thermoplastic screen element.

As explained above, one advantage of employing corrugated screen assemblies 2604 is the ability to increase the available screening surface area in a controlled manner. One way to increase the screening surface area is to decrease the widths of flat portions 2616 between the corrugations (e.g., the pyramid-shaped structures 2614) so as to employ more of the pyramid-shaped structures 2614. Another way to increase the screening surface area is to increase the protrusion distance or "height" of the corrugations (e.g., the pyramid-shaped structures 2614) so as to increase the contribution of the pyramid-shaped structures 2614 to the overall screening surface area. Still another way is to manipulate the shape of the corrugations. For example, corrugations that are semi-circular or otherwise rounded may contribute a greater amount of screening surface area than those that are composed of flat screening components. Moreover, corrugations that have trapezoidal or other polygonal shapes may contribute a greater amount of screening surface area than those that are triangular or pyramidal.

Figure 26C:
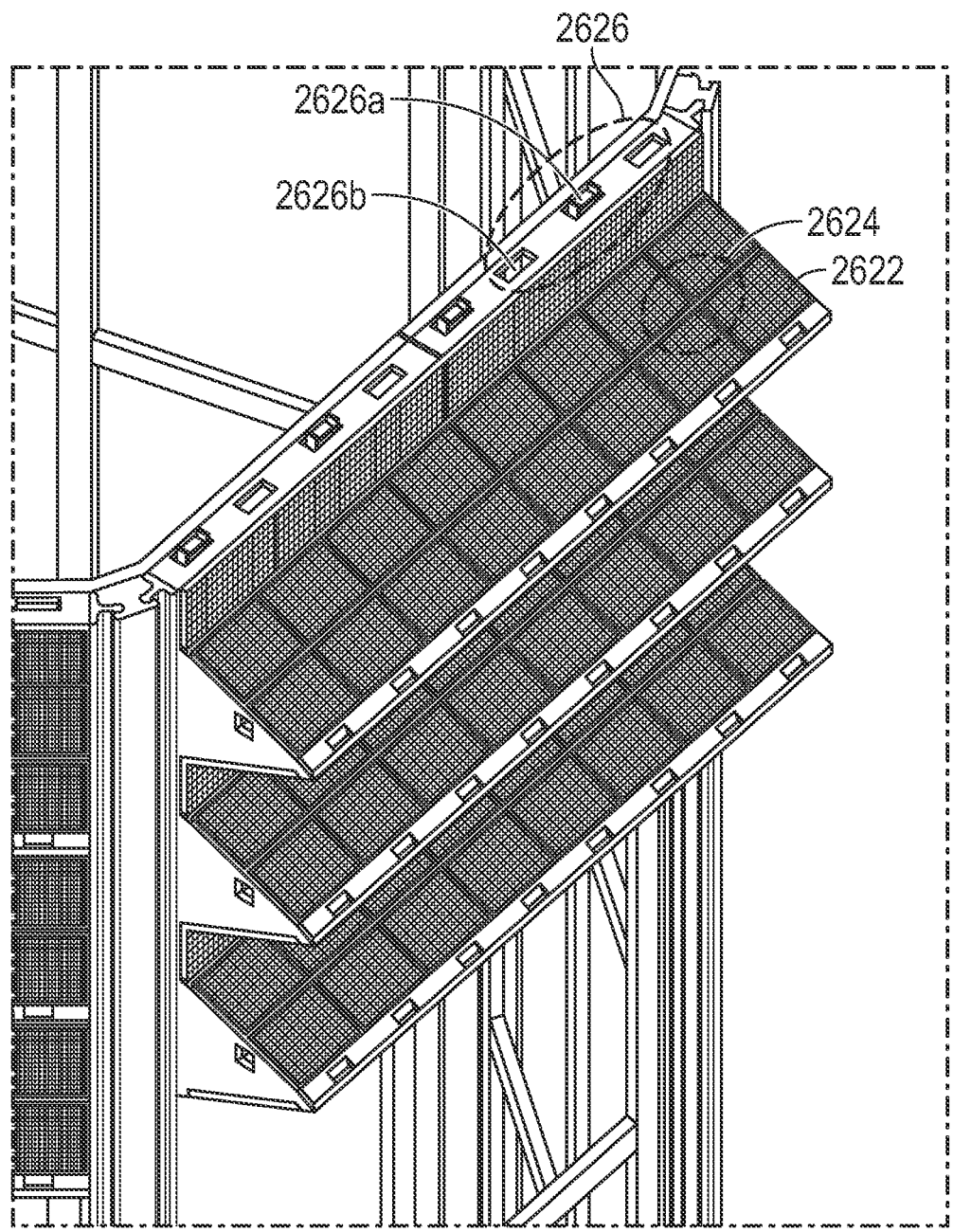
FIG. 26C is a three-dimensional perspective view of support structures of the screen assemblies of FIGS. 26A and 26B, according to an embodiment.

FIG. 26C is a three-dimensional perspective view of support structures 2622 of screen assemblies 2604 of FIGS. 26A and 26B, according to an embodiment. In this example, support structures 2622 are pyramid shaped subgrids having a subgrid framework 2624. Subgrid framework 2624 includes a plurality of support members forming a rectangular grid. Each support structure 2622 may include a plurality of coupling members 2626 that allow adjacent support structures 2622 to be coupled to one another. In this example, coupling members 2626 include clips 2626*a* and clip apertures 2626*b*. Clips 2626*a* on one subgrid 2622 are configured to snap into and to thereby engage with corresponding clip apertures 2626*b* on an adjacent subgrid so that the adjacent subgrids 2622 may be securely coupled to one another.

Figure 26D:
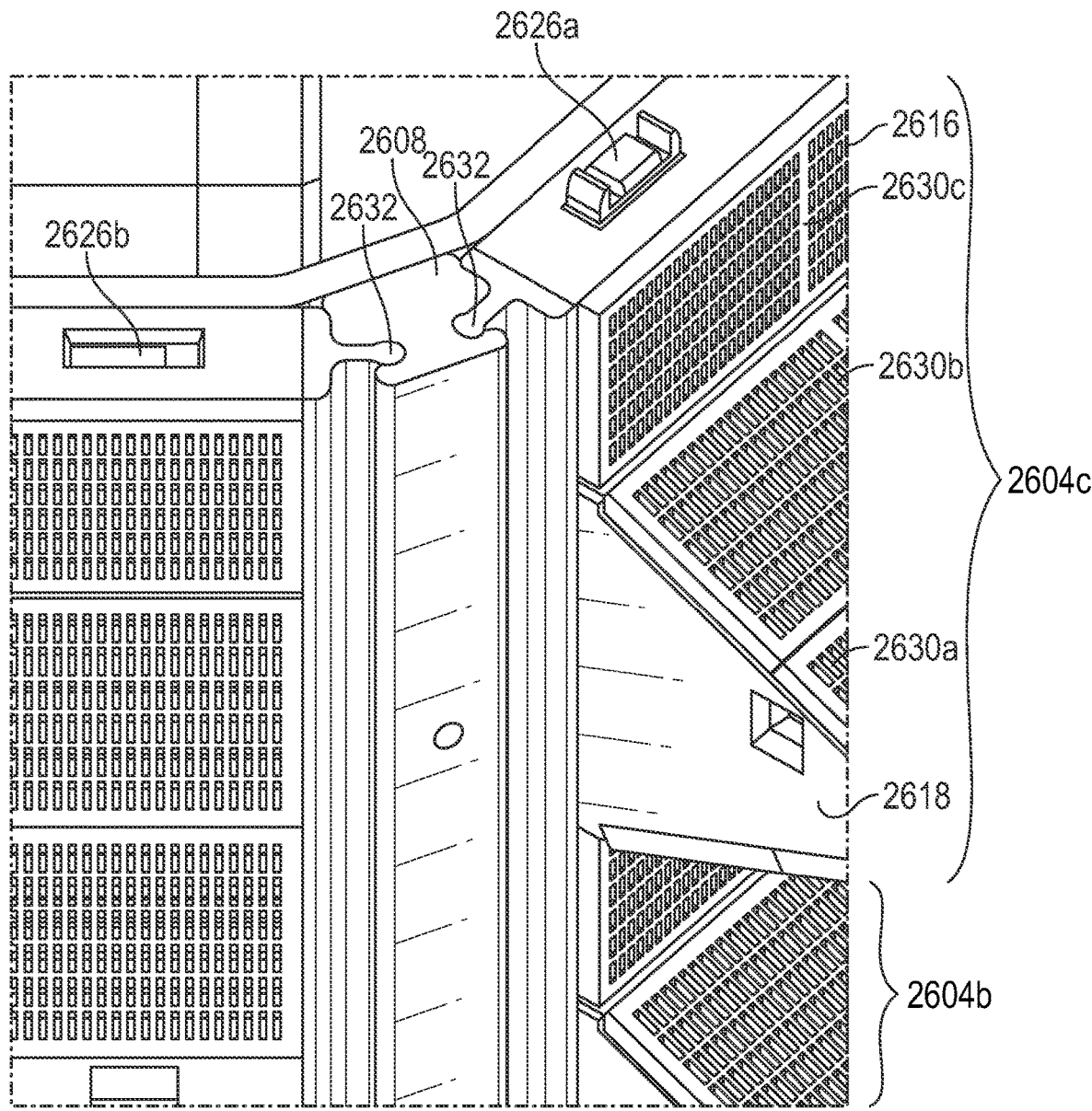
FIG. 26D is a close-up three-dimensional perspective view of the corrugated screen assemblies of FIGS. 26A and 26B, according to an embodiment.

FIG. 26D is a close-up three-dimensional perspective view of the corrugated screen assemblies 2604 of FIGS. 26A and 26B, according to an embodiment. In this example, portions of screen assemblies 2604*b* and 2604*c* (e.g., see FIG. 26A) are shown. Screen assembly 2604*c* includes a subgrid having a triangular cross section 2618 and a flat portion 2616 (e.g., see FIG. 26B). As shown, the pyramid structure of screen assembly 2604*c* includes two screen elements 2630*a* and 2630*b* attached thereto. Flat portion 2616 also includes a screen element 2630*c* attached thereto. This view also shows greater detail of clip 2626*a* and clip aperture 2626*b*. Vertical support structure 2608 may further be configured to accommodate coupling structures 2632 of screen assemblies 2604, whereby screen assemblies may be secured to vertical support structure 2608.

Figure 27A:
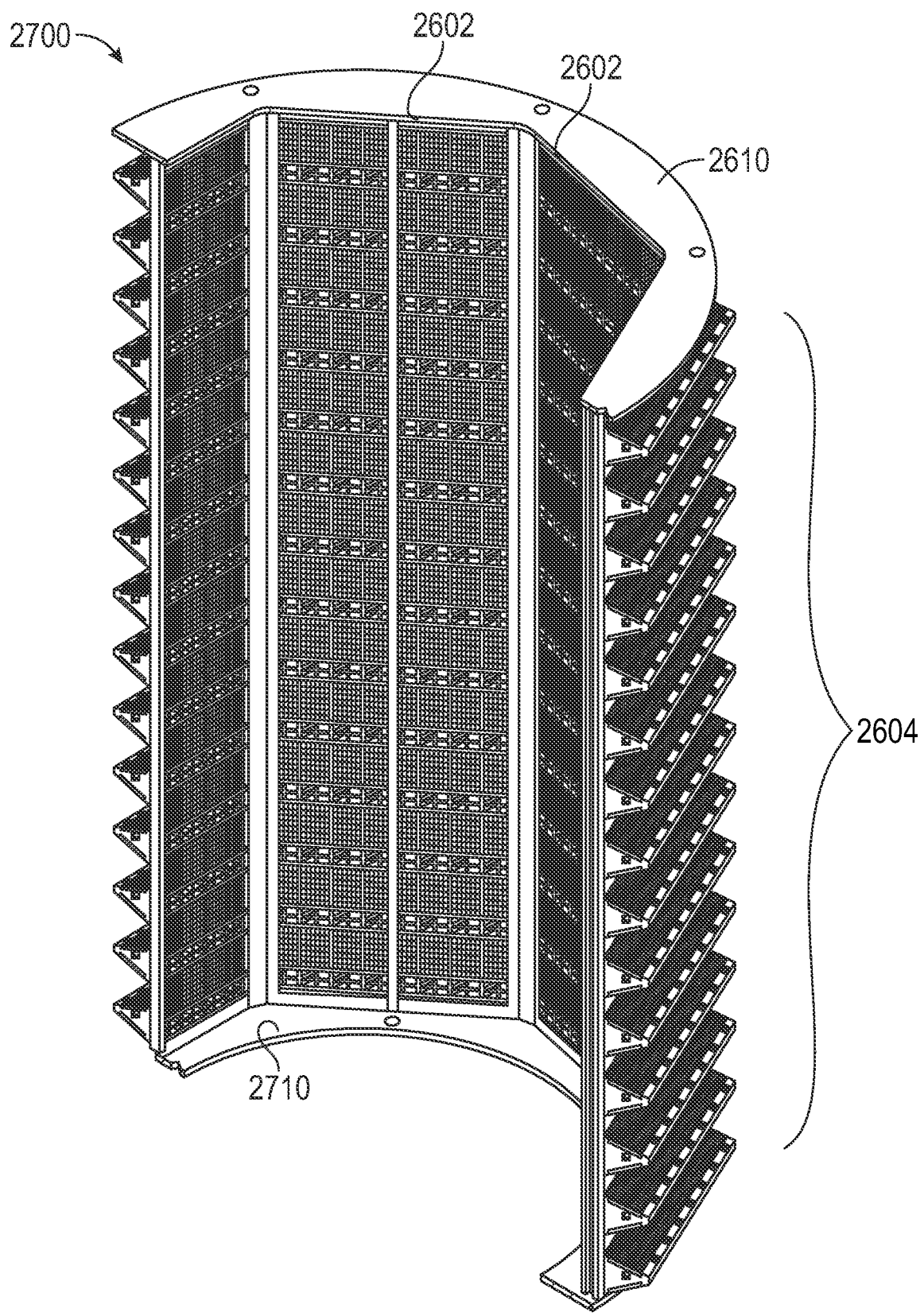
FIG. 27A is a three-dimensional perspective sectional view of a screen basket frame with a plurality of corrugated screen assemblies attached thereto, according to an embodiment.

FIG. 27A is a three-dimensional perspective sectional view of a screen basket frame 2700 with a plurality of corrugated screen assemblies 2604 attached thereto, according to an embodiment. Screen basket frame 2700 is constructed in essentially the same way as screen basket frame 2600 of FIG. 26A. In this regard, screen basket frame 2700 includes flat segments 2602 with corrugated screen assemblies 2604 attached thereto. Screen basket frame 2700 includes a top flange 2610 as well as a bottom flange 2710. As shown in FIG. 27A, each of the triangular or pyramidal corrugations 2614 can include a flat floor visible from the inside of the screen basket frame 2600, which supports and anchors the corrugation. The illustrated flat floor of each corrugation 2614 can be a coarse screen through which the material being screened can easily pass, in order to enable the corrugations 2614 to perform the screening and filtration functions.

Figure 27B:
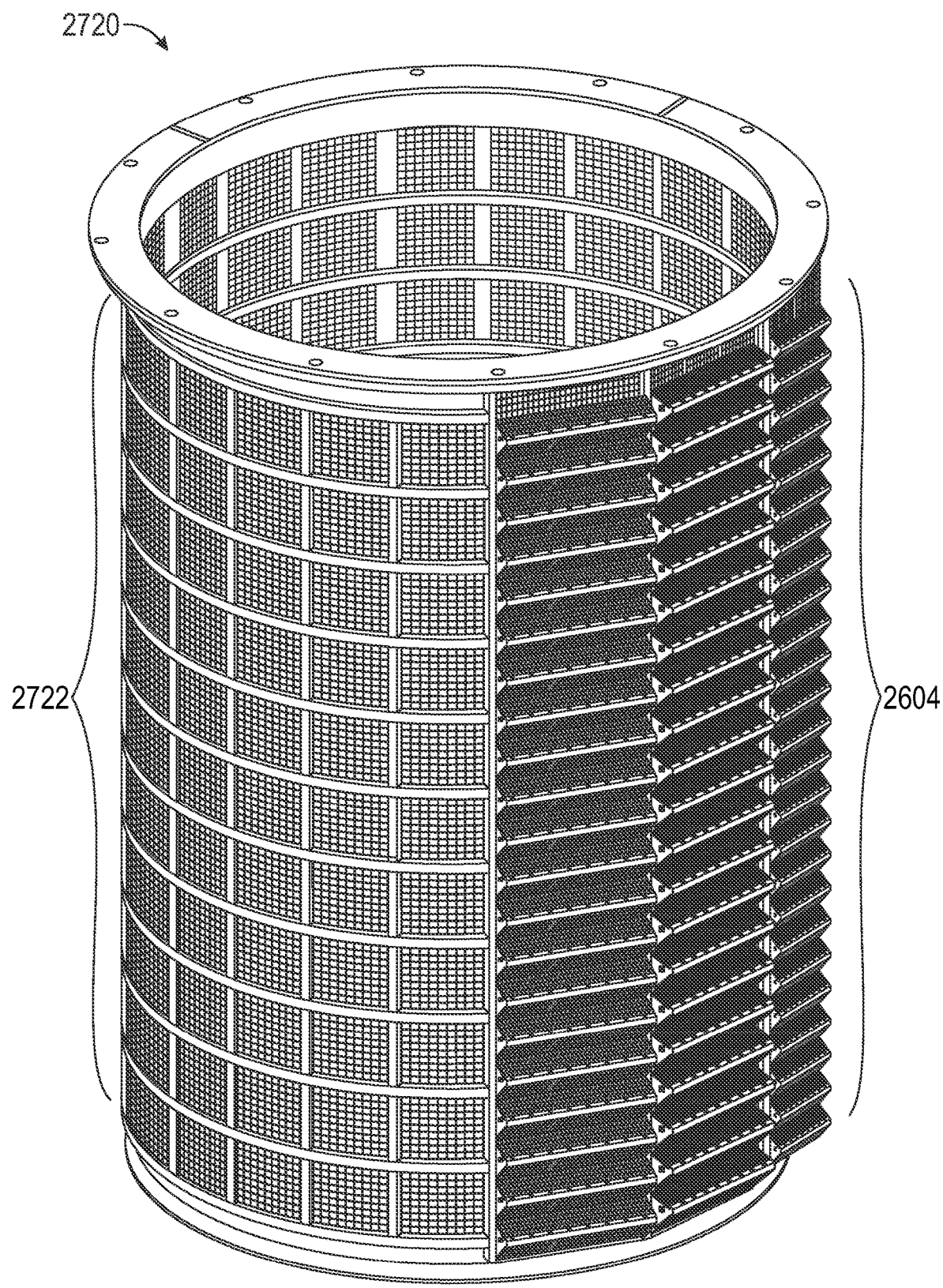
FIG. 27B is a three-dimensional perspective view of a first screen basket frame having flat and corrugated screen assemblies, according to an embodiment.

FIG. 27B is a three-dimensional perspective view of a first screen basket frame 2720 having flat 2722 and corrugated 2604 screen assemblies, according to an embodiment. Flat screen assemblies 2722 may include thermoplastic (e.g., polyurethane) screen elements, as described in greater detail above with reference to FIGS. 1 to 12. Alternatively, flat screen assemblies 2722 may include thermoplastic screen elements and screen assemblies as described above with reference to FIGS. 16A to 25. Corrugated screen assemblies 2604 may have a pyramid structure as described above with reference to FIGS. 26A to 27A. As shown, each of corrugated screen assemblies 2604 includes a ridge portion 2620 (e.g., see FIG. 26B) that has a horizontal (i.e., transversal) orientation. As mentioned above, other embodiments may include corrugated screen assemblies (e.g., see corrugated screen assemblies 2732 in FIG. 27C) having a vertical (i.e., longitudinal) alignment, as described in greater detail below. In the embodiment shown in FIG. 27B. only part of the screen basket frame 2720 is covered with corrugated screen assemblies 2604, whereupon the remainder is covered with flat (non-corrugated) screen assemblies 2722. Is illustrates one way of controlling the overall amount of screen surface area, by selecting the portions of the screen basket frame 2600 that are covered with corrugated screen assemblies. To this end, the cylindrical outer portion of the screen basket frame 2720 may be greater than zero to about 10% covered with corrugated screen assemblies, or about 10% to about 20% covered with corrugated screen assemblies, or about 20% to about 30% covered with corrugated screen assemblies, or about 30% to about 40% covered with corrugated screen assemblies, or about 40% to about 50% covered with corrugated screen assemblies, or about 50% to about 60% covered with corrugated screen assemblies, or about 60% to about 70% covered with corrugated screen assemblies, or about 70% to about 80% covered with corrugated screen assemblies, or about 80% to about 90% covered with corrugated screen assemblies, or about 90% to about 100% covered with corrugated screen assemblies, and may be from about 0% to about 10% covered with flat (non-corrugated) screen assemblies, or from about 10% to about 20% covered with flat (non-corrugated) screen assemblies, or from about 20% to about 30% covered with flat (non-corrugated) screen assemblies, or from about 30% to about 40% covered with flat (non-corrugated) screen assemblies, or from about 40% to about 50% covered with flat (non-corrugated) screen assemblies, or from about 50% to about 60% covered with flat (non-corrugated) screen assemblies, or from about 60% to about 70% covered with flat (non-corrugated) screen assemblies, or from about 70% to about 80% covered with flat (non-corrugated) screen assemblies, or from about 80% to about 90% covered with flat (non-corrugated) screen assemblies, or from about 90% to less than about 10% covered with flat (non-corrugated) screen assemblies.

Figure 27C:
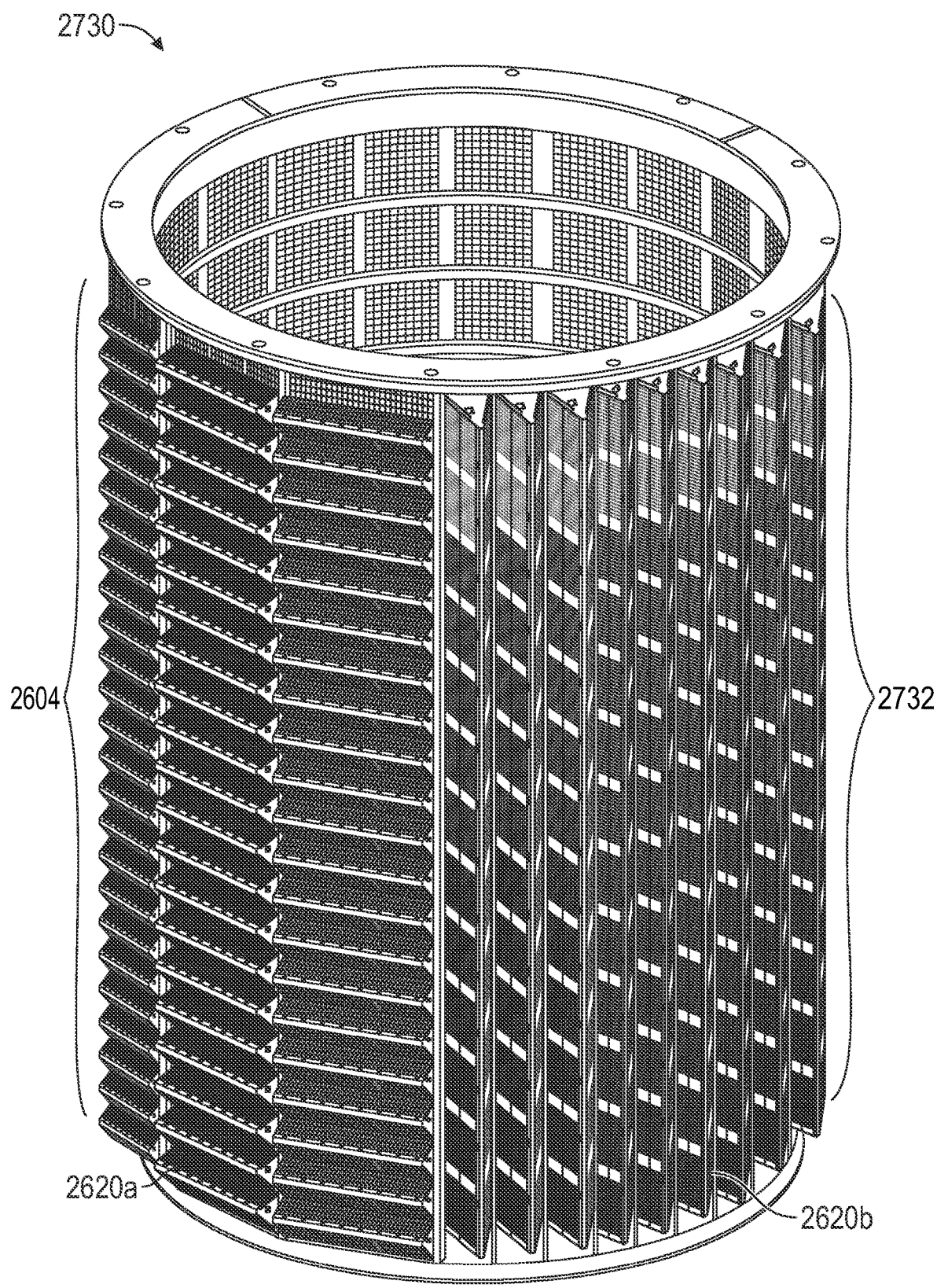
FIG. 27C is a three-dimensional perspective view of a second screen basket frame having corrugated screen assemblies in first and second orientations, according to an embodiment.

FIG. 27C is a three-dimensional perspective view of a second screen basket frame 2730 having corrugated screen assemblies in first 2604 and second 2732 orientations, according to an embodiment. As shown, a first plurality of corrugated screen assemblies 2604 has a first orientation in which a ridge portion 2620a (e.g., see also ridge portion 2620 in FIG. 26B) has a horizontal (i.e., transversal) alignment. In this regard, corrugated screen assemblies 2604 may have a similar construction to the screen assemblies 2604 described above with reference to FIGS. 26A to 26D. Screen basket frame 2730 may have a second plurality of corrugated screen assemblies 2732 in which a ridge portion 2620b may have a vertical (i.e., longitudinal) alignment. Various other combinations of horizontal 2604 and vertical 2732 corrugated screen assemblies may be provided in other embodiments. Further, screen basket frames may be provided with any combination of flat and corrugated screen assemblies having various orientations as needed for specific applications.

Figure 28A:
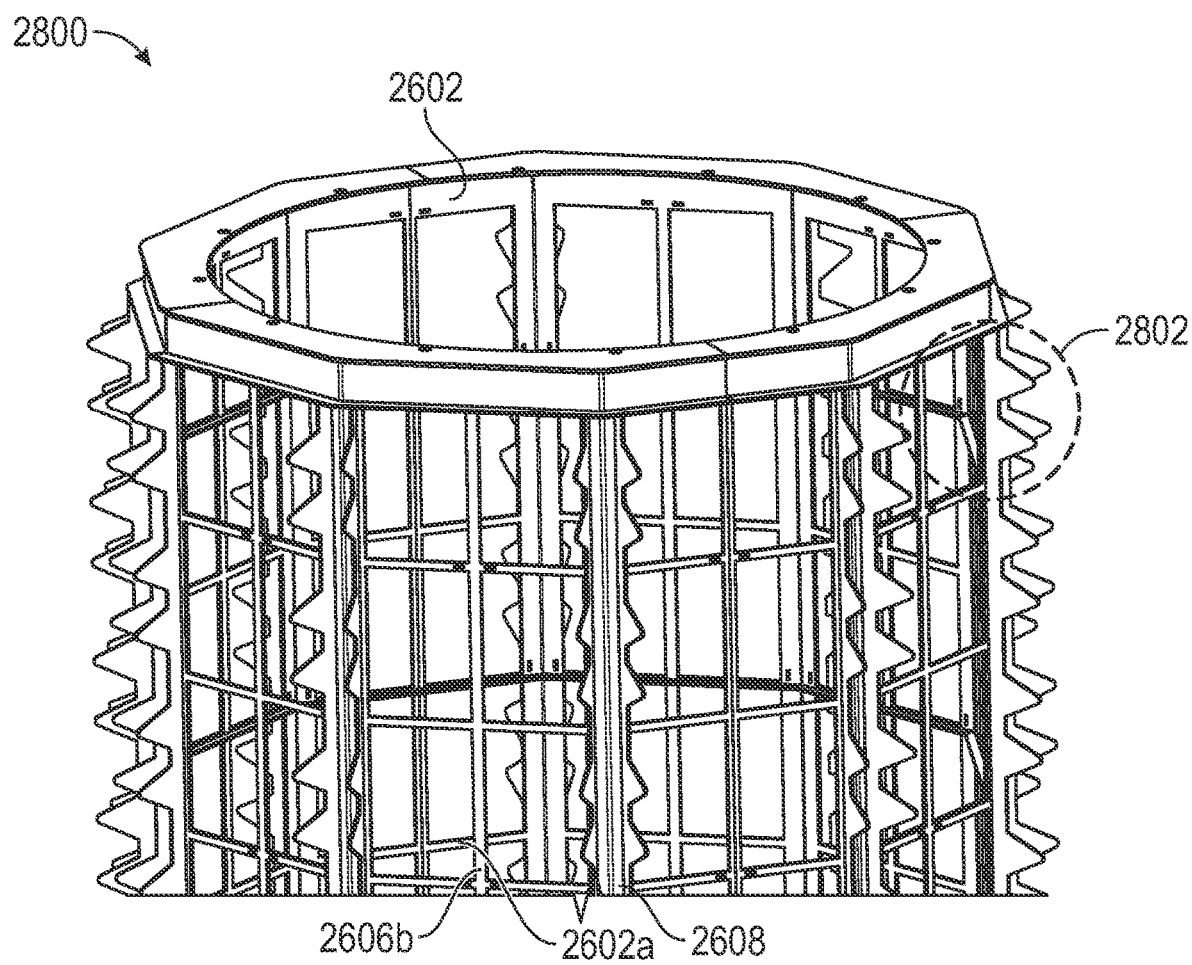
FIG. 28A is a three-dimensional perspective view of a screen basket frame having attachment members configured to attached screen assemblies to form a corrugated screening surface, according to an embodiment.

FIG. 28A is a three-dimensional perspective view of a screen basket frame 2800 having attachment members 2802 configured to attached screen assemblies to form a corrugated screening surface, according to an embodiment. Screen basket frame 2800 may be similar to screen basket frame 2600 of FIG. 26A. In this regard, screen basket frame 2800 may include flat segments 2602 having a transversal support member 2606a and a longitudinal support member 2606b, and vertical support structures 2608 that are configured to secure adjacent flat segments 2602. As shown, attachment members 2802 may have triangular shaped portions that extend away from each of the flat segments 2602. Such triangular shaped portions may be configured to support (e.g., by gluing or other attachment arrangement) flat screen elements (e.g., screen elements 2630a to 2630c of FIG. 26D) to thereby form a corrugated screening surface without the need for subgrid structures (e.g., subgrids 2622 of FIG. 26C).

Alternatively, corrugated screening assemblies (including subgrid 2622 of FIG. 26C) may be held by a cartridge assembly 2900, as described in further detail below. In this way, screen assemblies may be configured to be flexible and shaped to pressure fit into a respective one of the openings in grid frame 2800 (e.g., attachment ridges 2920a and 2920b of cartridge assembly 2900 in FIGS. 29A, 29B, and 29C may be flexible to pressure fit screen basket openings). Alternatively, screening assemblies may be attached to the frame with an attachment mechanism. For example, an attachment mechanism may include one or more screw or bolt holes configured to receive respective one or more screws or bolts to thereby secure a screening assembly to frame 2800.

Figure 29A:
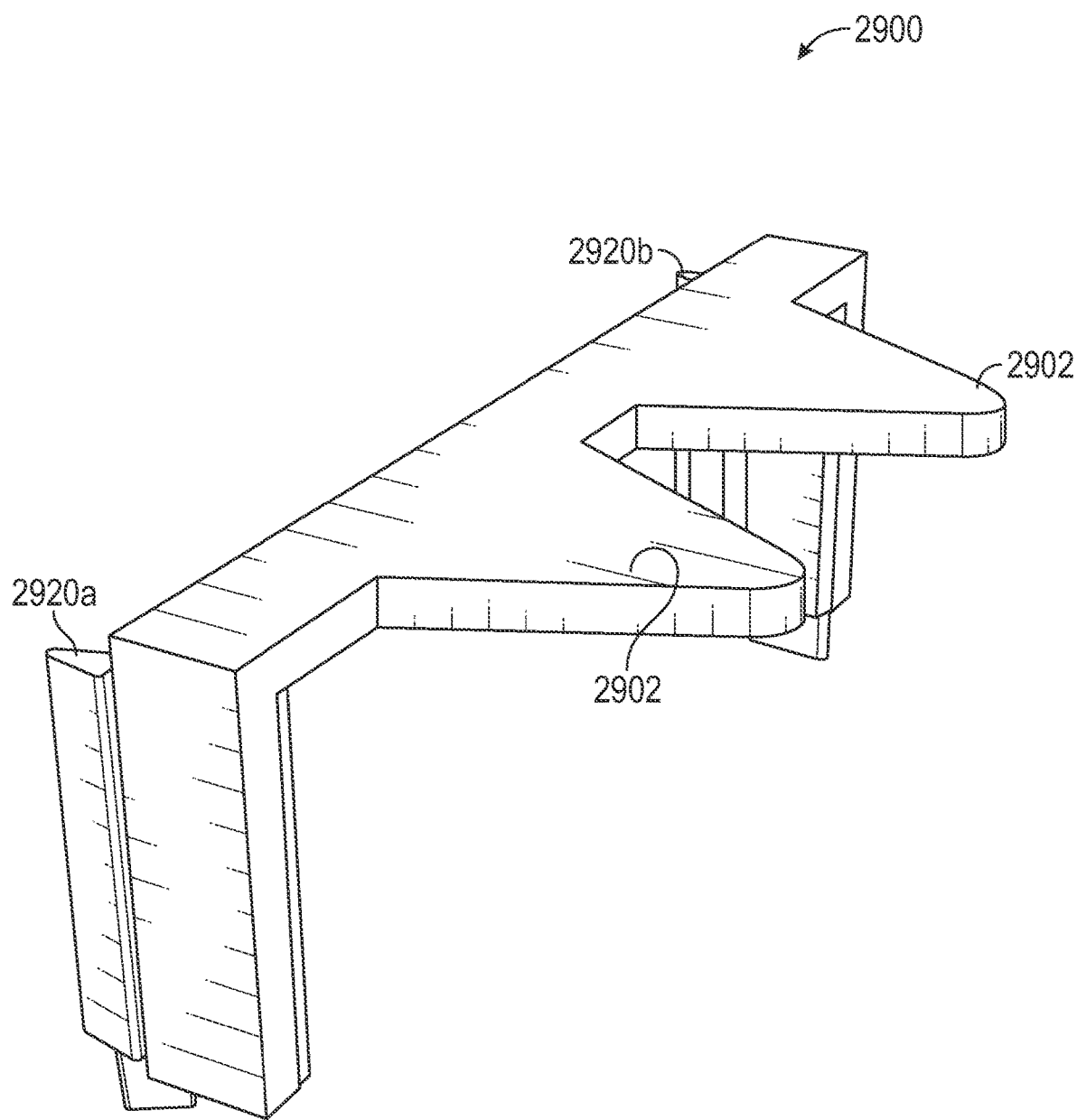
FIG. 29A is a first three-dimensional perspective view of a component of a cartridge assembly configured to hold screen assemblies in a corrugated configuration, according to an embodiment.
Figure 29B:
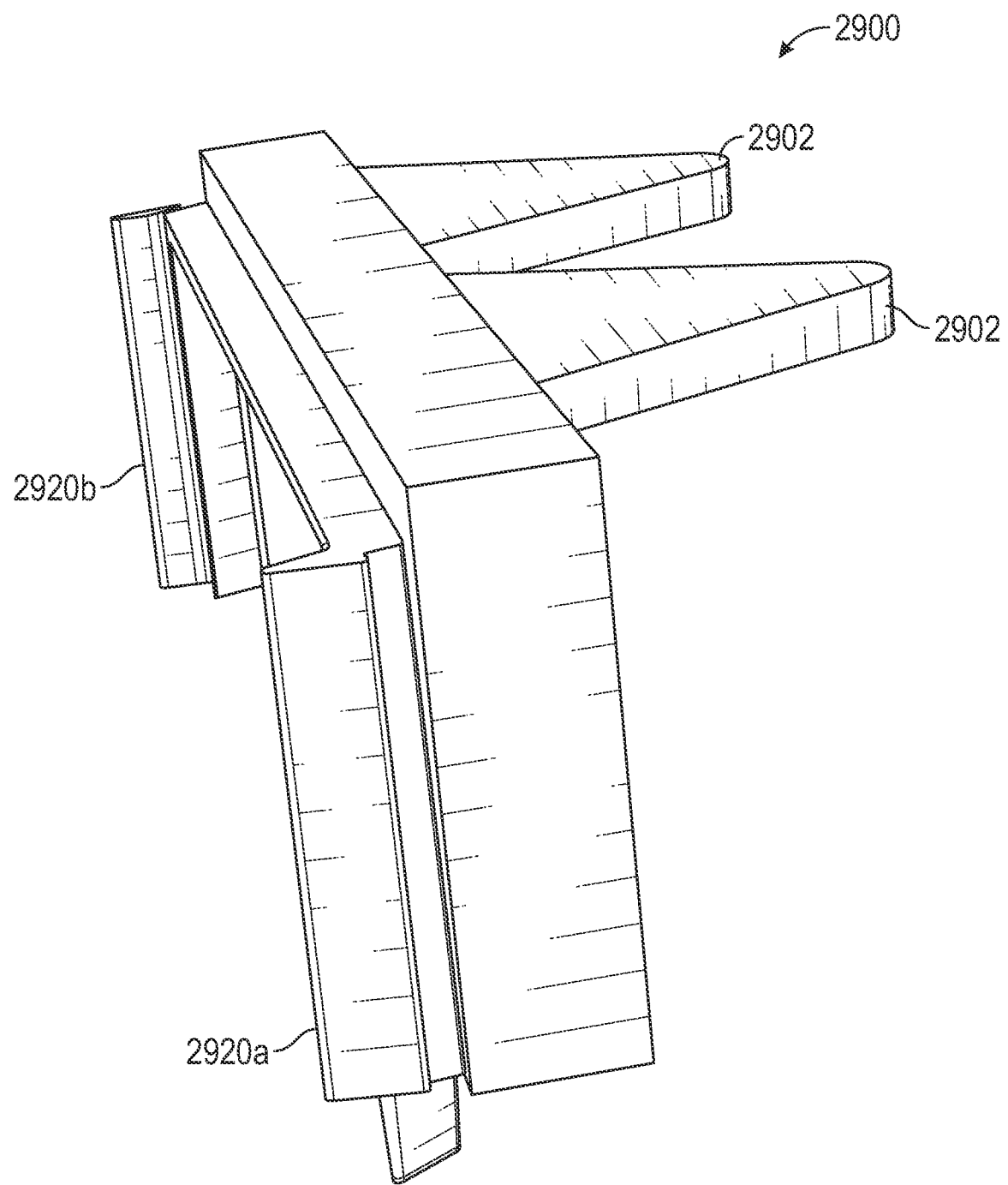
FIG. 29B is a second three-dimensional perspective view of a component of a cartridge assembly configured to hold screen assemblies in a corrugated configuration, according to an embodiment.
Figure 29C:
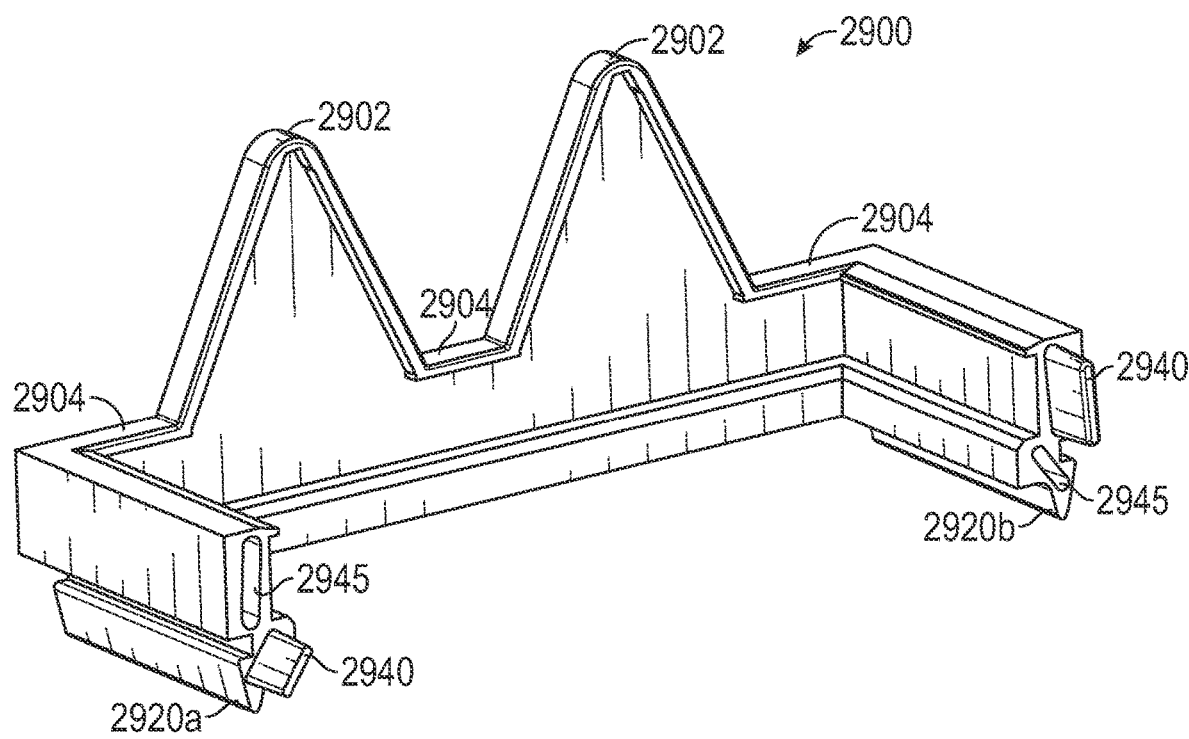
FIG. 29C is a third three-dimensional perspective view of a component of a cartridge assembly configured to hold screen assemblies in a corrugated configuration, according to an embodiment.

FIGS. 29A, 29B, and 29C show three-dimensional perspective views of a component of a cartridge assembly 2900 configured to hold screen assemblies in a corrugated configuration, according to an embodiment. Cartridge assembly 2900 is similar to embodiments described above with reference to FIGS. 24 and 25. As such, cartridge assembly 2900 includes attachment ridges 2920a and 2920b as well as attachment mechanisms 2940 (e.g., see FIG. 29C) that may be detachably engaged with apertures 2945 (see corresponding structures 2420a, 2421a, 2420b, 2421b, 2440, and 2445 of FIGS. 24 and 25). In alternative embodiments, screen assemblies may be formed without a cartridge assemblies. For example a single screen assembly may be molded as a single piece and configured such that it attaches directly to a screen basket by a fastening mechanism or such that it simply forms part of a screen basket. In these embodiments the screen assemblies may be flat or corrugated or other shapes. When synthetic surfaces are formed as single pieces for attachment to a screen basket they often have larger size screening opening, e.g., about 300 microns to about 1500 microns are larger.

In contrast to the embodiments of FIGS. 24 and 25, however, cartridge assembly 2900 further includes triangular shaped support structures 2902 that may be configured to hold a screen assembly having a pyramid structure (e.g., pyramid structure 2614 of see FIG. 26B and screen elements 2630a and 2630b of FIG. 26D). Cartridge assembly 2900 may further include flat regions 2904 (e.g., see FIG. 29C) that may be configured to hold screen elements as flat portions (e.g., see screen element 2630c of FIG. 26D) of a corrugated screen assembly. A corrugated screening assembly including cartridge assembly 2900 may then be installed in a screen basket frame, as described above with reference to FIGS. 16A to 17 in the context of flat screening assemblies.

Figure 30A:
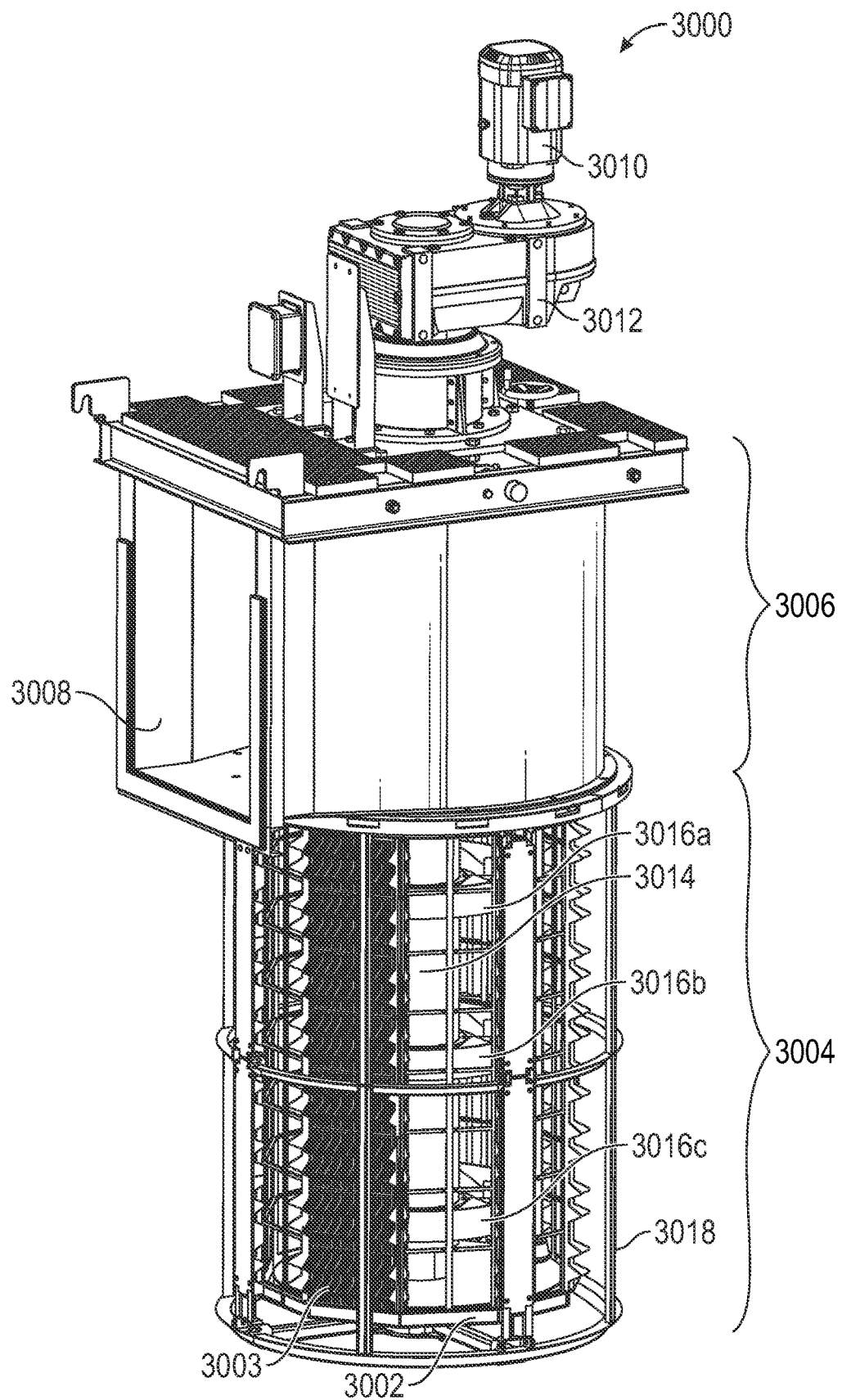
FIG. 30A is a three-dimensional perspective view of a screening apparatus having a screen basket, according to an embodiment.

FIG. 30A is a three-dimensional perspective view of a screening apparatus 3000 having a screen basket 3002, according to an embodiment. Screen basket 3002 is shown with only a portion having corrugated screening assemblies 3003 to allow additional structure to be illustrated. Screening apparatus 3000 may be similar to the vertically swept interstage apparatus described above with reference to FIGS. 13 and 14. Screening apparatus 3000 includes a screen basket portion 3004 located below a volute portion 3006. Volute portion 3006 includes a launder interface 3008 configured to receive a flow of pulp discharge. A motor 3010 and gearbox 3012 are positioned above the volute section 3006. Motor 3010 and gearbox 3012 are configured to power a drive shaft 3014 that is connected to impellers 3016a, 3016b, and 3016c. According to an embodiment, motor 3010 may be a variable frequency drive, which may be configured to allow control of a speed at which impellers are driven. In this example, three impellers 3016a to 3016c are shown. Other embodiments may include greater or fewer impellers as needed for particular applications.

During operation, screening basket portion 3004 is inserted into and suspended over an adsorption tank containing a slurry of pulp to be processed. Maintaining a higher level of pulp in the tank outside of screen basket portion 3004 relative to a level of pulp in the screen basket portion 3004 generates a differential pressure that causes pulp to flow into screen basket portion 3004. Motion of impellers 3016a to 3016c serves to keep particles in suspension and to cause pulp within screen basket section 3004 to flow upwardly toward volute section 3006 and to thereby exit screening apparatus 3000 via launder interface 3008. Screen basket portion 3004 further includes an outer cylindrical section 3018, which may be configured to rotate relative to the screen basket 3002. As described in greater detail with reference to FIG. 30C, below, outer section 3018 includes blades 3020 (e.g., see FIG. 30C) that rotate around an outer periphery of screen basket 3002. Rotation of blades 3020 acts to prevent particles from clogging the exterior side of the screening assemblies 3003 and may help to direct flow of material through screen assemblies 3003. Outer cylindrical section 3018 is driven by drive shaft 3014.

Figure 30B:
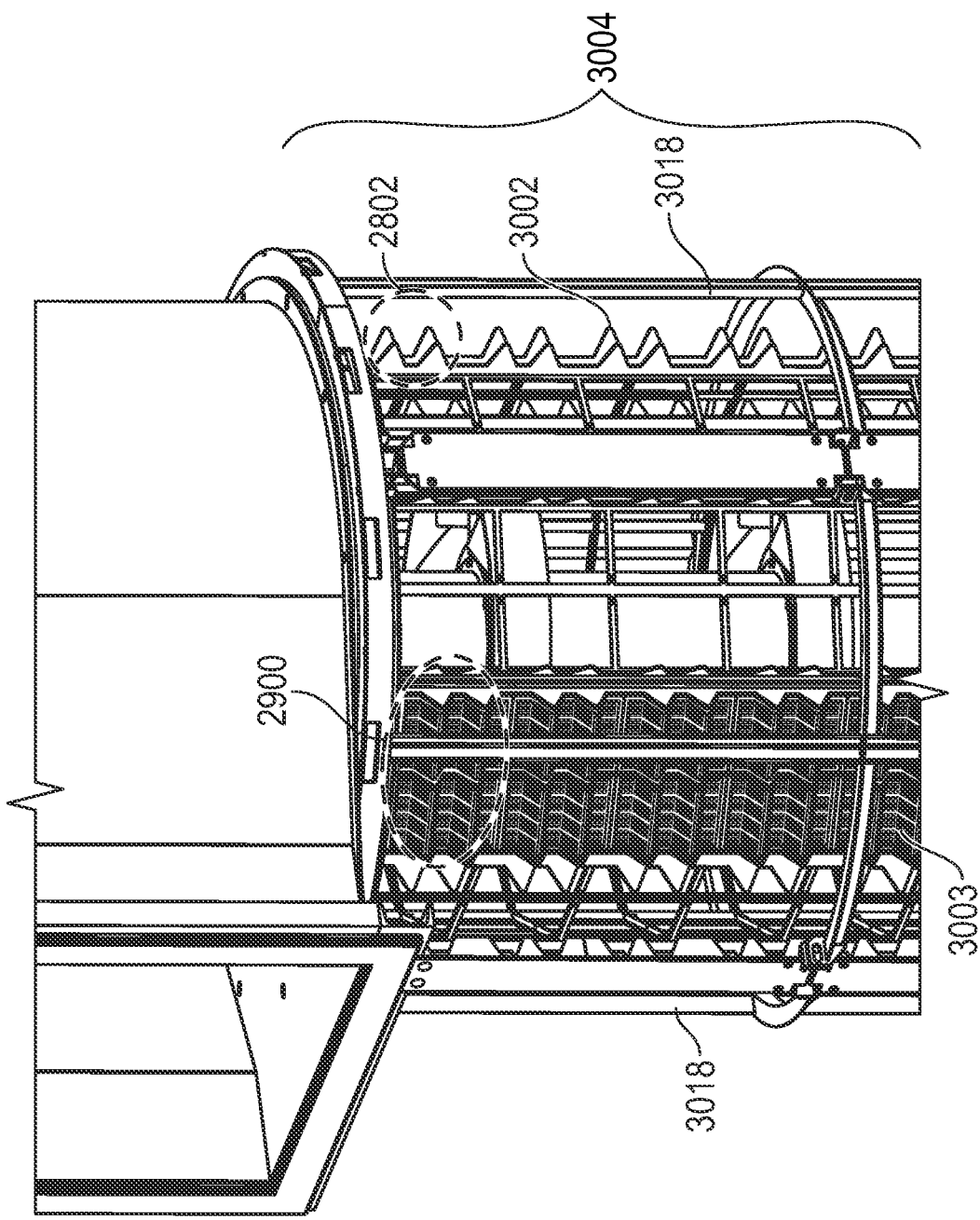
FIG. 30B is a first enlarged view of the screening apparatus of FIG. 30A, according to an embodiment.

FIGS. 30B and 30C show first and second enlarged views of screen basket portion 3004 of screening apparatus 3000, according to an embodiment. Screen basket 3002 is shown in a configuration similar to the configuration of screen basket 2800 described above with reference to FIG. 28A. In this regard, screen basket 3002 includes attachment members 2802 that are configured to attach various screening assemblies 3003. For example, screening assemblies 3003 may be corrugated screening assemblies held by cartridge assemblies 2900 as described above with reference to FIGS. 29A, 29B, and 29C. Alternatively, and particularly for screen assemblies with larger opening, e.g. in the range of 300 microns and greater, the screen assemblies may not have a cartridge assembly and may be single injection molded pieces that are secured directly to screen basket 3002. As mentioned above, outer section 3018 may be configured to rotate relative to screen basket 3002. As shown in FIG. 30C, outer section 3018 includes blades 3020 that rotate past screening assemblies 3003. In this example, blades 3020 have a shape that corresponds to the corrugated shape 3022 of screening assemblies 3003. As mentioned above, rotation of blades 3020 relative to screen assemblies 3003 acts to prevent clogging of screen assemblies 3003 and may assist in directing flow through the screen assemblies. Blades 3020 are spaced away from the screening surfaces of screen assemblies 3003 and are shown as having a corrugated shape, however, blades 3020 may have a straight profile or other profile so as to prevent clogging of screen assemblies 3003 and/or assist with flow of material through screen assemblies 3003.

Figure 31A:
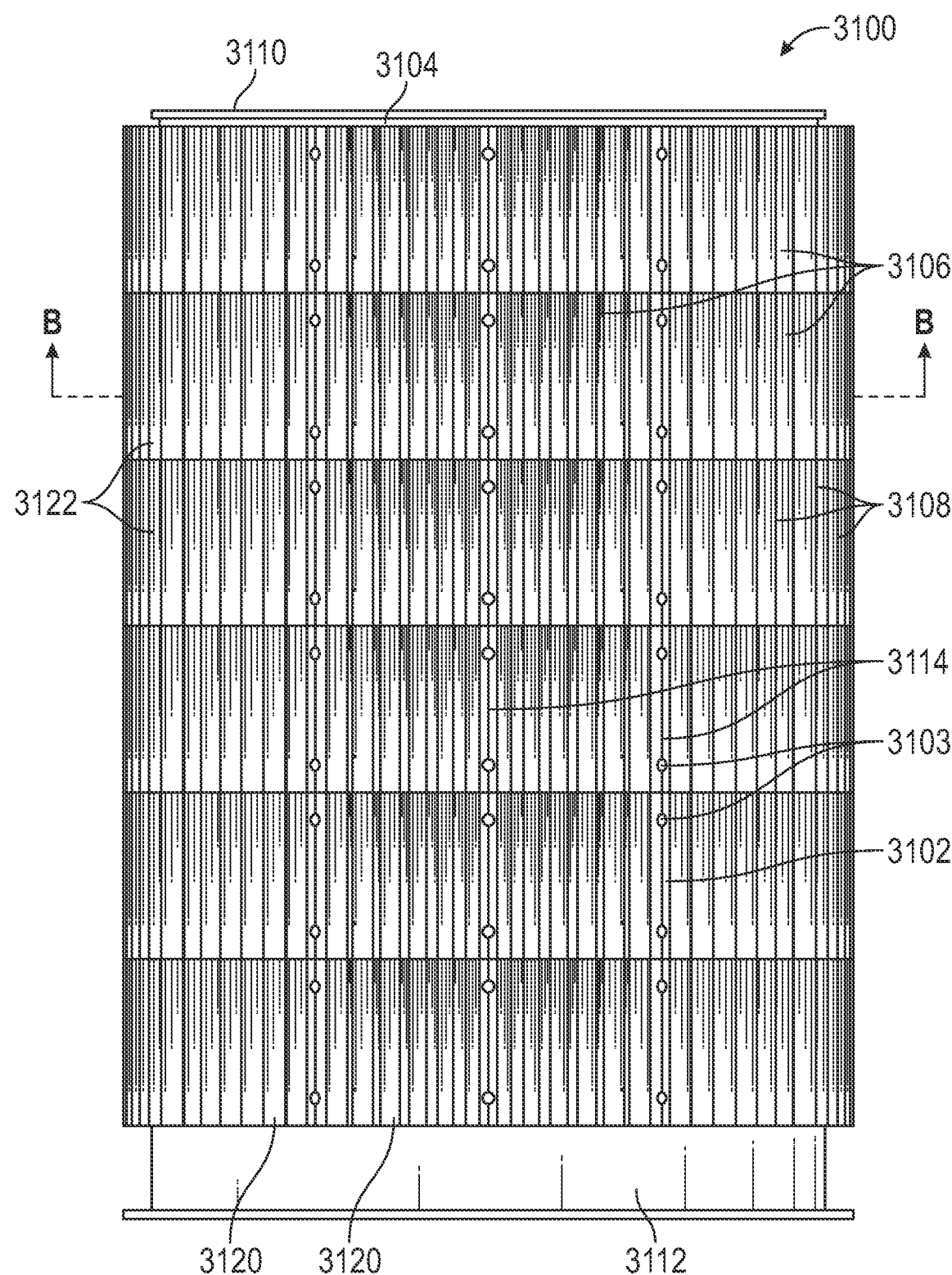
FIG. 31A is a front view of another embodiment of a screening apparatus according to the disclosure.
Figure 31B:
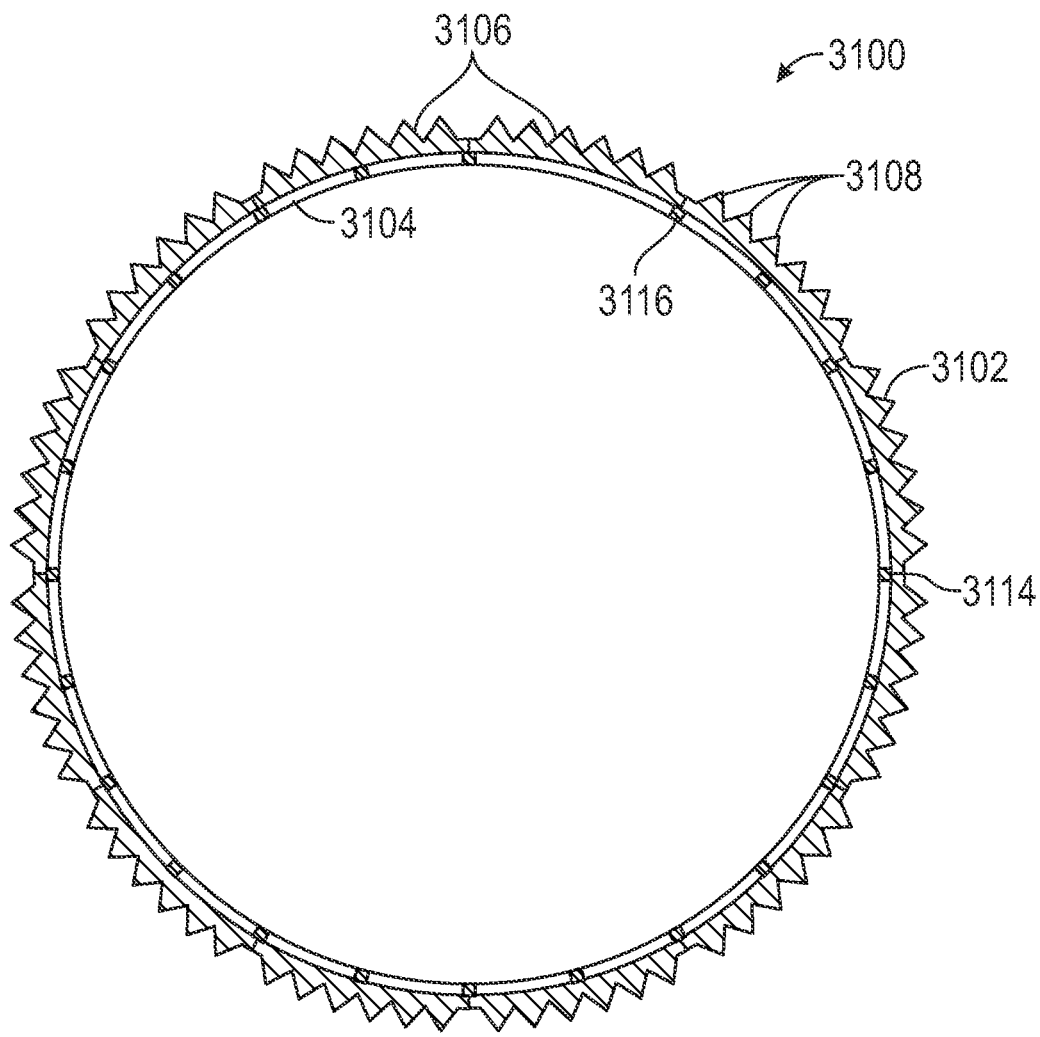
FIG. 31B is a top sectional view of the screening apparatus of FIG. 31A taken along the line B-B in FIG. 31A.

FIGS. 31A and 31B illustrate front and top sectional views of a screening apparatus 3100 including a screen basket 3102 mounted to a cylindrical screen basket frame 3104. Screening apparatus 3100 is an alternative embodiment of the present disclosure and may be used as a screening basket in the screen systems described herein, including the screening system described above in FIGS. 30A, B and C. As illustrated, the screen basket 3102 includes a plurality of thermoplastic, three-dimensional (corrugated) screen elements 3106, each of which defines a plurality of corrugations (triangular screen portions) 3108. The corrugations 3108 are disposed vertically, but can be disposed horizontally, or a combination of vertical and horizontal, or any combination of different angles as described above. The screen elements 3106, like other screens, screening surfaces, screen assemblies and/or screen elements discussed herein, can be single-piece injection molded synthetic structures that do not require a subgrid assembly for support. In certain embodiments screen elements 3106 can include a synthetic surface having openings ranging from about 250 to about 4000 microns. Screen elements 3106 may be flat or corrugated or have other surface shapes suitable for separation of materials. Screen elements 3106 may be thermoplastic injection molded pieces or thermoset molded pieces, and in the case of the later may include reinforcement members, e.g., rods or other support elements molded integrally within the molded pieces for rigidity and support. The screen openings can be any suitable size and shape and can be rectangular, square, round, elliptical or another shape as desired. In the embodiment shown, the screen elements 3006 are positioned side by side and top to bottom and can be joined along boundary lines 3114. Eliminating the subgrid structure saves cost and also removes obstructions that might otherwise hinder the flow of fluid through the screen basket assembly. The screen basket frame 3104 includes a rigid circular top support member 3110, a rigid circular bottom support member 3112, a plurality of rigid vertical members 3114 extending from the top support member 3110 to the bottom support member 3112, and horizontal support members 3116 extending around the circumference of the screen basket frame 3104 such that vertical members 3114 and horizontal members 3116 form a support surface for securement and support of screen elements 3106. The cylindrical support screen 3116 can be welded or otherwise connected to the top support member 3112 and the bottom support member 3112 to provide sufficient support for the screen basket 3102. The individual screen elements 3106 can be attached to the screen basket frame using a variety of techniques that would be appreciated by persons of ordinary skill in the art, including without limitation pins 3103 as shown that may be press fit into place, clips, pegs, male and female connection elements, general press fitting, bolting, welding and other suitable techniques.

In the embodiment shown, individual thermoplastic screen elements 3106 can also be fastened to each other to provide additional support and integrity to the screen basket 3102. The screen elements 3106 can be fastened side-by-side and/or top-to-bottom by laser welding, press fitting, male and female connection elements, clips, pins, pegs, welding or another suitable technique. fastening clips or pins, laser welding, pressure fitting or another suitable fastening technique. Screen elements 3106 may be individually replaceable. In another embodiment, a plurality, perhaps several of the three-dimensional screen elements 3106 can be formed together as a single integrated piece, such as by injection molding. With reference to FIG. 31A, in one embodiment, all of the three-dimensional screen elements 3106 in a vertical column extending from the circular top support member 3110 to the circular bottom support member 3112 can be formed together as a single integrated piece, and this can be repeated for each of the vertical columns 3120 in the screen basket 3102. In another embodiment, all of the three-dimensional screen elements 3106 in a row extending around the circumference of the screening apparatus 3100 can be formed together as a single integrated piece, requiring only a single end-to-end attachment for the two ends of the single integrated piece, and this can be repeated for all of the rows 3122 in the screen basket 3102. In another embodiments, several of the three-dimensional screen elements 3106 in the vertical direction and several of the three-dimensional screen elements in the horizontal direction can be formed together as a single integrated piece, in order to reduce and simplify the attachments to the screen basket frame 3104. In still another embodiment, all of the three-dimensional screen elements 3106 in both the vertical and horizontal directions can be formed together as a single integrated piece or "mat" which only requires an end-to-end attachment after it is wrapped around the screen basket frame 3014. In other words, the entire thermoplastic screen basket 3102 can be formed as a single integrated piece by injection molding or another suitable technique. Generally, the larger the screen openings, e.g., 300 microns and larger the simpler the molding process and larger screening element or screening pieces can be made that form the basket.

Figure 31C:
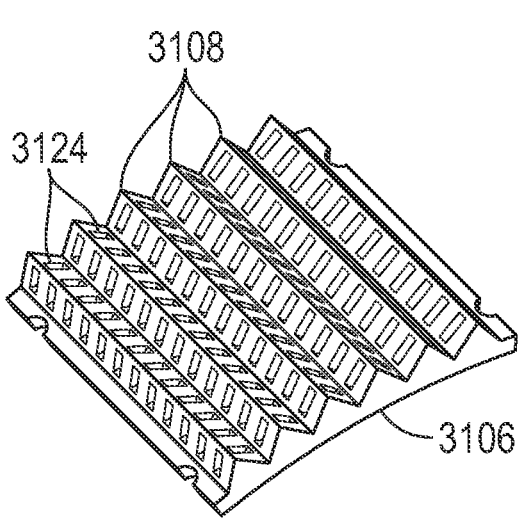
FIG. 31C is a perspective view of a single-piece, self-contained screen element according to one embodiment.

FIG. 31C illustrates one embodiment of an individual screen element 3106 that can be formed as a single molded piece and installed on a screen basket frame, including the screen basket frames discussed throughout this specification. The screen element 3106 can be molded, e.g. injection molded with a thermoplastic material or molded with with a thermoset material. Screen element 3106 may be formed of any suitable thermoplastic material, such as a thermoplastic polyurethane. Each screen element 3106 can be molded with the screen openings 3124 which can be rectangular, circular, square, oval or any suitable shape and can have exemplary dimensions ranging from about 250 to about 4000 microns. The illustrated screen element 3106 The illustrated screen element 3106 has a three-dimensional triangular profile that increases its screening surface area and can be employed for more efficient screening. Additionally, the screen element 3106 can have a slight curvature on its bottom surface that facilitates installation and wrapping around a cylindrical screen frame. In the embodiment show, the screen element 3106 includes corrugations 3108 that are oriented transverse to the curvature of the screen element 3106. When installed on a cylindrical screen basket frame, this can result in a plurality of corrugations oriented substantially vertically and parallel to the axis of the cylindrical screen basket. In alternative embodiments, the corrugations can be oriented substantially parallel to the curvature of the screen element 3106, or at any angle or combination of angles relative to the curvature of the screen element 3106 as explained above. The illustrated screen openings 3124 are rectangular and have a long axis that can oriented substantially perpendicular to the orientation of the corrugations 3108. When installed in a screen basket, the rectangular openings 3124 so oriented can facilitate the passage of fluid from the outside to the inside of the screen basket due to a pressure differential, suction pressure induced internally in the basket by impellers and/or when a wiper assembly is employed to facilitate such passage. The screen elements 3106 can have openings or other fittings that enable them to fit directly onto and over the screen basket frame 3104, thereby eliminating the need for an intervening case, sleeve or subgrid assembly. As explained above, many suitable techniques can also be used to fasten the screen elements 3106 to the underlying screen basket frame 3104. The individual screen elements 3106 can alternatively or additionally be fastened to each other and/or to the screen elements 3107 described below, side-by-side and/or top-to-bottom using press fitting, male and female connection elements, clips, pins, pegs, laser welding, fastener tabs (not shown) or any suitable technique.

Figure 31D:
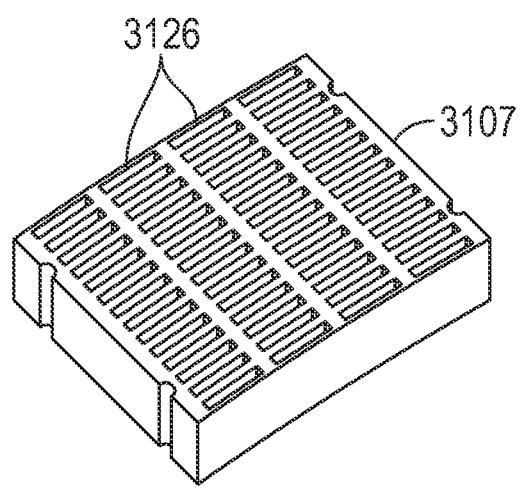
FIG. 31D is a perspective view of a single-piece, self-contained screen element according to another embodiment.

FIG. 31D illustrates another embodiment an individual screen element 3107 that can be formed as a single molded piece and installed on a screen basket frame. The screen element 3107 can be molded, e.g. injection molding of a thermoplastic or molding of a thermoset polyurethane. Screen element 3107 may be formed of a suitable thermoplastic material, such as a thermoplastic polyurethane. Each screen element 3107 can be molded with the screen openings 3126 which can be rectangular, circular, square, oval or any suitable shape and can have exemplary dimensions ranging from about 250 to about 4000 microns. The illustrated screen element 3107 has a substantially flat profile except for a slight curvature that facilitates installation and wrapping around a cylindrical screen frame. The illustrated screen openings 3126 are rectangular and have a long axis that can oriented substantially parallel to the curvature of the screen element 3107. When installed in a screen basket, the rectangular openings 3126 so orientation can facilitate the passage of fluid from the outside to the inside of the screen basket due to a pressure differential, suction pressure induced internally in the basket by impellers and/or when a wiper assembly is employed to facilitate such passage. As with other embodiments described herein, orienting the long axis of the rectangular opening substantially horizontal and transverse to the longitudinal axis of the screen basket facilitates flow through the screen openings when a wiper assembly goes past the opening when rotating around the circumference of the screen basket. Again, position of the openings with respect to the movement of a wiper assembly, such as described above, may apply to the various embodiments of screens, screening surfaces and/or screen assemblies discussed in this disclosure. The screen elements 3107 can have openings or other fittings that enable them to fit directly onto and over the screen basket frame 3104, thereby eliminating the need for an intervening case, sleeve or subgrid assembly. As explained above, many suitable techniques can also be used to fasten the screen elements 3107 to the underlying screen basket frame 3104. The individual screen elements 3107 can alternatively or additionally be fastened to each other and/or to the screen elements 3106 described above, side-by-side and/or top-to-bottom using press fitting, male and female connection elements, clips, pins, pegs, laser welding, fastener tabs (not shown) or any suitable technique.

Figure 32A:
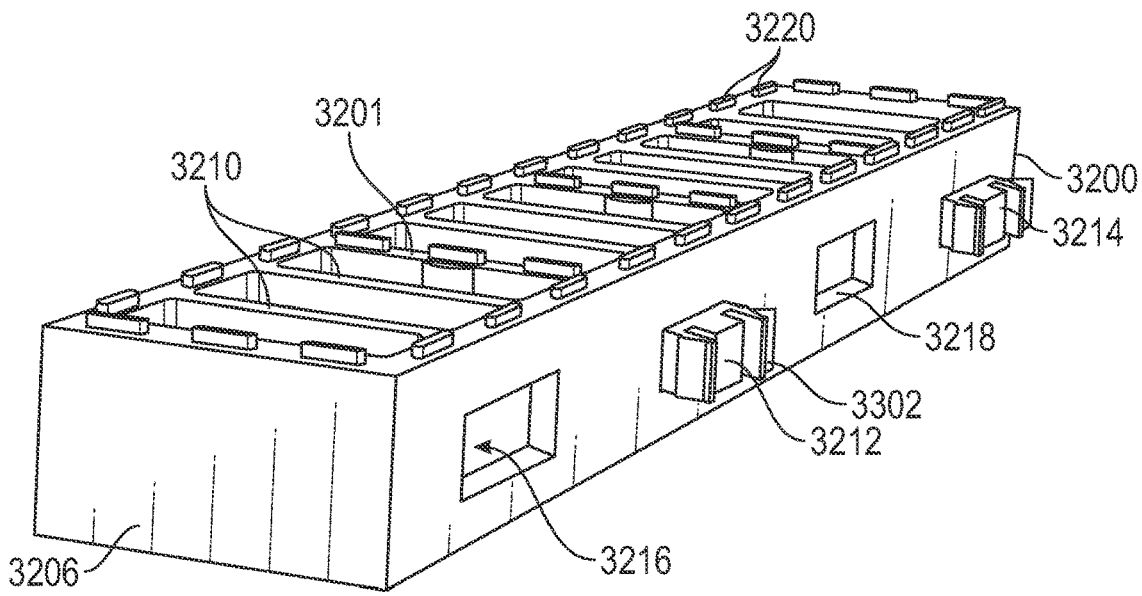
FIG. 32A is s perspective view of a flat modular subgrid member that can be used to form a subgrid structure for use in the screen basket.
Figure 32B:
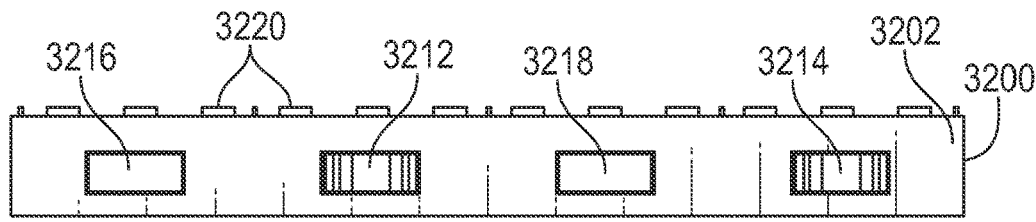
FIG. 32B is a front view of the modular subgrid member of FIG. 32A.
Figure 32C:
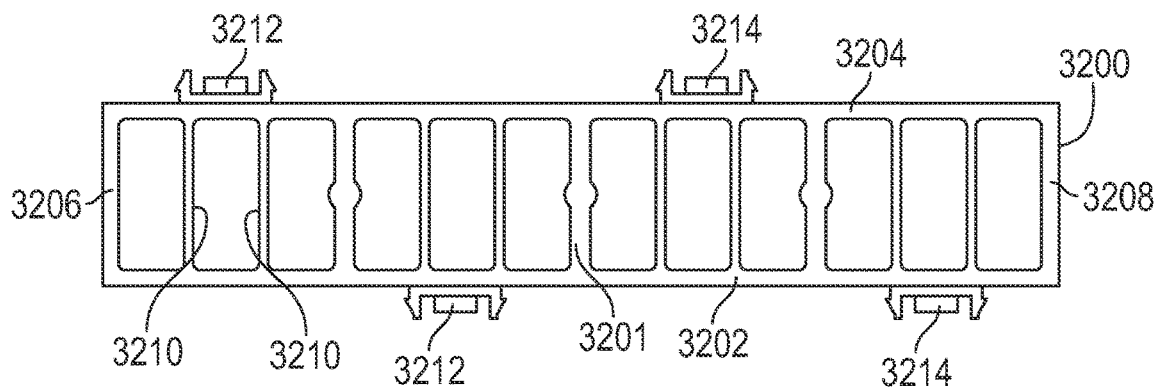
FIG. 32C is a top view of one embodiment of the modular subgrid member of FIG. 32A.
Figure 32D:
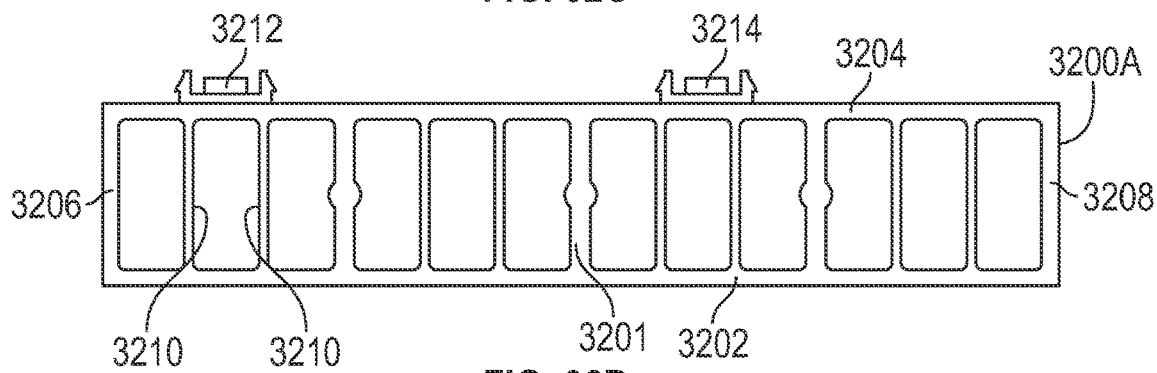
FIG. 32D is a top view of another embodiment of the modular subgrid member of FIG. 32A.
Figure 33A:
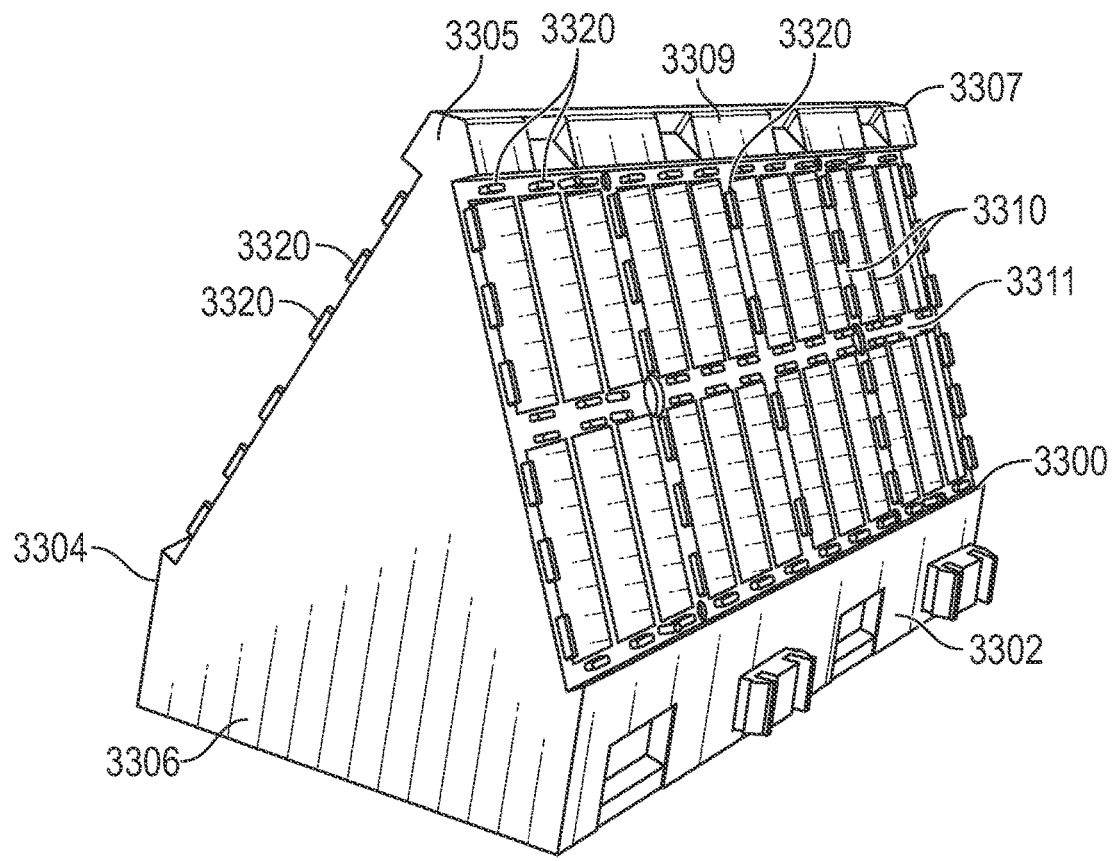
FIG. 33A is a perspective view of an alternative embodiment of a triangular modular subgrid member.
Figure 33B:
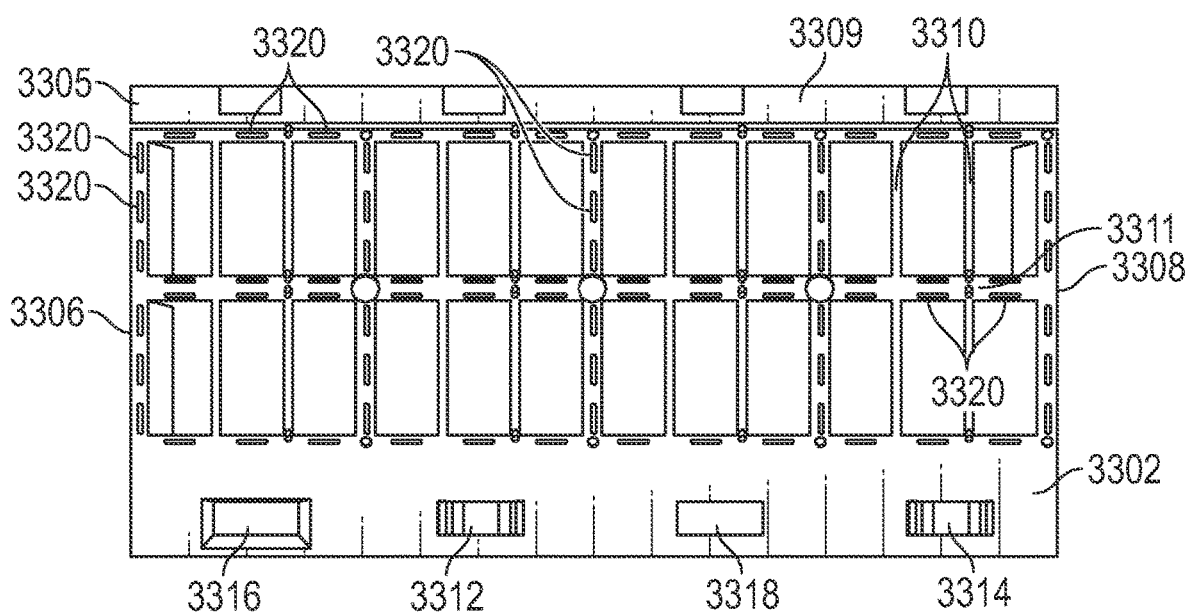
FIG. 33B is a front view of the triangular modular subgrid member of FIG. 33A.
Figure 33C:
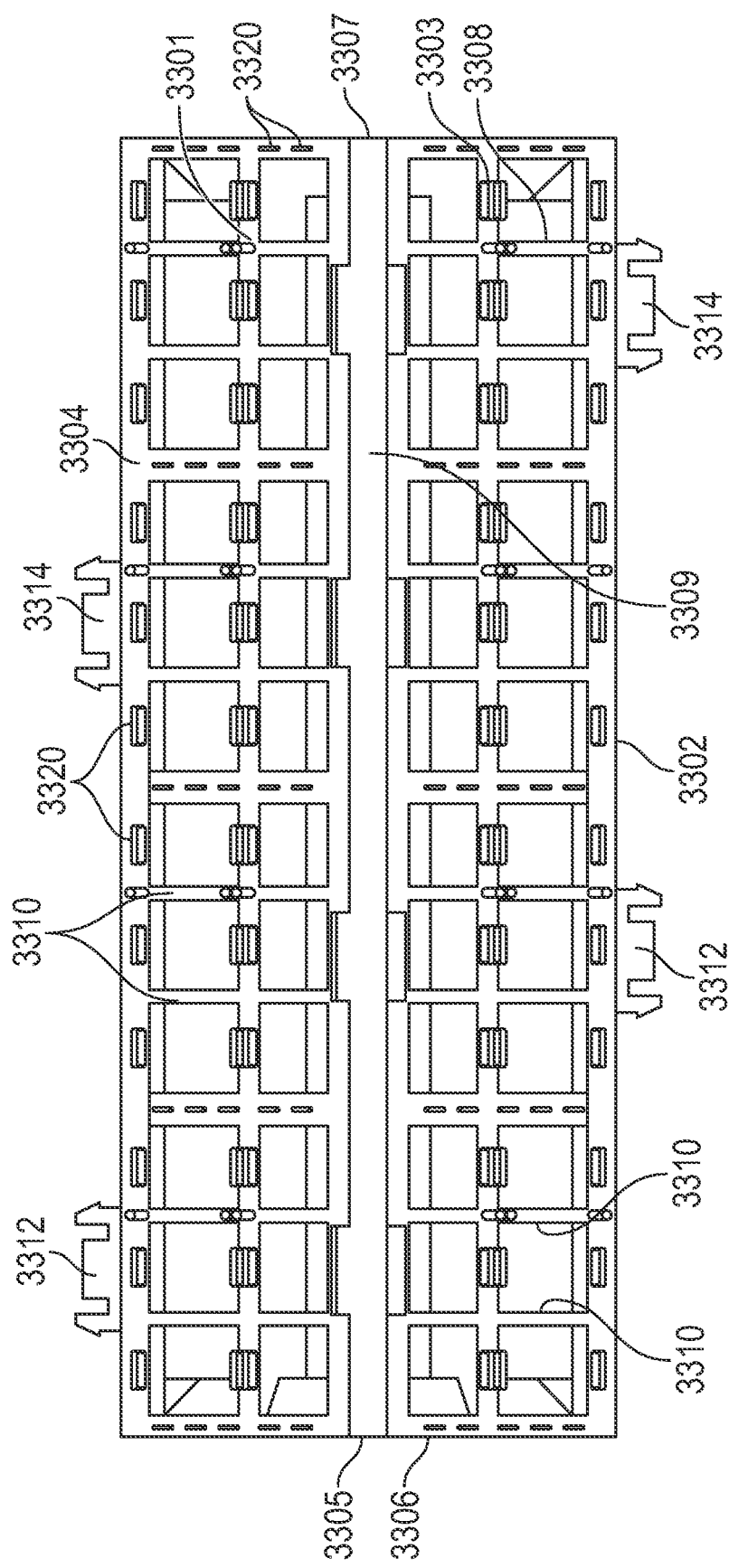
FIG. 33C is a top view of the triangular modular subgrid ember of FIG. 33A.
Figure 33D:
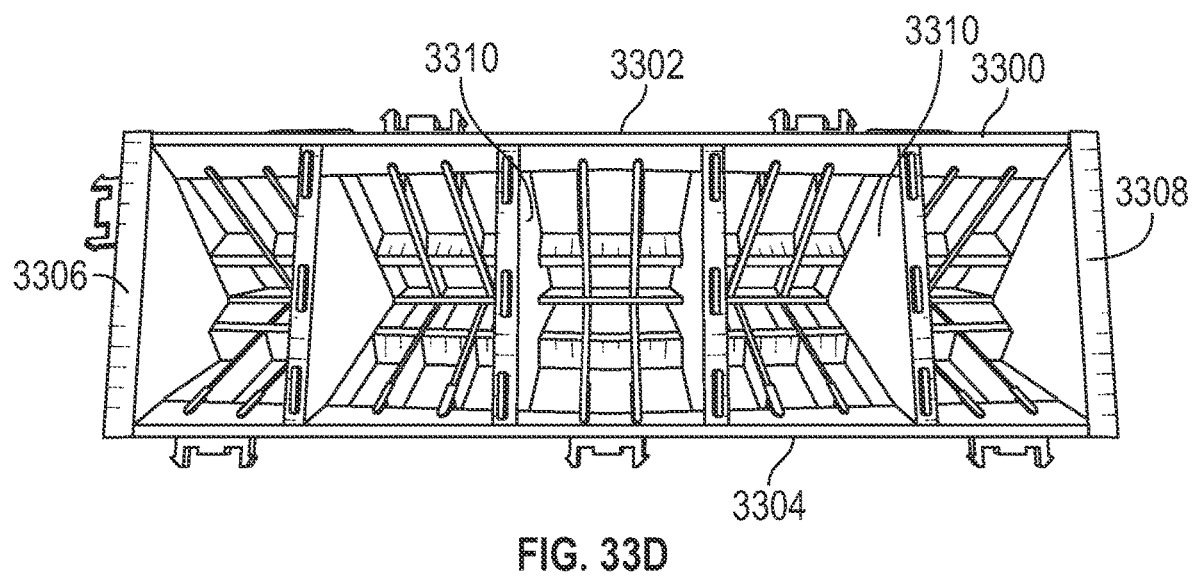
FIG. 33D is a bottom view of one embodiment of the triangular modular subgrid member of FIG. 33A.

As previously discussed throughout this disclosure, it may be advantageous to micromold screen elements and secure them to subgrids for support. Micromolding smaller individual screen elements, e.g. thermoplastic injection molding, of smaller sizes, 1" by 6" pieces having screening openings of 35 to 250 microns, simplifies the molding process (reducing problems with knit lines, etc.) and allows for creating more screen openings and thus more open screening area. FIGS. 32A-32D illustrate embodiments of a flat subgrid member 3200 that have simplified support structures to minimize obstructions behind the screening surface creating by the screen elements. This allows for easier flow of material through the subgrid and screen element structures and helps prevent blockages. The subgrids shown in FIGS. 32A-32D may be used as alternative subgrid structures to the other subgrid structures described in this disclosure. As compared to other subgrid structures described herein, subgrid member 3200 includes fewer structure support members and provide support to synthetic screening surfaces, prevent blockages in synthetic screening surfaces and promote flow through synthetic screening surfaces that are configured to separate carbon or resin from a slurry of a carbon-in-leach, carbon-in-pulp, resin-in-leach, or resin-in-pulp (or other similar slurry) material as fluid flows from outside a screen basket apparatus to inside the screen basket apparatus due at least in part to a static pressure differential between fluid outside relative to fluid inside the screen basket apparatus, such that carbon or resin is retained on an external surface of the synthetic screening surface. The subgrids shown in FIGS. 32A-32D may be used as alternative subgrid structures to the other subgrid structures described in this disclosure. The flat subgrid member 3200 shown in FIGS. 32A-32C is rectangular in shape and includes elongated front and back walls 3202 and 3204, two shorter end walls 3206 and 3208, and a plurality of interior walls 3210 extending between the front wall 3202 and the back wall 3204. The front, back, end and interior walls together define a flat top surface 3201 for receiving and supporting a flat screen element. At least one of the front and back walls 3202 and 3204 includes two protruding male clips 3212 and 3214 and two receiving female clip openings 3216 and 3218 designed to receive the male clip members from an adjacent modular subgrid member. The subgrid member 3200 is an interior subgrid member designed for snapping or otherwise connecting to adjacent subgrid members along both of its front and back walls 3202 and 3204. As such, this embodiment has two protruding male clips 3212 and 3214 and two receiving female clip openings 3216 and 3218 on both of its front and back walls 3202 and 3204. The subgrid member 3200A shown in FIG. 32D is an edge subgrid member designed for snapping and attaching to an adjacent subgrid member on only one of its front and back walls 3202 and 3204. As such, this embodiment has two protruding male clips on one, but not both of its front and back walls 3202 and 3204. Except for this difference, the subgrid member 3200A can be otherwise identical to the subgrid member 3200. Each modular subgrid member 3200 and 3200A can also include a plurality of fastener tabs 3220 projecting upward from its front, back and/or end walls for receiving and fastening a screen element, a portion of a screen element, more than one screen element or portions of more than one screen element to the subgrid member 3200 and/or 3200A.

FIGS. 33A-33D illustrate an embodiment of a modular subgrid member 3300 that is shaped and designed to support a corrugated type screen element, in this case a triangular screen element. The subgrids shown in FIGS. 33A-33D may be used as alternative subgrid structures to the other subgrid structures described in this disclosure. As compared to other subgrid structures described herein, subgrid member 3300 includes fewer structure support members and may be used to provide support to synthetic screening surfaces, prevent blockages in synthetic screening surfaces and promote flow through synthetic screening surfaces that are configured to separate carbon or resin from a slurry of a carbon-in-leach, carbon-in-pulp, resin-in-leach, or resin-in-pulp (or other similar slurry) material as fluid flows from outside a screen basket apparatus to inside the screen basket apparatus due at least in part to a static pressure differential between fluid outside relative to fluid inside the screen basket apparatus, such that carbon or resin is retained on an external surface of the synthetic screening surface. The modular subgrid member 3300 includes elongated front and back walls 3302 and 3304, two shorter end walls 3306 and 3308, and a plurality of interior walls 3310. The end walls 3306 and 3308 are triangular in shape and extend upward to apexes 3305 and 3307. A plurality of triangular interior walls 3310 extend between the front wall 3302 and the back wall 3304 and upward to apexes that align with the apex 3305 in the first end wall 3306 and the apex 3307 in the second end wall 3308. The corresponding apexes are joined by an apex wall 3309 that extends between the apexes 3305 and 3307 of the end walls 3306 and 3308 and connects the apexes of the interior walls 3310. An elongated intermediate support member 3311 can run parallel to the apex wall 3309 and the front and back walls 3302 and 3304 and can extend from the first end wall 3306 to the second end wall 3308. The front and back walls 3302 and 3304, together with the triangular end walls 3306 and 3308 and the triangular interior walls 3310, define two angled top surfaces 3301 and 3303 that can receive and support a corresponding triangular screen element or one or more portions thereof. One or both of the front and back walls 3302 and 3304 includes two protruding male clip members 3312 and 3314 and two receiving female clip receiving members 3316 and 3318 designed to receive the male clip members from an adjacent modular subgrid member. Each modular subgrid member 3300 can include a plurality of fastener tabs 3320 that project upward from the triangular end walls 3306 and 3308, the apex wall 3309, the interior walls 3310 and/or other portions of the angled top surfaces 3301 and 3303 to receive and fasten a three-dimensional screen element, a portion of a three-dimensional screen element, more than one three-dimensional screen element or portions of more than one three-dimensional screen element to the subgrid member 3300.

As explained above, the use of corrugated or pyramid synthetic screening surfaces improves screening efficiency by increasing the effective surface area on the screen basket that is available for screening. Other techniques for improving screening efficiency for synthetic screening surfaces includes simplifying the support structures for screen elements by eliminating unnecessary structural support elements that might otherwise obstruct or slow the flow of the fluid being screened. Another way to improve screen efficiency by eliminating unnecessary obstructions is to simplify the design of the subgrid members that support the screen elements and the screen basket. To the extent that this much structure is not needed to support the triangular screen element, the presence of these support elements can obstruct and/or slow the flow of fluid through the screen assembly and can add unnecessarily to the cost of manufacture. As shown in FIG. 34B, the bottom support structure includes only the bottom edges of the front and back walls 3302 and 3304, the triangular end walls 3306 and 3308 and the triangular interior walls 3310. All of the remaining bottom support elements have been eliminated, including additional lengthwise bottom support members or additional lengthwise support members in the sloped structures that meet at the apex ridge of the structure. Again, FIGS. 32A-32D and FIGS. 33A-33D are similar to the subgrids described herein except they have been simplified to remove certain support members to prevent blockages and provide for easier flow through the exterior screening surface to the inside of a screening basket. All while maintaining the support needed for synthetic screening surfaces used in the processes described herein.

Embodiments present disclosure include methods of screening a fluid using synthetic screening surfaces that are configured to separate carbon or resin from a slurry of a carbon-in-leach, carbon-in-pulp, resin-in-leach, or resin-in-pulp (or other similar slurry) material as fluid flows from outside a screen basket apparatus to inside the screen basket apparatus such that carbon or resin is retained on an external surface of the synthetic screening surface. The methods may include the steps of: providing a liquid holding tank; providing a screen basket assembly including a synthetic screening surface inside the liquid holding tank defining an inner enclosure, the screen basket assembly being designed so that a space between an inner surface of the liquid holding tank and an outer synthetic screening surface of the screen basket assembly defines an outer enclosure; providing unscreened liquid or slurry to the outer enclosure at a first height in the outer enclosure; passing the unscreened liquid or slurry through the screen basket assembly synthetic screening surface into the inner enclosure; and removing the screened liquid or slurry from the inner enclosure at a rate that maintains a difference between the first and the second height; wherein the difference between the first height in the first enclosure and the second height in the second enclosure maintains a pressure gradient across the screen assembly synthetic screening surface sufficient to allow a continuous screening of the unscreened liquid or slurry. The various embodiments of screen baskets, screens, screen assemblies, screening surfaces, support structures and related systems, including wipers assemblies and system configurations as described herein can be used with the methods of screening. In embodiments of the present disclosure, including the methods described above, synthetic screening surface include elongated screen openings that can be oriented in a direction of travel of a wiper assembly (described herein) that passes in a circular path around the screen basket assembly and urges the fluid (liquid or slurry) through the screen assembly from the outer enclosure to the inner enclosure.

Figure 34A:
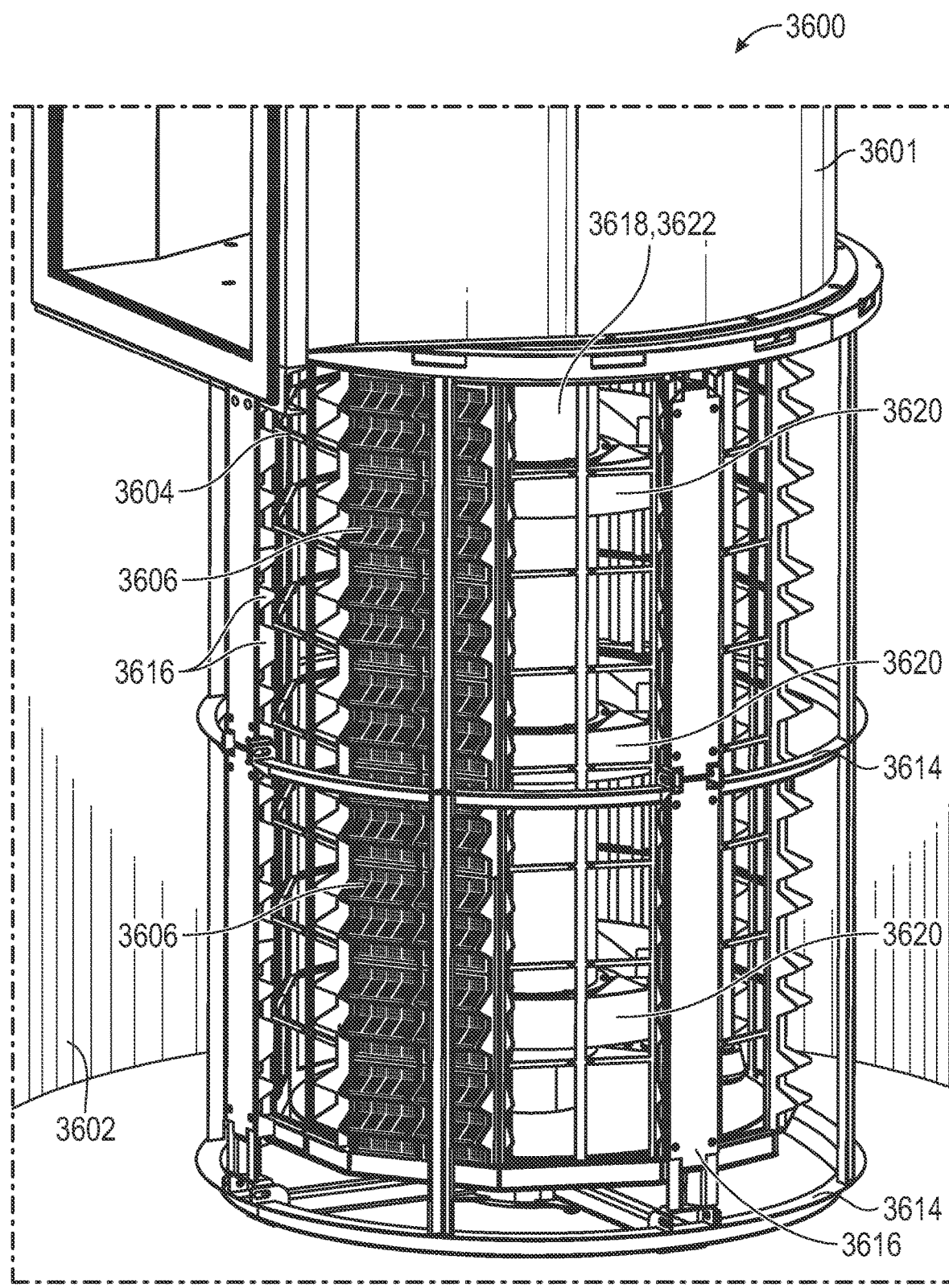
FIG. 34A is a partial cutaway perspective view of an apparatus that explains a method of screening a fluid according to the disclosure.
Figure 34B:
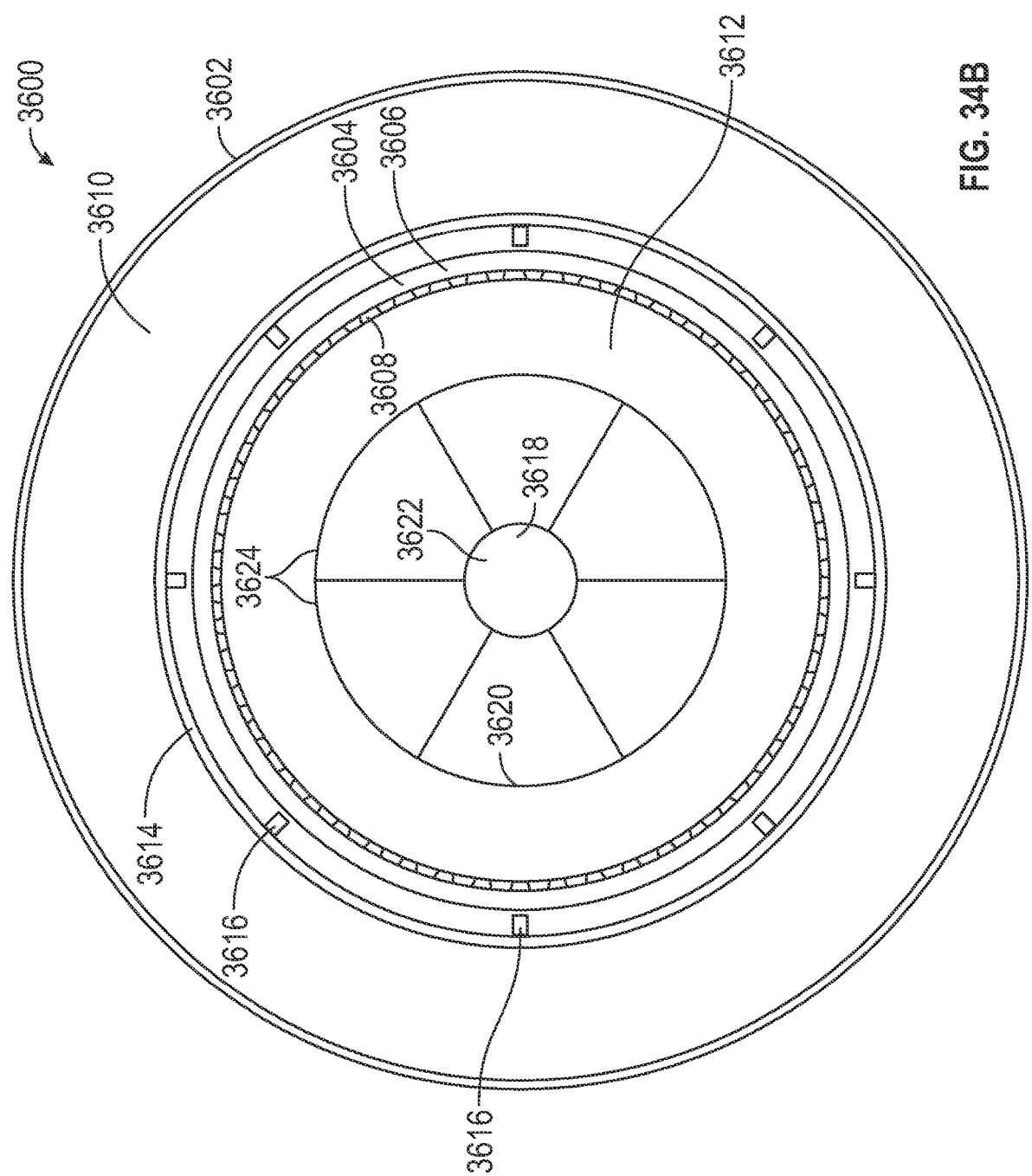
FIG. 34B schematically illustrates a top sectional view of the apparatus and illustrated method of FIG. 34A.

Referring to FIG. 34A and the schematic FIG. 34B, the illustrated apparatus 3600 includes an assembly that includes an upper baffle 3601 and a screen basket assembly 3604, The screen basket assembly 3604 can be immersed in a fluid holding tank 3602 which can hold a liquid or slurry and can be cylindrical as shown, to perform the screening operation. The screen basket assembly 3604 includes a screen basket 3606 comprised of horizontally-oriented triangular screen elements and mounted to a screen basket frame 3608. The inner wall of the fluid holding tank 3602 and the outer surface of the screen basket assembly 3604 define an outer enclosure 3610. The screen basket assembly 3604 can have a cylindrical configuration and defines an inner enclosure 3612. A wiper assembly 3614 is located in the outer enclosure 3610 and includes a plurality of wiper elements 3616, suitably located at approximately equal distances from each other in a circular path. In the embodiment shown, the wiper elements 3616 can each have a three-dimensional (e.g., corrugated) profiled surface that faces toward and complements the outer surface of the horizontally-oriented triangular screen elements of the screen basket 3606. Alternatively, the wiper elements 3616 can have substantially flat surfaces facing the screen elements of the screen basket 3606. In either embodiment, the screen basket 36 can have elongated openings resembling, for example, the openings 3124 in FIG. 31C. The elongated openings can be oriented in the direction of travel of the wiper assembly 3614. When the wiper assembly 3614 moves horizontally in a circular path around the screen basket assembly 3606, the elongated screen openings can also be oriented horizontally in order to urge the fluid more efficiently through the screen openings. The elongated screen openings can be rectangular, elliptical, oval, or any suitable elongated shape and can have lengthwise dimensions ranging from about 250 to about 4000 microns. In one embodiment, the wiper assembly 3614 is positioned so that the wiper elements 3616 come close to the synthetic screen surface of the screen basket 3606 without touching it. An exemplary distance between the wiper elements 3616 and the screen basket 3606 can be about 0.5 inch to about 4 inches, or about one to about three inches, or about two inches. As unscreened fluid is fed into the outer enclosure 3610, the screen basket assembly remains stationary and the wiper assembly 3614 moves around the screen basket assembly in a circular path, causing agitation and stirring of the unscreened liquid in the outer enclosure and helping to urge the unscreened liquid through the synthetic screening surface of screen basket assembly 3604 and/or to create a movement of fluid across the synthetic screening surface to prevent blockages and or unwanted particulates to stick to the synthetic screening surface.

A rotating impeller assembly 3618 is provided in the inner enclosure which can include a plurality of impellers 3620 at different vertical levels along a vertically-disposed impeller shaft 3622. Three vertically spaced impellers 3620 are illustrated in the embodiment of FIG. 35A. Each impeller 3620 can include a plurality of impeller blades 3624 as shown. The impeller assembly can be used to agitate and stir the screened fluid that passes through the screen basket assembly 3604 and into the inner enclosure 3612, in order to prevent heavier components from settling. The impellers 3620 can also be configured to urge the screened liquid fluid upward toward an exit (not shown) to carry the screened fluid away and into another tank, which can be another holding tank. Impellar assemblies 3618 may be used in embodiments of the present disclosure but are not necessary and depend on particular applications.

The apparatus 3600 is designed for continuous operation. During operation, the unscreened fluid provided in the outer enclosure 3610 of the fluid holding tank 3602 at a first height that exceeds a second height of fluid in the inner enclosure 3612 and can exceed the height of the screen basket assembly 3604. The unscreened fluid provided in the outer enclosure 3610 at the first height, causes a pressure gradient to be established across the screen basket assembly 3604 which causes the fluid to pass continuously through the screen basket assembly 3604. As the inward flow continues at a steady rate, the level of screened fluid in the inner enclosure 3612 reaches a target second height that is less than the first height. Once the target second height is achieved, the screened fluid is removed from the second enclosure at a rate necessary to maintain the screened fluid at the second height, which is always lower than the first height in the outer enclosure.

Once the second height of screened fluid in the inner enclosure 3612 reaches and is maintained at the target level, the process will continue to operate at steady state as long as desired. A steady state pressure differential (gradient) will be established and maintained across the screen basket assembly 3604 which enables continuous, steady state flow of unscreened fluid into and across the screen basket assembly 3604 and into the inner enclosure 3612, where the screened liquid is then removed at the steady state rate. In embodiments, the rotating wiper assembly 3614 in the outer enclosure helps to maintain the steady state by preventing accumulation and plugging of the liquid material at the screen surface. In embodiments, the rotating impeller assembly in the inner enclosure helps to maintain the steady state by ensuring that the screened fluid remains mixed so that heavier fluid material does not accumulate at the bottom of the inner enclosure. The rate of screening can be varied by varying the first height of unscreened fluid in the outer enclosure. For example, if the first fluid height is increased in the outer enclosure, the second height of screened fluid in the inner enclosure will increase by a lesser amount, and the difference between the first and second heights will increase, resulting in a higher pressure gradient across the synthetic screen and a faster steady state screening process. The screening process can similarly be slowed down by decreasing the first height of fluid in the outer enclosure.

The screening apparatus described herein combines several features that, taken alone or in combination, result in more efficient screening and enable higher screening rates. The use of single-piece synthetic injection molded screening elements enables elimination of the subgrid frame when the screen openings range from about 250 to about 4000 microns. Alternatively, when smaller screen openings of about 35 to about 250 microns are desired, or if a subgrid structure is desired for other reasons, the subgrid elements can be simplified as described with respect to FIGS. 34A and 34B. The use of a wiper assembly having a flat or complementary profiled surface facing the screen basket helps to urge the liquid through the screen basket assembly, further enhancing screening efficiency. The synthetic screen elements can have elongated screen openings that are oriented in the direction of travel of the wiper assembly to further enhance screening efficiency. The synthetic screen elements can be designed with a three-dimensional profile, such as a corrugated profile, to increase screening area. The wiper assembly can be designed with wiper elements having a complementary profiled surface, such as a complementary corrugated surface, to provide enhanced wiping and therefore improved screening efficiency, Additionally, the screening apparatus can be equipped with one or more internal impellers as described above to assist in mixing and removing the screened liquid from the screening apparatus.

Embodiments of the apparatuses and methods described in this disclosure may be used for screening a fluid using synthetic screening surfaces and may be specifically configured to separate carbon or resin (or other materials) from a slurry, including slurries of a carbon-in-leach, carbon-in-pulp, resin-in-leach, or resin-in-pulp material as fluid flows from outside a screen basket apparatus to inside the screen basket apparatus such that carbon or resin (or other desired material) is retained on an external surface of the synthetic screening surface.

While the embodiments of this disclosure are described with reference to various implementations and exploitations, it will be understood that these embodiments are illustrative and that the scope of the embodiments of the present disclosure is not limited to them. Many variations, modifications, additions, and improvements are possible. The above description should therefore not be construed as limiting, but merely as exemplifications of particular embodiments.

What is claimed is:

1. A screen basket apparatus, comprising:
   a grid frame having a plurality of openings, the grid frame including a plurality of transversal members and a plurality of longitudinal members that define the plurality of openings; and
   a screen assembly affixed to the grid frame that covers an opening in the grid frame, wherein the screen assembly comprises a synthetic screening surface formed of a synthetic material, and wherein screening openings are formed in the synthetic screening surface, the screening openings have a size that ranges between approximately 35 microns and approximately 4000 microns, wherein the screen assembly comprises a case and at least one screen unit mounted to the case, wherein each screen unit comprises a synthetic screening surface.

2. The screen basket apparatus of claim 1, wherein the case of the screen assembly comprises an attachment section that attaches the case to the grid frame and a holder section to which at least one screen unit is mounted.

3. The screen basket apparatus of claim 2, wherein the attachment section of the case comprises first and second recesses that are configured to receive respective ones of the transversal members and/or longitudinal members of the grid frame to removably attach the case to the grid frame.

4. The screen basket apparatus of claim 2, wherein the holder section of the case is configured such that a plurality of screen unit can be mounted to the holder section.

5. The screen basket apparatus of claim 1, wherein the case has an arcuate shape.

6. The screen basket apparatus of claim 1, wherein each at least one screen unit comprises a frame and a synthetic screening surface attached to the frame.

7. The screen basket apparatus of claim 6, wherein the frame of each at least one screen unit comprises at least one attachment mechanism that is configured to mate with a corresponding attachment mechanism on the frame of another screen unit such that the frames of two screen units can be joined together.

8. The screen basket apparatus of claim 6, wherein the frame of each at least one screen unit includes a plurality of attachment members that are configured to attach a synthetic screening surface to the frame.

9. The screen basket apparatus of claim 8, wherein the attachment members of the frame of each at least one screen unit comprise a plurality of alignment members configured to align a synthetic screening surface on the frame and a plurality of fusion bars that are configured to be fused to the synthetic screening surface by laser welding to attach the synthetic screening surface to the frame.

10. The screen basket apparatus of claim 9, wherein the alignment members comprise a plurality of protrusions on the frame that are configured to be received in corresponding apertures in the synthetic screening surface.

11. The screen basket apparatus of claim 6, wherein the frame of each at least one screen unit is configured such that when the frames of two screen units are joined together, the two screen units form an assembly having an arcuate or angled shape.

12. The screen basket apparatus of claim 1, wherein the grid frame includes a circular-shaped bottom surface joined to the plurality of transversal members and plurality of longitudinal members.

13. The screen basket apparatus of claim 12, wherein the plurality of transversal members and the plurality of longitudinal members of the grid frame form a generally cylindrical shape that extends upward from the circular-shaped bottom surface.

14. The screen basket apparatus of claim 1, wherein a shape of the grid frame and the screening openings in the synthetic screening surface configure the screen basket apparatus for use in a carbon-in-leach (CIL) or resin-in-leach (RIL) interstage screening process.

15. The screen basket apparatus of claim 1, wherein a shape of the grid frame and the screening openings in the synthetic screening surface configure the screen basket apparatus for use in a carbon-in-pulp (CIP) interstage screening process.

16. The screen basket apparatus of claim 1, wherein the screen assembly has an arcuate shape and includes fixing provisions that are configured to facilitate attaching the screen assembly to the grid frame.

17. The screen basket apparatus of claim 16, wherein the fixing provisions of the screen assembly comprise apertures or recesses that are configured to receive fixing devices that attach the screen assembly to the grid frame.

18. A method of forming a screen basket apparatus, comprising:
   providing a grid frame having a plurality of openings, the grid frame including a plurality of transversal members and a plurality of longitudinal members that define the plurality of openings;
   attaching at least one screen assembly to the grid frame such that the at least one screen assembly covers an opening in the grid frame, wherein the screen assembly comprises a synthetic screening surface formed of a synthetic material, and wherein screening openings are formed in the synthetic screening surface, the screening openings have a size that ranges between approximately 35 microns and approximately 4000 microns; and
   forming the at least one screen assembly by mounting at least one screen unit to a case, and wherein the step of attaching the at least one screen assembly to the grid frame comprises attaching the case of the screen assembly to the grid frame, wherein the case includes first and second recesses, and wherein the step of attaching the at least one screen assembly to the grid frame comprises mounting the case to the grid frame such that respective first and second transversal members and/or respective first and second longitudinal members of the grid frame are received in the first and second recesses of the case.

19. The method of claim 18, further comprising forming the at least one screen unit by mounting a synthetic screening surface to a frame.

20. The method of claim 19, wherein the step of mounting a synthetic screening surface to a frame comprises laser welding the synthetic screening surface to the frame such that fusion bars on the frame are fused to the synthetic screening surface by the laser welding.

21. The method of claim 19, further comprising forming the synthetic screening surface by injection molding a polyurethane, a thermoset material or a thermoplastic to form a unitary body that comprises the synthetic screening surface.

\* \* \* \* \*